(12) United States Patent
Majewicz Fey et al.

(10) Patent No.: US 12,533,200 B2
(45) Date of Patent: Jan. 27, 2026

(54) ONLINE RECOGNITION OF BIMANUAL COORDINATION TO PROVIDE CONTEXT FOR MOVEMENT DATA IN BIMANUAL TELEOPERATED ROBOTS

(71) Applicant: Board of Regents, The University of Texas System, Austin, TX (US)

(72) Inventors: Ann Majewicz Fey, Austin, TX (US); Jacob R. Boehm, Bedford, TX (US); Nicholas P. Fey, Jonestown, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 364 days.

(21) Appl. No.: 18/348,329

(22) Filed: Jul. 6, 2023

(65) Prior Publication Data

US 2024/0016561 A1 Jan. 18, 2024

Related U.S. Application Data

(60) Provisional application No. 63/358,669, filed on Jul. 6, 2022.

(51) Int. Cl.
*A61B 34/37* (2016.01)
*A61B 17/00* (2006.01)
*A61B 34/00* (2016.01)

(52) U.S. Cl.
CPC .............. *A61B 34/37* (2016.02); *A61B 17/00* (2013.01); *A61B 34/25* (2016.02); *A61B 2017/00207* (2013.01); *A61B 2034/252* (2016.02)

(58) Field of Classification Search
None
See application file for complete search history.

(56) References Cited

U.S. PATENT DOCUMENTS

2020/0360097 A1* 11/2020 DiMaio ................ A61B 34/35
2022/0296960 A1* 9/2022 Fung .................... A63F 13/212

OTHER PUBLICATIONS

Jacob Brackenridge, A Review of Rehabilitation Devices to Promote Upper Limb, Function Following Stroke, Neuroscience and Biomedical Engineering, 2016, 4, 25-42 (Year: 2016).*

Lin, Henry C. et al., "Towards Automatic Skill Evaluation: Detection and Segmentation of Robot-Assisted Surgical Motions," Computer Aided Surgery, vol. 11, No. 5, pp. 220-230, Sep. 2006.

(Continued)

*Primary Examiner* — Arslan Azhar

(57) ABSTRACT

Systems, methods and computer program products for online recognition of bimanual or bipedal coordination modes directed to completing a task using a robot. Such a method includes the steps of determining an onset of bimanual or bipedal motion of a subject operating the robot, and, in response, receiving trajectory data of left and right hands, or left and right feet, of the subject. The method also includes the step(s) of computing, based on the trajectory data, geometric descriptors of the segment, which include a direction metric and a symmetry metric. The method further includes the step(s) classifying, based on the direction and symmetry metrics, the types of direction and symmetry for the segment. The method also includes at least one of the steps of: generating task performance feedback, and controlling the robot, based on the types of direction and symmetry.

28 Claims, 49 Drawing Sheets

Direction: Together | Symmetry: Point
Making C Loop

Direction: Away | Symmetry: Mirror
Pulling Suture with Both Tools

(56) References Cited

OTHER PUBLICATIONS

Lin, Henry C., Ph.D. Dissertation for "Structure in Surgical Motion," The Johns Hopkins University, 294 pages, Apr. 2010.

Liu, J. et al., "Learning to Perform a New Movement With Robotic Assistance: Comparison of Haptic Guidance and Visual Demonstration," Journal of NeuroEngineering and Rehabilitation, vol. 3, No. 20, 10 pages, Aug. 31, 2006.

Malabet, Hernando Gonzalez et al., "Symmetric Motions for Bimanual Rehabilitation," The 2010 IEEE/RSJ International Conference on Intelligent Robots and Systems, pp. 5133-5138, Oct. 18-22, 2010.

Mariani, Andrea et al., "Skill-Oriented and Performance-Driven Adaptive Curricula for Training in Robot-Assisted Surgery Using Simulators: A Feasibility Study," IEEE Transactions on Biomedical Engineering, vol. 68, No. 2, pp. 685-694, Feb. 2021.

Nuckols, R. W. et al., "Individualization of Exosuit Assistance Based on Measured Muscle Dynamics During Versatile Walking," Sci. Robot., vol. 6, No. 60, 23 pages, Nov. 10, 2021.

Ona, Edwin Daniel et al., "Robotics in Health Care: Perspectives of Robot-Aided Interventions in Clinical Practice for Rehabilitation of Upper Limbs," Applied Sciences, vol. 9, No. 2586, 27 pages, Jun. 26, 2019.

Oquendo, Y. A. et al., "Robot-Assisted Surgical Training Over Several Days in a Virtual Surgical Environment With Divergent and Convergent Force Fields," The Hamlyn Symposium on Medical Robotics, 2 pages, Jun. 23, 2019.

Patton, James L. et al., "Chapter 5—Sensory-Motor Interactions and Error Augmentation," Springer International Publishing, pp. 79-95, 2016.

Patton, James L. et al., "Evaluation of Robotic Training Forces That Either Enhance or Reduce Error in Chronic Hemiparetic Stroke Survivors," Experimental Brain Research, vol. 168, pp. 368-383, 2006.

Penalver-Andres, J., Master Thesis, "Is Breaking It Down Better?" Enhancing Motor Learning via Controlled Sensory-Motor Integration, 100 pages, Jan. 2018.

Poggensee, Katherine L. et al., "How Adaptation, Training, and Customization Contribute to Benefits From Exoskeleton Assistance," Science Robotics, vol. 6, 13 pages, Sep. 29, 2021.

Power, Maura et al., "A Cooperative Control Framework for Haptic Guidance of Bimanual Surgical Tasks Based on Learning From Demonstration," 2015 IEEE International Conference on Robotics and Automation (ICRA), 8 pages, May 26-30, 2015.

Rabe, Kaitlin G. et al., "Ultrasound Sensing Can Improve Continuous Classification of Discrete Ambulation Modes Compared to Surface Electromyography," IEEE Transactions on Biomedical Engineering, vol. 68, No. 4, pp. 1379-1388, Apr. 2021.

Rahman, Masudur et al., "Transferring Dexterous Surgical Skill Knowledge Between Robots for Semi-Autonomous Teleoperation," 2019 28th IEEE International Conference on Robot and Human Interactive Communication (RO-MAN), 6 pages, Oct. 14-18, 2019.

Rakita, Daniel et al., "Shared Control-Based Bimanual Robot Manipulation," Science Robotics, vol. 4, 14 pages, May 29, 2019.

Reiley, Carol E. et al., "Review of Methods for Objective Surgical Skill Evaluation," Surg Endosc, vol. 25, pp. 356-366, 2011.

Reiley, Carol E. et al., "Task Versus Subtask Surgical Skill Evaluation of Robotic Minimally Invasive Surgery," MICCAI 2009, Part I, LNCS 5761, pp. 435-442, 2009.

Richards, Holden W. et al., "Trends in Robotic Surgery Utilization Across Tertiary Children's Hospitals in the United States," Surgical Endoscopy, vol. 35, pp. 6066-6072, 2021.

Rosenbaum, David A. et al., "Haptic Tracking Permits Bimanual Independence," Journal of Experimental Psychology: Human Perception and Performance, vol. 32, No. 5, pp. 1266-1275, 2006.

Russell, Holly E. B. et al., "Motor Learning Affects Car-to-Driver Handover in Automated Vehicles," Science Robotics, vol. 1, 9 pages, Dec. 6, 2016.

Salazar, Jose et al., "Path-Following Guidance Using Phantom Sensation Based Vibrotactile Cues Around the Wrist," IEEE Robotics and Automation Letters, vol. 3, No. 3, pp. 2485-2492, Jul. 2018.

Sanchez, Renata et al., "Robotic Surgery Training: Construct Validity of Global Evaluative Assessment of Robotic Skills (GEARS)," Journal of Robotic Surgery, vol. 10, pp. 227-231, 2016.

Schambra, Heidi M. et al., "A Taxonomy of Functional Upper Extremity Motion," Frontiers in Neurology, vol. 10, Article 857, 15 pages, Aug. 2019.

Shadmehr, Reza et al., "Adaptive Representation of Dynamics During Learning of a Motor Task," The Journal of Neuroscience, vol. 14, No. 5, pp. 3208-3224, May 1994.

Sheetz, Kyle H. et al., "Trends in the Adoption of Robotic Surgery for Common Surgical Procedures," JAMA Network Open, 9 pages, Jan. 10, 2020.

Sherwood, David E., "Hand Preference, Practice Order, and Spatial Assimilations in Rapid Bimanual Movement," Journal of Motor Behavior, vol. 26, No. 2, pp. 123-134, 1994.

Shirota, Camila et al., "On the Assessment of Coordination Between Upper Extremities: Towards a Common Language Between Rehabilitation Engineers, Clinicians and Neuroscientists," Journal of NeuroEngineering and Rehabilitation, vol. 13, 14 pages, 2016.

Sleimen-Malkoun, Rita et al., "Bimanual Training in Stroke: How Do Coupling and Symmetry-Breaking Matter?," BMC Neurology, vol. 11, No. 11, 9 pages, 2011.

Smith, Beth A et al., "Sensor Measures of Symmetry Quantify Upper Limb Movement in the Natural Environment Across the Lifespan," Archives of Physical Medicine and Rehabilitation, vol. 100, pp. 1176-1183, 2019.

Spada, Stefania et al., "Investigation Into the Applicability of a Passive Upper-Limb Exoskeleton in Automotive Industry," Procedia Manufacturing, vol. 11, pp. 1255-1262, 2017.

Spijkers, Will et al., "Structural Constraints on the Performance of Symmetrical Bimanual Movements With Different Amplitudes," The Quarterly Journal of Experimental Psychology, vol. 48A, No. 3, pp. 716-740, 1995.

Staude, Gerhard H., "Precise Onset Detection of Human Motor Responses Using A Whitening Filter and the Log-Likelihood-Ratio Test," IEEE Transactions on Biomedical Engineering, vol. 48, No. 11, pp. 1292-1305, Nov. 2001.

Su, Yun-Hsuan et al., "Collaborative Robotics Toolkit (CRTK): Open Software Framework for Surgical Robotics Research," 2020 Fourth IEEE International Conference on Robotic Computing, pp. 48-55, Nov. 9-11, 2020.

Swinnen, Stephan P. et al., "Directional Interference During Bimanual Coordination: Is Interlimb Coupling Mediated by Afferent or Efferent Processes," Behavioural Brain Research, vol. 139, pp. 177-195, 2003.

Swinnen, Stephan P. et al., "Two Hands, One Brain: Cognitive Neuroscience of Bimanual Skill," TRENDS inf Cognitive Science, vol. 8, No. 1, pp. 18-25, Jan. 2004.

Tallet, Jessica et al., "The Role of Stability in the Dynamics of Learning, Memorizing, and Forgetting New Coordination Patterns," Journal of Motor Behavior, vol. 40, No. 2, pp. 103-116, 2008.

Thornby, Maureen A. et al., "Bimanual Skill Development in Pediatric Below-Elbow Amputation: A Multicenter, Cross-Sectional Study," Arch Phys Med Rehabil, vol. 73, pp. 697-702, Aug. 1992.

Todorov, Emanuel et al., "Optimal Feedback Control as a Theory of Motor Coordination," Nature Neuroscience, vol. 5, No. 11, pp. 1226-1235, Nov. 2002.

Todorov, Emanuel, "Stochastic Optimal Control and Estimation Methods Adapted to the Noise Characteristics of the Sensorimotor System," Neural Computation, vol. 17, pp. 1084-1108, 2005.

Van der Meijden, O. A. J. et al., "The Value of Haptic Feedback in Conventional and Robot-Assisted Minimal Invasive Surgery and Virtual Reality Training: A Current Review," Surg Endosc, vol. 23, pp. 1180-1190, 2009.

Vinjamuri, Ramana et al., "Inherent Bimanual Postural Synergies in Hands," 30th Annual International IEEE Embs, pp. 5093-5096, Aug. 20-24, 2008.

Wang, Robert S. et al., "Robotic Surgery Training Current Trends and Future Directions," Urologic Clinics of North America, vol. 48, pp. 137-146, 2021.

Wu, Ching-yi et al., "Unilateral Versus Bilateral Robot-Assisted Rehabilitation on Arm-Trunk Control and Functions Post Stroke: A

(56) References Cited

OTHER PUBLICATIONS

Randomized Controlled Trial," Journal of Neuroengineering and Rehabilitation, vol. 10, No. 35, 10 pages, 2013.
Yu, Ho et al., "Development of a Upper-Limb Exoskeleton Robot for Refractory Construction," Control Engineering Practice, vol. 72, pp. 104-113, 2018.
Abboudi, Hamid et al., "Current Status of Validation for Robotic Surgery Simulators—A Systematic Review," BJU International, vol. 111, pp. 194-205, 2012.
Ahmidi, Narges et al., "A Dataset and Benchmarks for Segmentation and Recognition of Gestures in Robotic Surgery," IEEE Transactions on Biomedical Engineering, vol. 64, No. 9, pp. 2025-2041, Sep. 2017.
Arain, Nabeel A. et al., "Comprehensive Proficiency-Based Inanimate Training for Robotic Surgery: Reliability, Feasibility, and Educational Benefit," Surgical Endoscopy, vol. 26, pp. 2740-2745, 2012.
Arapi, Visar et al., "Understanding Human Manipulation With the Environment: A Novel Taxonomy for Video Labelling," IEEE Robotics and Automation Letters, vol. 6, No. 4, pp. 6537-6544, Oct. 2021.
Battaglia, Edoardo et al., "Cartesian Space Vibrotactile Cues Outperform Tool Space Cues When Moving From 2D to 3D Needle Insertion Task," 9th IEEE RAS/EMBS International Conference for Biomedical Robotics and Biomechatronics, 6 pages, Aug. 21-24, 2022.
Bauerle, Wayne B. et al., "Current Trends in the Utilization of a Robotic Approach in the Field of Bariatric Surgery," Obesity Surgery, vol. 33, pp. 482-491, 2023.
Boehm, Jacob R. et al., "Effects of Scaling and Sequence on Performance of Dynamic Bimanual Path Following Tasks," Journal of Medical Robotics Research, vol. 5, Nos. 3-4, pp. 2042001-1-2042001-11, Jun. 2, 2020.
Boehm, Jacob R. et al., "Inherent Kinematic Features of Dynamic Bimanual Path Following Tasks," IEEE Transactions on Human-Machine Systems, vol. 50, No. 6, pp. 613-622, Dec. 2020.
Boehm, Jacob R. et al., "Online Recognition of Bimanual Coordination Provides Important Context for Movement Data in Bimanual Teleoperated Robots," IEEE/RSJ International Conference on Intelligent Robots and Systems, pp. 6248-6255, Sep. 27-Oct. 1, 2021.
Boehm, Jacob R. et al., "Shaping Human Movement via Bimanually-Dependent Haptic Force Feedback," 2023 IEEE World Haptics Conference, pp. 266-272, Jul. 10-13, 2023.
Bogue, Robert, "The Rise of Surgical Robots," Industrial Robot, vol. 48, No. 3, pp. 335-340, 2021.
Bryden, Pamela J., "The Influence of M. P. Bryden's Work on Lateralization of Motor Skill: Is the Preferred Hand Selected for and Better at Tasks Requiring a High Degree of Skill?," Laterality, vol. 21, Nos. 4-6, pp. 312-328, Oct. 21, 2015.
Burns, Martin K. et al., "Low-Dimensional Synergistic Representation of Bilateral Reaching Movements," Frontiers in Bioengineering and Biotechnology, vol. 5, Article 2, 15 pages, Feb. 2017.
Byblow, Winston D. et al., "Mirror Symmetric Bimanual Movement Priming Can Increase Corticomotor Excitability and Enhance Motor Learning," PLoS One, vol. 7, Iss. 3, 14 pages, Mar. 2012.
Caccianiga, Guido et al., "Multi-Sensory Guidance and Feedback for Simulation-Based Training in Robot Assisted Surgery: A Preliminary Comparison of Visual, Haptic, and Visuo-Haptic," IEEE Robotics and Automation Letters, vol. 6, pp. 3801-3808, Apr. 2021.
Chen, Richard et al., "A Comprehensive Review of Robotic Surgery Curriculum and Training for Residents, Fellows, and Postgraduate Surgical Education," Surgical Endoscopy, vol. 34, pp. 361-367, 2020.
Criscimagna-Hemminger, Sarah E. et al., "Size of Error Affects Cerebellar Contributions to Motor Learning," Journal of Neurophysiology, vol. 103, pp. 2275-2284, 2010.
Del Vecchio, Domitilla et al., "Decomposition of Human Motion Into Dynamics-Based Primitives With Application to Drawing Tasks," Automatica, vol. 39, pp. 2085-2098, 2003.

Diaz-Frances, Eloisa et al., "On the Existence of a Normal Approximation to the Distribution of the Ratio of Two Independent Normal Random Variables," Stat Papers, vol. 54, pp. 309-323, 2013.
Dulan, Genevieve et al., "Developing a Comprehensive, Proficiency-Based Training Program for Robotic Surgery," Surgery, vol. 152, No. 3, pp. 477-488, Sep. 2012.
Dulan, Genevieve et al., "Proficiency-Based Training for Robotic Surgery: Construct Validity, Workload, and Expert Levels for Nine Inanimate Exercises," Surgical Endoscopy, vol. 26, pp. 1516-1521, 2012.
Enayati, Nima et al., "Robotic Assistance-as-Needed for Enhanced Visuomotor Learning in Surgical Robotics Training: An Experimental Study," 2018 IEEE International Conference on Robotics and Automation, pp. 6631-6636, May 21-25, 2018.
Ershad, M. et al., "Automatic and Near Real-Time Stylistic Behavior Assessment in Robotic Surgery," International Journal of Computer Assisted Radiology and Surgery, vol. 14, pp. 635-643, 2019.
Fang, Ying et al., "Feasibility Evaluation of a Dual-Mode Ankle Exoskeleton to Assist and Restore Community Ambulation in Older Adults," Wearable Technologies, vol. 3, pp. e13-1-e13-13, 2022.
Fawaz, Hassan Ismail et al., "Accurate and Interpretable Evaluation of Surgical Skills From Kinematic Data Using Fully Convolutional Neural Networks," International Journal of Computer Assisted Radiology and Surgery, vol. 14, pp. 1611-1617, 2019.
Gao, Yixin et al., "JHU-ISI Gesture and Skill Assessment Working Set (Jigsaws): A Surgical Activity Dataset for Human Motion Modeling," MICCAI Workshop, vol. 3, 10 pages, 2014.
Garrec, P. et al., "ABLE, An Innovative Transparent Exoskeleton for the Upper-Limb," IEEE/RSJ International Conference on Intelligent Robots and Systems, pp. 1483-1488, Sep. 22-26, 2008.
Goble, Daniel J., "The Potential for Utilizing Inter-Limb Coupling in the Rehabilitation of Upper Limb Motor Disability Due to Unilateral Brain Injury," Disability and Rehabilitation, vol. 28, No. 18, pp. 1103-1108, Sep. 2006.
Goerres, Gerhard W. et al., "Cerebral Control of Unimanual and Bimanual Movements: An H2 15O PET Study," NeuroReport, vol. 9, No. 16, pp. 3631-3638, Nov. 16, 1998.
Goh, Alvin C. et al., "Global Evaluative Assessment of Robotic Skills: Validation of a Clinical Assessment Tool to Measure Robotic Surgical Skills," The Journal of Urology, vol. 187, pp. 247-252, Jan. 2012.
Guiard, Yves, "Asymmetric Division of Labor in Human Skilled Bimanual Action: The Kinematic Chain as a Model," Journal of Motor Behavior, vol. 19, No. 4, pp. 486-517, 1987.
Held, Jeremia P. et al., "Usability Evaluation of a VibroTactile Feedback System in Stroke Subjects," Frontiers in Bioengineering and Biotechnology, vol. 4, Article 98, 7 pages, Jan. 2017.
Herrnstadt, Gil et al., "Bimanual Elbow Robotic Orthoses: Preliminary Investigations on an Impairment Force-Feedback Rehabilitation Method," Frontiers in Human Neuroscience, vol. 9, Article 169, 14 pages, Mar. 2015.
Hodges, Nicola J. et al., "Learning as a Function of Coordination Bias: Building Upon Pre-Practice Behaviours," Human Movement Science, vol. 21, pp. 231-258, 2002.
Hogan, Neville et al., "Sensitivity of Smoothness Measures to Movement Duration, Amplitude, and Arrests," Journal of Motor Behavior, vol. 41, No. 6, pp. 529-534, 2009.
Hughes, Charmayne M. L. et al., "Interlimb Coordination During a Cooperative Bimanual Object Manipulation Task," Laterality, vol. 18, No. 6, pp. 693-709, Feb. 26, 2013.
IHS Markit Ltd., "The Complexities of Physician Supply and Demand: Projections From 2019 to 2034," Association of American Medical Colleges, 104 pages, Jun. 2021.
Ishmael, Marshall K. et al., "ExoProsthetics: Assisting Above-Knee Amputees With a Lightweight Powered Hip Exoskeleton," IEEE International Conference on Rehabilitation Robotics, pp. 925-930, Jun. 24-28, 2019.
Jantscher, William H. et al., "Toward Improved Surgical Training: Delivering Smoothness Feedback Using Haptic Cues," 2018 IEEE Haptics Symposium, pp. 241-246, Mar. 25-28, 2018.
Kantak, Shailesh et al., "Goal Conceptualization and Symmetry of Arm Movements Affect Bimanual Coordination in Individuals After Stroke," Neuroscience Letters, No. 626, pp. 86-93, May 11, 2016.

(56) References Cited

OTHER PUBLICATIONS

Kapur, Pulkit et al. "Vibrotactile Feedback System for Intuitive Upper-Limb Rehabilitation," Third Joint Eurohaptics Conference and Symposium on Haptic Interfaces for Virtual Environment and Teleoperator Systems, pp. 621-622, Mar. 18-20, 2009.

Katz, D. et al., "Obtaining Confidence Intervals for the Risk Ratio in Cohort Studies," Biometrics, vol. 34, pp. 469-474, Sep. 1978.

Kelso, J. A. Scott et al., "On the Nature of Human Interlimb Coordination," Science, vol. 203, pp. 1029-1031, Mar. 9, 1979.

Kim, Bongsu et al., "An Upper-Body Rehabilitation Exoskeleton Harmony With an Anatomical Shoulder Mechanism: Design, Modeling, Control, and Performance Evaluation," The International Journal of Robotics Research, vol. 36, No. 4, pp. 414-435, 2017.

Kim, Hyunchul et al., "Kinematics Data Analysis for Post-Stroke Patients Following Bilateral Versus Unilateral Rehabilitation With an Upper Limb Wearable Robotic System," IEEE TNSRE, vol. 21, No. 2, pp. 153-164, Mar. 2, 2013.

Klein, Julius et al., "Breaking It Down Is Better: Haptic Decomposition of Complex Movements Aids in Robot-Assisted Motor Learning," IEEE Transactions on Neural Systems and Rehabilitation Engineering, vol. 20, No. 3, 21 pages, May 2012.

Krebs, Franziska et al., "A Bimanual Manipulation Taxonomy," IEEE Robotics and Automation Letters, vol. 7, No. 4, pp. 11031-11038, Oct. 2022.

Kristensson, Per Ola et al., "Continuous Recognition of One-Handed and Two-Handed Gestures Using 3D Full-Body Motion Tracking Sensors," Proceedings of the 17th International Conference on Intelligent User Interfaces, pp. 89-92, Feb. 14-17, 2012.

Kuo, Chin-Hsing et al., "Kinematic Design Considerations for Minimally Invasive Surgical Robots: An Overview," The International Journal of Medical Robotics and Computer Assisted Surgery, vol. 8, pp. 127-145, Jan. 9, 2012.

Lewis, Gwyn N. et al., "An Assessment of Robot-Assisted Bimanual Movements on Upper Limb Motor Coordination Following Stroke," IEEE Transactions on Neural Systems and Rehabilitation Engineering, vol. 17, No. 6, pp. 595-604, Dec. 2009.

\* cited by examiner

ONLINE RECOGNITION OF BIMANUAL COORDINATION TO PROVIDE CONTEXT FOR MOVEMENT DATA IN BIMANUAL TELEOPERATED ROBOTS

CROSS-REFERENCE TO RELATED APPLICATIONS

This application claims priority to U.S. Provisional Patent Application No. 63/358,669 filed on Jul. 6, 2022, which is incorporated herein by reference in its entirety.

STATEMENT OF GOVERNMENTAL SUPPORT

This invention was made with government support under grant numbers UL1TR001105 and R01 EB030125 awarded by the National Center for Advancing Translational Sciences of the National Institutes of Health and grant number 1846726 awarded by the National Science Foundation. The government has certain rights in the invention.

BACKGROUND

People are using robotics more and more to train bimanual and/or bilateral coordinative skills in fields from rehabilitation to surgery. The type of coordination, as determined by a taxonomy, used by operators/trainees directly affects task performance. Given the type of coordination being used, feedback can be applied from a robotic system to improve training and performance. Accordingly, a need exists for techniques and related systems and processes to enable a robotic system to identify an operator's coordination.

SUMMARY

An important problem in designing human-robot systems is the integration of human intent and performance in the robotic control loop, especially during complex tasks. Bimanual coordination is a complex human behavior that is critical in many fine motor tasks, including robot-assisted surgery. To fully leverage the capabilities of the robot as an intelligent and assistive agent, online recognition of bimanual coordination could be important. Robotic assistance for a suturing task, for example, will be fundamentally different during phases when the suture is wrapped around the instrument (i.e., making a c-loop), than when the ends of the suture are pulled apart. In this study, we develop an online recognition method of bimanual coordination modes (i.e., the directions and symmetries of right and left hand movements) using geometric descriptors of hand motion. We (1) develop this framework based on ideal trajectories obtained during virtual 2D bimanual path following tasks performed by human subjects operating Geomagic Touch haptic devices, (2) test the offline recognition accuracy of bimanual direction and symmetry from human subject movement trials, and (3) evaluate how the framework can be used to characterize 3D trajectories of the da Vinci Surgical System's surgeon-side manipulators during bimanual surgical training tasks. In the human subject trials, our geometric bimanual movement classification accuracy was 92.3% for movement direction (i.e., hands moving together, parallel, or away) and 86.0% for symmetry (e.g., mirror or point symmetry). We also show that this approach can be used for online classification of different bimanual coordination modes during needle transfer, making a C loop, and suture pulling gestures on the da Vinci system, with results matching the expected modes. Finally, we discuss how these online estimates are sensitive to task environment factors and surgeon expertise, and thus inspire future work that could leverage adaptive control strategies to enhance user skill during robot-assisted surgery.

Bimanual coordination is a critical feature of human movement that developers of human-operated robotic systems can leverage to improve performance and training. However, the concept of bimanual coordination with regard to human performance and training has remained ill-defined regarding its integration in robotic systems. In this study, we use geometric principles to develop and test a mathematical framework to classify bimanual movements from the coordinated motion of two similar actors. We base the classification on descriptors of coordination that are found in prior human motor control literature. Classes include motion sequence, scaling, number of targets, direction, and symmetry. Features of this classification problem, such as the effects of motion scaling on the classification of direction and overlap of symmetry subclasses, are quantified to evaluate its well-posedness. We also discretize the approach for application to sampled, kinematic data from robotic systems and noisy bimanual movements. For example, we employ a modified Procrustes analysis to determine movement symmetry. Accessible scalar metrics, which can be computed in real-time, are used to estimate class membership. In addition, thresholds based on statistical theory are discussed for discrete classification. We first test the approach by demonstrating high classification accuracy with data from 2D bimanual trajectory following experiments performed by human subjects. Finally, we apply the method to a set of 3D tasks, namely a robotic surgical training data set, to showcase the applicability of our framework to complex, goal-oriented, and precise bimanual tasks. A formal geometric framework and associated statistical methods can accurately and quickly classify bimanual coordination according to the online kinematics of a human-operator in a robotic system.

Haptic feedback can enhance training and performance of human operators; however, the design of haptic feedback for bimanual coordination in robot-assisted tasks (e.g., control of surgical robots) remains an open problem. In this study, we present four bimanually-dependent haptic force feedback conditions aimed at shaping bimanual movement according to geometric characteristics: the number of targets, direction, and symmetry. Haptic conditions include a virtual spring, damper, combination spring-damper, and dual springs placed between the hands. We evaluate the effects of these haptic conditions on trajectory shape, smoothness, and speed. We hypothesized that for subjects who perform worse with no haptic feedback (1) a spring will improve the shape of parallel trajectories, (2) a damper will improve the shape of point symmetric trajectories, (3) dual springs will improve the shape of trajectories with one target, and (4) a damper will improve smoothness for all trajectories. Hypotheses (1) and (2) were statistically supported at the $p<0.001$ level, but hypotheses (3) and (4) were not supported. Moreover, bimanually-dependent haptic feedback tended to improve shape accuracy for movements that subjects performed worse on under no haptic condition. Thus, bimanual haptic feedback based on geometric trajectory characteristics shows promise to improve performance in robot-assisted motor tasks.

It is imperative for robotic surgeons to complete fundamental psychomotor skill training before advancing to practice more realistic procedures. During training, trainees must learn to utilize both hands in a simultaneous manner to complete tasks efficiently and reach proficiency. To more rapidly reach a desired skill level for bimanual coordination, we may target trainee feedback with robotic induced haptic forces. In this work, we coached 10 subjects through a fundamental surgical training task, peg transfer, in a single day session lasting 1.5 hours. We split subjects into a control group and a haptic group. The haptic group experienced robotic force feedback, a virtual spring placed between the hands, while training. The feedback was onset when two kinematic, scalar features of movement based on sequence and relative direction of the hands exceeded thresholds. We measured performance by a main score that is highly similar to a tested proficiency standard, which reflects temporal efficiency and task errors (i.e., drops). We also computed two supplementary performance metrics to assess changes in motor performance that may effect the main score. One metric reflects simultaneous bimanual action, and the other reflects movement efficiency. Baseline scores showed no difference between groups, and both groups showed significant improvement after training. However, the haptic group had better scores than the control group at post-test (p=0.008). Also, only the haptic group significantly improved in simultaneous bimanual action (p<0.001) and neither group improved in movement efficiency. Thus, we conclude that augmented haptic forces, if based on the bimanual coordination of a trainee, may promote simultaneous use of both hands and improve proficiency in psychomotor tasks.

A first aspect of the disclosure provides a method for online recognition of bimanual or bipedal movement coordination modes directed to completing a bimanual or bipedal motor task using a robotic system and including combinations of direction and symmetry. The method includes the step of determining an onset of a segment of bimanual or bipedal motion of a subject operating the robotic system in a workspace. The method includes the step of, in response to determining the onset of the segment, receiving, from a position sensor, data representative of trajectories of: a left hand and a right hand of the subject, or a left foot and a right foot of the subject. The data representative of trajectories includes: a first set of time ordered points defining a first discrete trajectory of the left hand or the left foot of the subject, and a second set of time ordered points defining a second discrete trajectory of the right hand or the right foot of the subject. The method includes the step of computing, based on the data representative of trajectories, geometric descriptors of the segment. The method step of computing geometric descriptors includes the steps of: first computing a direction metric that describes a type of direction for the segment, and after the first computing, second computing a symmetry metric that describes a type of symmetry for the segment. The method includes the step of classifying, based on the direction metric, the type of direction for the segment. The method includes the step of classifying, based on the symmetry metric, the type of symmetry for the segment. The method includes at least one of the steps of: generating, based on the type of direction and the type of symmetry, data representative of feedback to the subject or to another user of the robotic system pertaining to performance of the task using the robotic system; and controlling, based on the type of direction and the type of symmetry, the robotic system to facilitate improving performance, or training, of the subject for the task using the robotic system.

A second aspect of the disclosure provides a system for online recognition of bimanual or bipedal movement coordination modes directed to completing a bimanual or bipedal motor task using a robotic system and including combinations of direction and symmetry. The system includes at least one processor operably couplable to the robotic system and to a position sensor. The at least one processor is configured to determine an onset of a segment of bimanual or bipedal motion of a subject operating the robotic system in a workspace. The at least one processor is configured to in response to the onset of the segment being determined, receive, from the position sensor, data representative of trajectories of: a left hand and a right hand of the subject, or a left foot and a right foot of the subject. The data representative of trajectories includes: a first set of time ordered points defining a first discrete trajectory of the left hand or the left foot of the subject, and a second set of time ordered points defining a second discrete trajectory of the right hand or the right foot of the subject. The at least one processor is configured to compute, based on the data representative of trajectories, geometric descriptors of the segment. To compute the geometric descriptors, the at least one processor is further configured to: first compute a direction metric that describes a type of direction for the segment, and after the direction metric is first computed, second compute a symmetry metric that describes a type of symmetry for the segment. The at least one processor is configured to classify, based on the direction metric, the type of direction for the segment. The at least one processor is configured to classify, based on the symmetry metric, the type of symmetry for the segment. The at least one processor is configured to at least one of: generate, based on the type of direction and the type of symmetry, data representative of feedback to the subject or to another user of the robotic system pertaining to performance of the task using the robotic system; and control, based on the type of direction and the type of symmetry, the robotic system to facilitate improving performance, or training, of the subject for the task using the robotic system.

A third aspect of the disclosure provides one or more non-transitory computer readable media having stored thereon program instructions which, when executed by at least one processor, cause a machine to determine an onset of a segment of bimanual or bipedal motion of a subject operating a robotic system in a workspace. When executed by the at least one processor, the program instructions cause the machine to, in response to the onset of the segment being determined, receive, from a position sensor, data representative of trajectories of: a left hand and a right hand of the subject, or a left foot and a right foot of the subject. The data representative of trajectories includes: a first set of time ordered points defining a first discrete trajectory of the left hand or the left foot of the subject, and a second set of time ordered points defining a second discrete trajectory of the right hand or the right foot of the subject. When executed by the at least one processor, the program instructions cause the machine to compute, based on the data representative of trajectories, geometric descriptors of the segment. When executed to compute the geometric descriptors, the program instructions further cause the machine to first compute a direction metric that describes a type of direction for the segment, and after the direction metric is first computed, second compute a symmetry metric that describes a type of symmetry for the segment. When executed by the at least one processor, the program instructions cause the machine to classify, based on the direction metric, the type of direction for the segment. When executed by the at least one processor, the program instructions cause the machine to classify, based on the symmetry metric, the type of symmetry for the segment. When executed by the at least one processor, the program instructions cause the machine to at least one of: generate, based on the type of direction and the type of symmetry, data representative of feedback to the subject or to another user of the robotic system pertaining to performance of the task using the robotic system; and control, based on the type of direction and the type of symmetry, the robotic system to facilitate improving performance, or training, of the subject for the task using the robotic system.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

In this disclosure, references to various sources, which are numbered in single brackets "[ ]", are made using the corresponding number in the single brackets, in the same manner as those sources are listed below under "REFERENCES." Each of those listed references, and any other not specifically listed, are incorporated herein by reference in their entirety.

BRIEF DESCRIPTION OF THE DRAWINGS

Embodiments of the present technology will be described and explained through the use of the accompanying drawings.

In FIGS. 13B and 13D, confusion matrices for classification accuracy of direction type for using an adaptive threshold based on equation 13 for all scaling sizes and a maximum movement scaling of 1.5.

Figure 1:
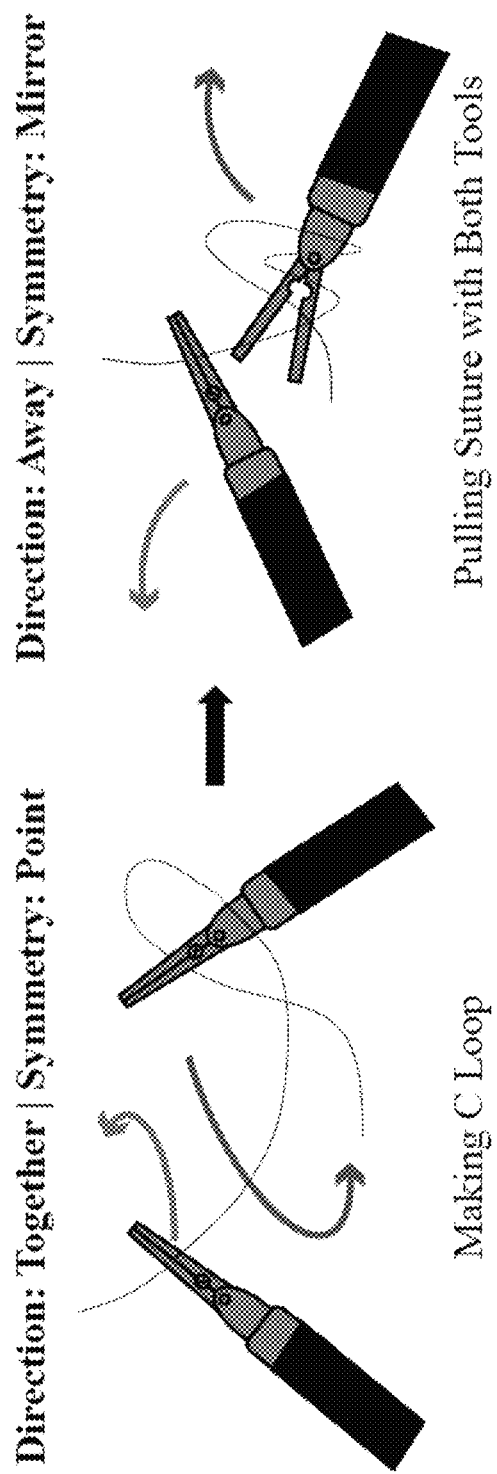
FIG. 1 depicts an example of bimanual tasks performed by a robot for surgical knot tying.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

As will become apparent to persons skilled in the art, the disclosed examples and embodiments are not merely process steps capable of being performed using generic computing devices, but which could entirely be performed mentally or otherwise by a human being, including with the aid of pen and paper. Rather, in some embodiments or example according to the present technology, the unique algorithms described herein are required to be encoded in software (or firmware) instructions to direct (e.g., "cause") the physical actions of the various computing, communications and data storage devices in a manner believed to be as yet unknown in the pertinent technological field. These physical effects and actions include, without limitation, changes in the physical state of discrete components of memory storage devices and transmission of encoded data as signals over wired or wireless communication channels, both within one particular computing device and over great distances over spans of the Earth or outer space. The described algorithms direct data to be stored according to received data inputs of the data owners via graphical user interfaces that are transmitted to, or otherwise caused to be displayed on, user devices like personal computers and smartphones in communication with remote servers, via the Internet, for example. All of these actions, and numerous others that are described herein, are performed by physical computing and communication devices, as directed by the disclosed algorithms. Furthermore, the physical actions or effects which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device and a time that result becomes available for a subsequent computation by a second networked computing device may be limited only by a transmission time required by the physical medium of the wired, optical or wireless network connecting the first and second computing devices. A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

Example 1

I. Introduction

To fully capitalize on recent advances in robot sensing and control in teleoperated or wearable robotic systems, there is a critical need for effective methods to model the human as part of the collective co-robotic system. A key part of modeling a human operator is predicting operator intent and quantifying how the operator is using the system. Online prediction of these characteristics would enable new methods to enhance user performance during robot use. In addition, the use of robotic systems that are bimanual (i.e., allowing for the human to use both left and right hands to operate the system), pose a considerable challenge to filling this gap in knowledge. There are several important examples of bimanual robots including rehabilitation devices, such as exoskeletons and manipulandums, intended to enhance or retrain individuals to a level of motor function necessary for activities of daily living (ADL). Surgical robots also require highly complex bimanual skills to perform surgical tasks safely and effectively. Accurately modeling surgeon bimanual coordination in robotic surgery is critical for skill assessment and especially important when developing objective credentialing protocols (e.g., surgical residency programs, clinical adoption of new robotic techniques, etc.) [1]-[6].

FIG. 1 depicts an example of bimanual tasks performed by a robot for surgical knot tying. Bimanual tasks, such as surgical knot tying, are composed of many distinct motions for each hand. For example, looping suture requires hands moving together with point symmetry, while pulling suture to form a knot requires hands moving apart in a mirrored fashion. Integrating recognition of these bimanual coordination modes could improve the design of assistive teleoperated robots.

In the literature, human movement for a task is often decomposed into subtasks, sometimes called gestures or "movemes". For example, in a drawing exercise, unimanual movements were segmented and classified into three movemes as reaching, drawing, or circling [7]. In another study, three different surgical tasks (knot tying, needle passing, and suturing) recorded in the JHU-ISI Gesture and Skill Assessment Working Set (JIGSAWS) were decomposed into 15 distinct gestures noted as "surgemes" [8]-[11]. These decomposition methods have been used to automate gesture recognition using predictive models like Continuous Hidden Markov Models, Gaussian Mixture Models, and various machine learning models [12]-[14]. With these predictive models, when a prior subtask is recognized, the current subtask can be more easily predicted and a device designer has the ability to provide augmented feedback to the user.

There is a tremendous body of work devoted to the analysis of data for the purpose of skill evaluation as it relates to surgical tasks and gestures [15]. While the ability to reliably, automatically, and objectively evaluate skill is invaluable, many methods offer little to no analysis beyond a rating of skill. This is a caveat of what is sometimes referred to as a "black box" approach, especially when regarding machine learning methods. There has been a recent push to include information that would be meaningful for a trainee in order to improve performance. Such information could enhance training, feedback, and assistance if leveraged properly. One study highlights portions of a task that contribute most to the skill evaluation [16]. Another study uses semantic labels to quantify surgical style [17].

From a different perspective, researchers studying motor control have long produced studies with respect to assessing human movement [18], [19]. In the case of bimanual motion, many of these studies decompose movements into somewhat subjective spatio-temporal classifications [20]. This type of classification can be used across all bimanual tasks and is not dependent on the task performer. These studies have influenced many other studies on rehabilitation and athletics that seek to determine optimal training methods [21]. More recently, robotics, like upper limb exoskeletons, have been used to aid these training efforts [22], [23]. However, the ambiguity of definitions in prior literature and across disciplines hinders the advancement of tools for assessment and assistance of bimanual coordination training [20]. Also, no method for online recognition of spatial bimanual coordination modalities currently exists, to the best of our knowledge. Such a method is necessary to better design teleoperated robots for safe and effective bimanual control.

To bridge the gap between human movement and motor control fields of research and robotics, the purpose of our study was to 1) develop an online recognition method of bimanual coordination modes (i.e., bimanual direction and symmetry) using geometric descriptors based on cursor trajectories obtained during virtual 2D bimanual path following tasks completed by humans operating Geomagic Touch haptic devices, 2) test offline recognition accuracy of bimanual direction and symmetry during these trials, and 3) compare how the framework transfers to 3D trajectories of the da Vinci Surgical System's end-effectors during bimanual robot-assisted surgical-training tasks. These goals were performed to enable innovative robotic systems that are capable of providing online feedback to the human operator during a task. We feel an important contribution of the current study is the technique used for recognition of bimanual human movement using a geometric characterization that can be implemented in real-time in a bimanual robotic system to distinguish between a variety of specific coordination modes. As noted, while many options exist for the classification of bimanual movements, we focus on types of direction (i.e., hands moving together, in parallel, or away from each other), and types of symmetry (e.g., mirrored, point symmetry, not symmetric, etc.), and base this recognition purely on geometrical properties of left and right bimanual motion.

TABLE I

Notation for Recognition of Bimanual Coordination Modes

| Notation | Definition |
| --- | --- |
| L, R | related to left or right hand, respectively |
| f | bimanual coordination metric |
| T | classification threshold |
| Dir | related to bimanual direction modality |
| Sym | related to bimanual symmetry modality |
| Mir | related to mirror symmetry |
| Pt | related to point symmetry |
| Vis | related to visual symmetry |
| $\tau_k$ | $k^{th}$ time parameter of movement from 0 to 1 |
| M | onset of classification prediction |

II. Methods

A. Definitions of Bimanual Coordination

Bimanual movements are discrete trajectories from one position to another involving both hands. These trajectories are described by two sets of ordered points in Cartesian space, one for left and right hand each.

$$X_L = \{(x_{l_1}, y_{l_1}, z_{l_1}), (x_{l_2}, y_{l_2}, z_{l_2}), \ldots, (x_{l_{n_l}}, y_{l_{n_l}}, z_{l_{n_l}})\} \quad (1)$$

$$X_R = \{(x_{r_1}, y_{r_1}, z_{r_1}), (x_{r_2}, y_{r_2}, z_{r_2}), \ldots, (x_{r_{n_r}}, y_{r_{n_r}}, z_{r_{n_r}})\}$$

Due to the variance in trajectory lengths and density of sampled points along trajectories of bimanual movements, paths must be normalized to ensure an unbiased analysis. We accomplish this by interpolating the sampled point sets to create equally spaced points $p_i j$ arranged as row vectors in matrices, $C_L$ and $C_R$, of length, n.

$$C_i = \begin{bmatrix} p_{i_1} \\ p_{i_2} \\ \vdots \\ p_{i_n} \end{bmatrix}, i = L, R: \quad (2)$$

The choice of n and point spacing will affect the analysis of the movements, so they should be chosen based on workspace size, position sensor resolution, and number of sampled points. Using these normalized sets of ordered points, the segments of bimanual movements may further be analyzed using following characteristics.

1) Direction: Types of direction for a bimanual movement include moving together (→←), parallel (→→), or away (←→). The type of direction of a discrete bimanual movement can be distinguished by the Euclidean distance between successive points as denoted by $f_{Dir}$.

$$d_j = \|p_{l_j} - p_{r_j}\|_2 \quad (3)$$

$$f_{Dir} = d_j - d_{j1} \quad (4)$$

If the Euclidean distance of successive points is monotonically decreasing, the direction is together; if it is monotonically increasing, the direction is away; and if the distance remains constant, the direction is parallel. Note that a movement may change direction during its execution.

Figure 2:
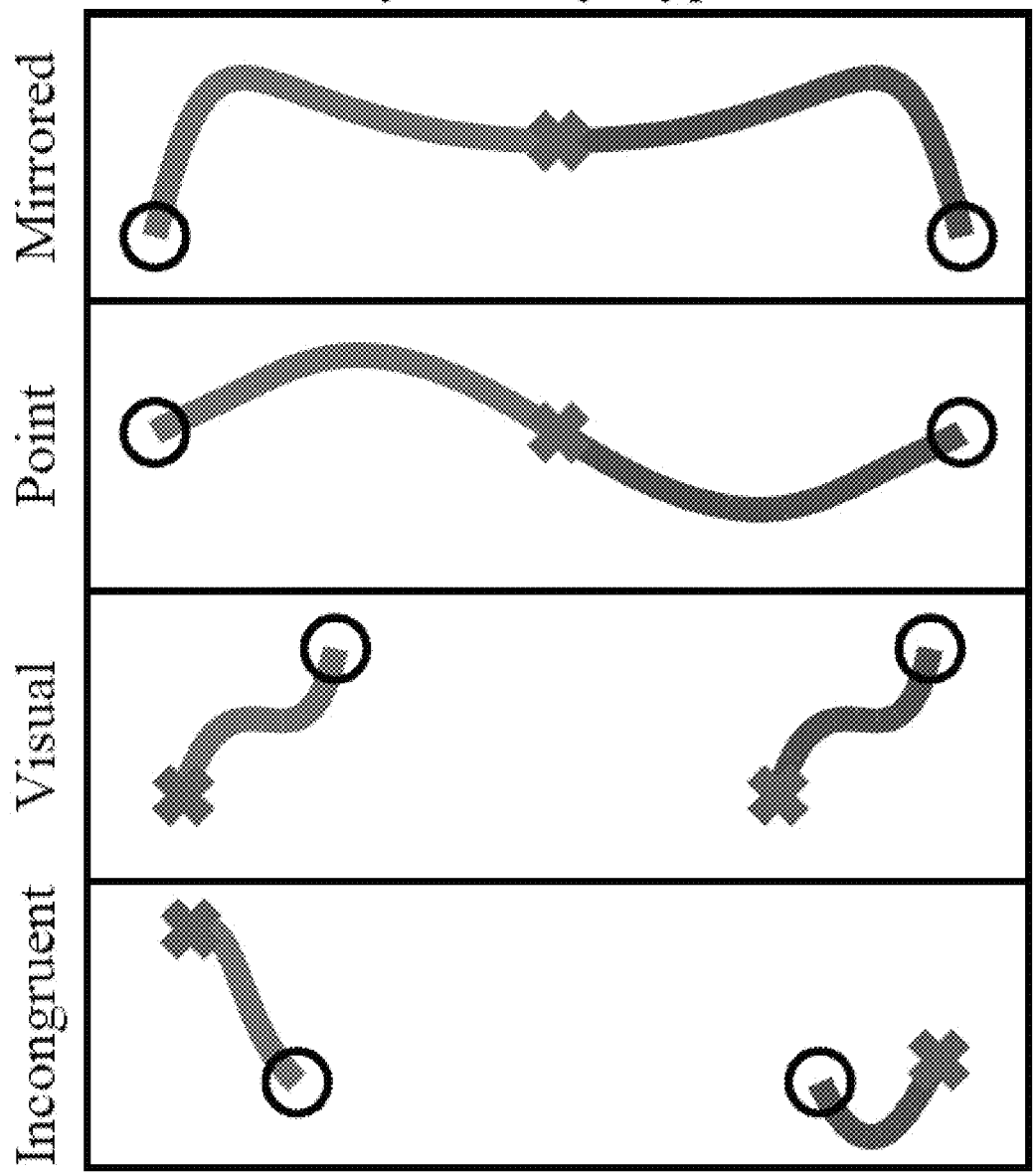
FIG. 2 depicts examples of types of symmetry of 2D bimanual movements, including mirrored, point, visual, and incongruent.

Symmetry: Symmetry of a bimanual movement may be described as mirror symmetric, point symmetric, visual symmetric, or incongruent. FIG. 2 depicts examples of types of symmetry of 2D bimanual movements, including mirrored, point, visual, and incongruent. Symmetry of bimanual movements requires point to point comparison of the right and left hand point sets because in the ideal cases of symmetry, one set of points can be equal to a scaled, translated, or rotated equivalent of the other set, $$C_L = bC_R Q + v \quad (5)$$

In equation 5, b is a scaling factor, Q is an orthogonal reflection and rotation matrix, and v is a translational component. Types of symmetry are discerned by rotation and reflection component Q. Mirror symmetry is a Householder reflection, so $Q = I - 2qq^T$ where $\|q\| = 1$. Point symmetry is defined by a point reflection, $Q = I$. Visual symmetry is simply a translation of one point set to another with no rotation, $Q = I$. Finally, incongruent bimanual movements are those such that no transformation described by Eqn. 5.

Combinations of types of direction and symmetry are referred to hereafter as bimanual motion modes. Particular bimanual motion modes are impossible due to definition constraints. This includes unit scaled movement with visual symmetry and direction type together or away. By definition, $$C_L = C_R + v \quad (6)$$

therefore, $$d_j = \|p_{l_j} - p_{r_j}\| = v \,\forall j \quad (7)$$

$$f_{Dir_j} = d_j - d_{j1} = 0 \quad (8)$$

Thus, we can use the direction of a movement to help identify its symmetry.

B. Bimanual Coordination Recognition

1) Problem Statement: For the purposes of recognizing coordination in human movement data, we must consider a noisy version of the point matrices, $$\tilde{C}_i = C_i + w_i \quad (9)$$

where $w_i$ is a noise matrix and $C_i$ is the underlying movement with ideal direction and symmetry types. Due to the additive noise, evaluation of $f_{Dir}$ requires a hysteresis band, $(-T_{Dir}, +T_{Dir})$, to discern the types of direction. The threshold $T_{Dir}$ is chosen in accordance with the work space and number of sampled points. For sections or the entirety of a movement, the median of $f_{Dir}$ is taken.

In order to predict types of symmetry of human bimanual movements, we use a modified Procrustes analysis. Procrustes analysis uses minimization techniques to determine the best transformation from one point set to another via the following equation [24].

$$\min_{b,Q,v} \|\tilde{C}_L - b\tilde{C}_R Q + v\|_F \quad (10)$$

Equation 10 may return any fitting orthogonal Q. However, we are interested in specific forms of symmetry, so our modified version limits Q to three options defined by the types of symmetry. Also, since our only concern is Q, we can reduce Eqn. 10 further.

$$f_{Sym} = \min_Q \|\tilde{C}_{0L} - \tilde{C}_{0R} Q\|_F : Q = I, -I, I - 2qq^T \|q\| = 1 \quad (11)$$

In the above, point sets have been normalized to be zero mean with a norm of one, i.e. $\|C_0\|_F = 1$. Equation 11 produces a scalar, which we label $f_{Sym}$, that may be thought of as a goodness-of-fit measure for the respective transformation. For ideal cases of symmetry, $f_{Sym}$ is zero, and incongruent bimanual trajectories will have $f_{Sym}$ with range (0, 2]. From this we can discern the type of symmetry from given movement data.

Due to the minimization, in non-ideal cases of bimanual symmetry as measured from human generated trajectories, $f_{Sym}$ tends to be minimized with mirror symmetry ($Q = I - 2qq^T$) regardless of the underlying symmetry. We can model the problem as follows, $$f_{Sym} = \min_Q \|C_{0L} - C_{0R} Q + w\|_F \quad (12)$$

where we have grouped the left and right noise terms, leaving underlying symmetric point matrices $C_{0L}$ and $C_{0R}$. If the problem is split relative to the types of symmetry, $$f_{Mir} = \min_q \|\tilde{C}_{0L} - \tilde{C}_{0R}(I - 2qq^T)\|_F : \|q\| = 1 \quad (13)$$

$$f_{Pt} = \|\tilde{C}_{0R} + \tilde{C}_{0L}\|_F \quad (14)$$

$$f_{Vis} = \|\tilde{C}_{0R} - \tilde{C}_{0L}\|_F \quad (15)$$

we can see that extracting the noise term from $C_{0L}$, $C_{0R}$, and minimization variable q in Eqn. 13 is not possible. Thus, the noise is included in computing a minimal $f_{Mir}$. If we assume that there exists underlying symmetry in $C_{0L}$ and $C_{0R}$, then Eqn. 13 can be reduced to $$f_{Mir} = \sqrt{2 - 2tr(\tilde{C}_{0L}^T \tilde{C}_{0R}) + 4\min_q q^T \tilde{C}_{0L}^T \tilde{C}_{0R} q} \quad (16)$$

The solution to Eqn. 16 becomes a well-known quadratic minimization problem with the solution related to the minimum eigenvalue of $\frac{1}{2}(\tilde{C}_{0L}^T \tilde{C}_{0R} + \tilde{C}_{0R}^T \tilde{C}_{0L})$. For 2-dimensional point sets, $$f_{Mir} = 2(1 - \lambda_{max} + \lambda_{min}) \quad (17)$$

where $\lambda_{max}$ and $\lambda_{min}$ are the maximum and minimum eigenvalues of $\frac{1}{2}(\tilde{C}_{0L}^T \tilde{C}_{0R} + \tilde{C}_{0R}^T \tilde{C}_{0L})$. As movements of non-mirror type symmetry become more linear, this measure diminishes, which becomes a problem when trying to distinguish between mirror symmetric movements and non-mirror symmetric movements. Therefore, we must filter out cases of point and visual symmetry first.

For movements that are not point symmetric, $f_{Pt}$ tends toward 2. For example, take a visual symmetric movement with negligible noise, i.e. $C_{0L} = C_{0R}$.

$$f_{Pt} = \|2C_{0R}\|_F = 2\|C_{0R}\|_F = 2 \quad (18)$$

The same occurs for movements that tend away from an underlying visual symmetry and $f_{Vis}$. However, due to noise, we need to determine what the expected value of $f_{Pt}$ and $f_{Vis}$ are when the underlying symmetry is point and visual, respectively. By assuming the underlying symmetry is either point or visual, we can compute the expected value for $f_{Pt}$ and $f_{Vis}$ to be $$E[f_{Sym}] = E[\|w\|_F] = E[\sqrt{\text{trace}(ww^T)}] \quad (19)$$

Assuming w is populated by i.i.d. zero-mean normal random variables with variance $\sigma_w^2$ means that $f_{Sym}$ for underlying symmetry types point and visual is a Chi-distributed random variable with mean $\mu = \sigma_w \sqrt{2} \Gamma((np+1)/\Gamma(np/2)$ and variance $\sigma^2 = \sigma^2 np - \mu^2$. Here, the mean and variance are dependent on the gamma function with degrees of freedom np, such that n is the number of points and p is the dimension. Over the course of a trajectory np grows to be quite large, so we can use Sterling's approximation to estimate the mean as $$\mu \approx \sigma_w \sqrt{np - 1}\left(1 - \frac{1}{4np}\right) \quad (20)$$

and the variance as $$\sigma^2 \approx \sigma_w^2 \frac{(np-1)}{2np} \quad (21)$$

Just as with direction, we create thresholds, $T_{P_t}$ and $T_{V\ is}$ to choose the classification. First, we normalize the symmetry metric by dividing by $$\sqrt{np-1}\left(1 - \frac{1}{4np}\right).$$

Then, we choose thresholds based on the approximated mean and variance for samples of a given task.

After filtering out point and visual symmetries, we need to distinguish between mirror symmetric and incongruent movements. The expected value and variance for $f_{Mir}$ assuming a mirrored movement are far more complex because of the minimization. Thus, it is more convenient to take a similar approach to that of point and visual symmetries. Therefore, we similarly normalize $f_{Mir}$ by dimension and number of points and choose $T_{Mir}$ from the mean and variation of a sample of movements.

Figure 3:
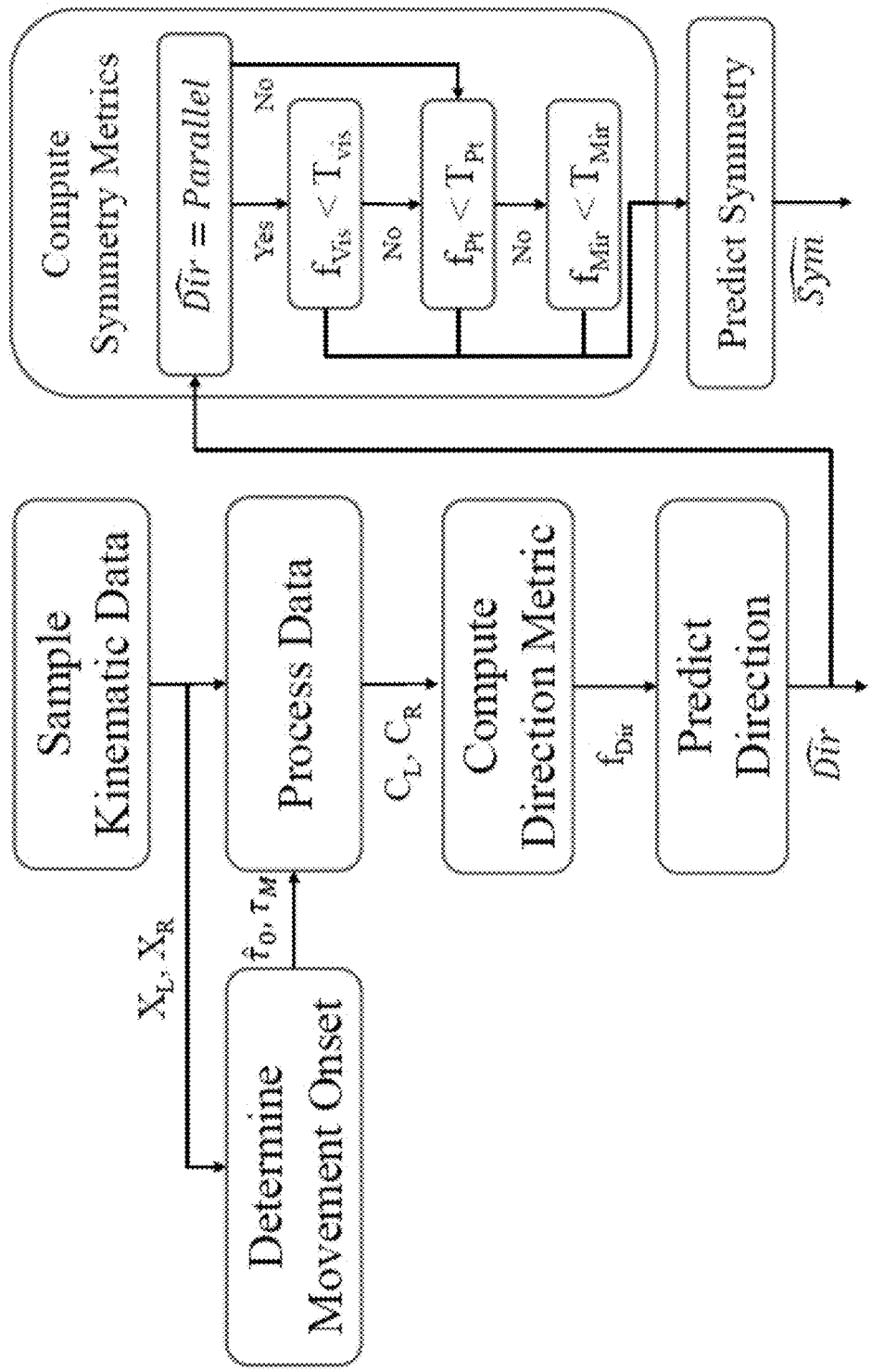
FIG. 3 depicts a decision flow diagram for predicting bimanual coordination modes with respect to direction and symmetry.

2) Decision Flow: From the definitions, metrics, and subsequent properties of the proposed method, we can devise an sequence to optimally distinguish bimanual coordination modes. FIG. 3 depicts a decision flow diagram for predicting bimanual coordination modes with respect to direction and symmetry. First, sampled position data is parsed for movement onset. Then, it is filtered and sorted into equidistant point matrices. Point sets may also be centered and normalized at this time. Next, the metric for type of direction is computed, and the type of direction is estimated. Then, depending on the type of direction, symmetry metrics are computed. Finally, the type of symmetry is estimated based on the normalized symmetry metric.

Note that for this framework to be implemented online, a minimum of three sampled data points is required and the complexity is $O(p^3)$ due to the calculation of eigenvalues. If we limit p to a small number of dimensions, as is often the case, the complexity becomes $O(n)$. For reasonable values of n, modern systems are capable of computing these metrics in near-real time.

C. Experimental Data

The data used for validation in this study consists of 1150 unique trajectories from a 2D data set as recorded during a bimanual path following experiment that includes 11 subjects [25]. Subjects followed pre-determined paths generated in accordance to the different types of bimanual movement coordination modes. Position data were recorded at 500 Hz. For this set, used a moving average filter with window of 0.05 seconds. In this set there is an ideal path (objective ground truth) from which we can determine noise variance $\sigma_w$ and choose optimal thresholds. Trials with $f_{Sym}$ greater than three scaled median absolute deviation from the median of trials with the same ground truth symmetry were removed as outliers. Trials with ground truth incongruent symmetry such that the ideal trajectory had $f_{Sym}$ less than the chosen symmetry thresholds were also removed. The direction threshold band for this set was chosen as $T_{Dir}=\pm 0.15$ mm. Symmetry thresholds were chosen as $T_{Mir}=0.0096$, $T_{P_t}=0.00125$ of, and $T_{Mir}=0.00141$. These thresholds were chosen using statistical methods. Accuracy was calculated on a per trial basis comparing the predicted bimanual coordination mode to the ground truth of the ideal trajectory.

We used a second 3D data set to prove the applicability and importance of this method. This data set is known as JIGSAWS, and which includes examples of 3 realistic surgical gestures, transferring needle (n=173), making C loop (n=53), and pulling suture (n=61), from 8 subjects [10], [11]. Gestures were grouped to analyze their relation to bimanual motion modes. Each segment of a gesture was trimmed and split automatically into instances of bimanual motion using a precise movement onset detection method [26]. Only bimanual movements where both hands were moving simultaneously were included. This set's position data were recorded at 30 Hz. For this set, we tuned the moving average filter window to 0.1 seconds and $T_{Dir}$ to ±0.1 mm. The symmetry thresholds were set at $T_{Sym}=T_{Mir}=T_{P_t}=T_{V\ is}=0.06$. These thresholds were chosen through generalization of the 2D case to 3D and hand tuning, however, the mathematical framework did not change. Generalization was done by normalizing the computed symmetry metrics with respect to number of points and dimension, as noted previously. Hand tuning was done by viewing the distributions, similar to FIG. 4 (discussed below), for samples of select gestures. This is a recognized limitation of this study.

III. Results

Figure 4A:
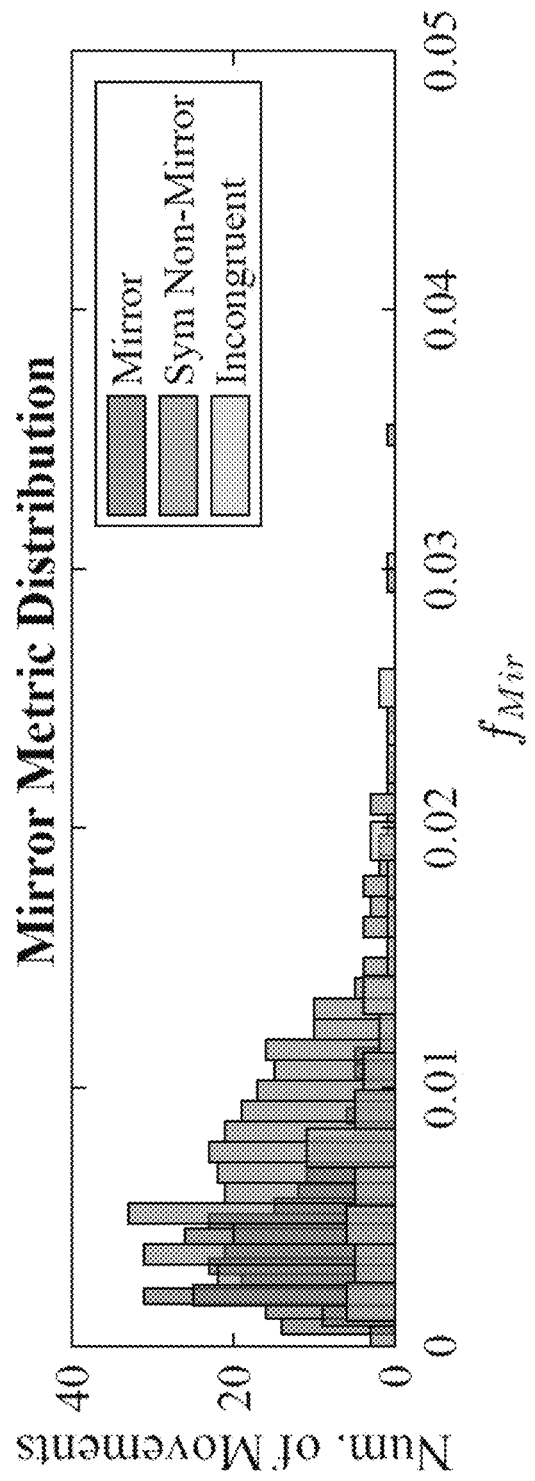
FIGS. 4A-4C depict the distribution of $F_{Sym}$ as computed from movements of the 2D bimanual path following task split such that movements with the true underlying symmetry are grouped in blue bins.
Figure 4B:
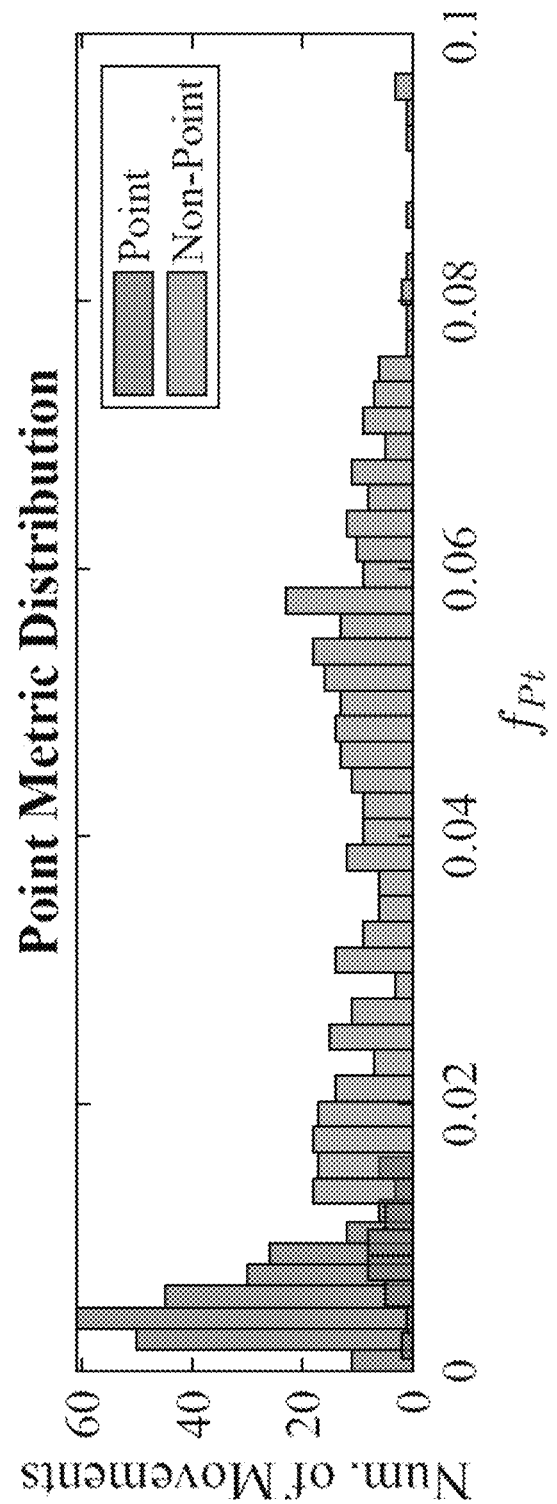
Figure 4C:
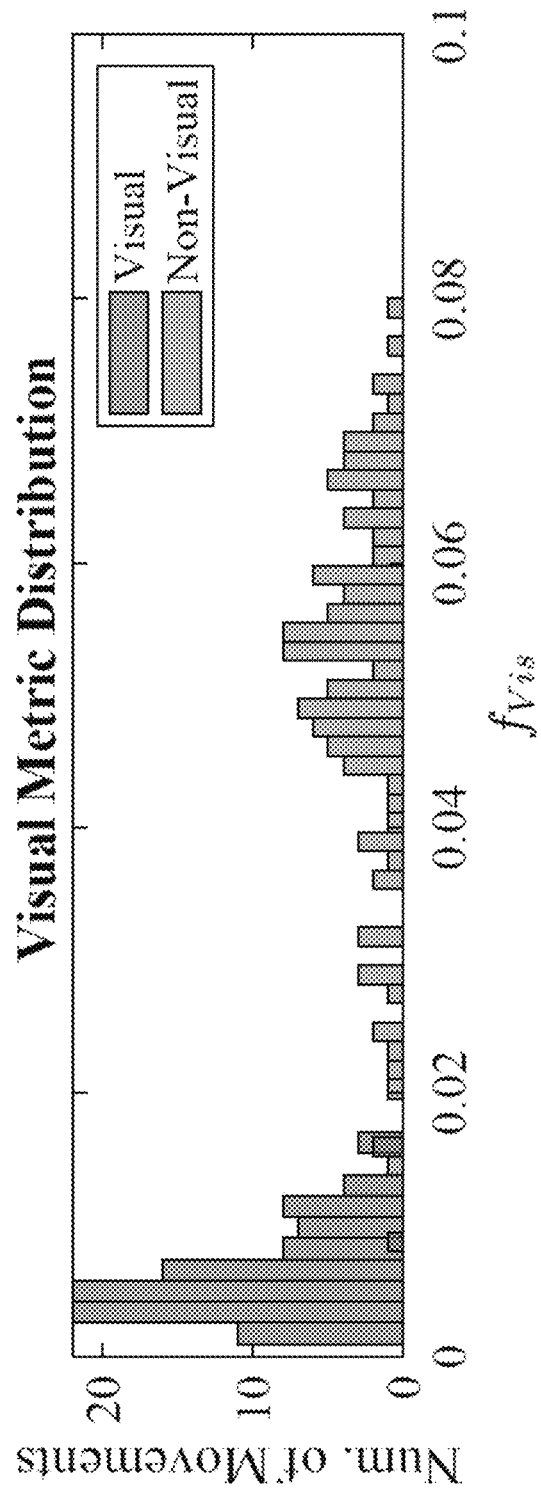

For the 2D path following task, trials took a mean time of 1.501 seconds and a median time of 1.418 seconds to complete. Computed symmetry metrics yielded distributions of $f_{Sym}$ as shown in FIG. 4. FIGS. 4A-4C depict the distribution of $F_{Sym}$ as computed from movements of the 2D bimanual path following task split such that movements with the true underlying symmetry are grouped in blue bins. (a) demonstrates how movements with underlying point and visual symmetry need to be tested for first because the calculation of $f_{Mir}$ for all symmetry types is minimized so they become indistinguishable. In (b) and there is clear distinction between movements with underlying point and visual symmetry and other symmetries or incongruent movements for $f_{P_t}$ and $f_{V\ is}$.

Figure 5A:
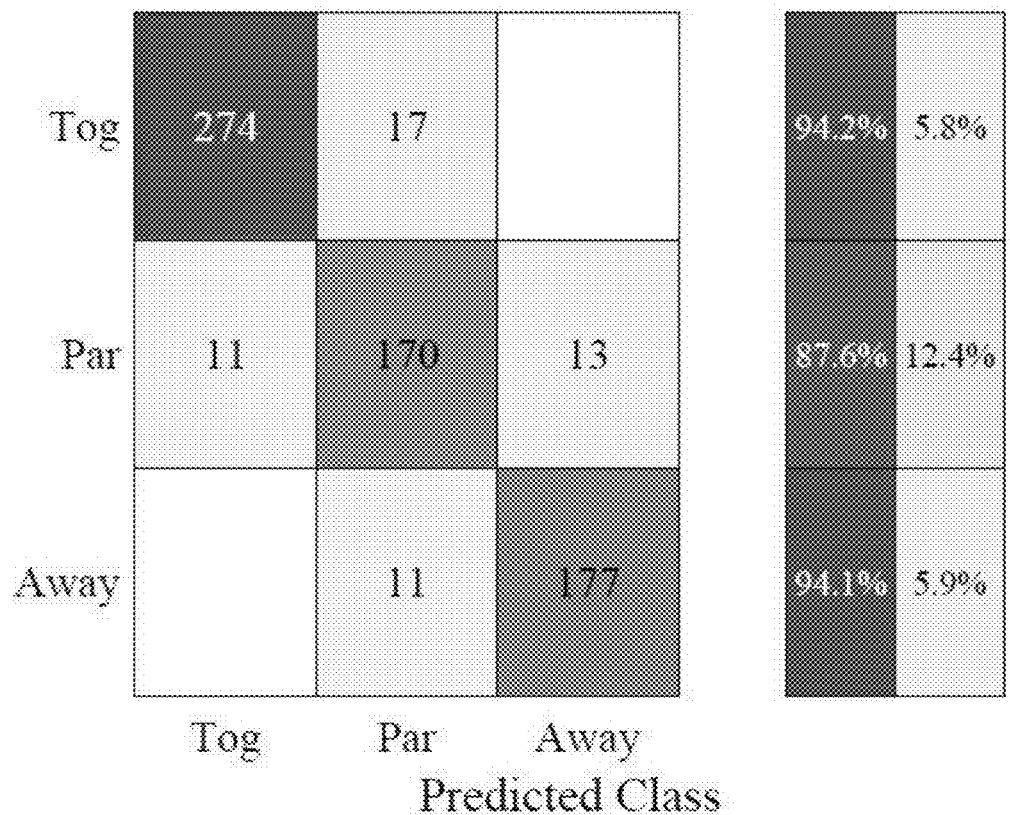
FIGS. 5A and 5B depict confusion matrices for bimanual coordination mode prediction.
Figure 5B:
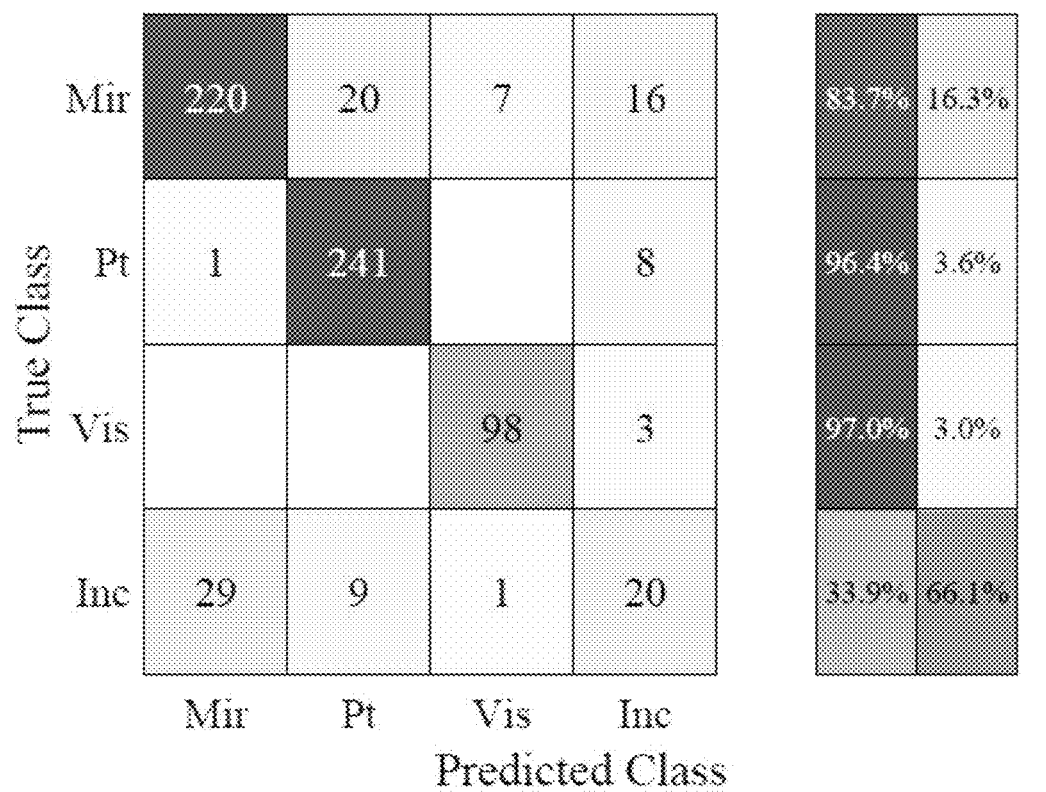
Figure 6A:
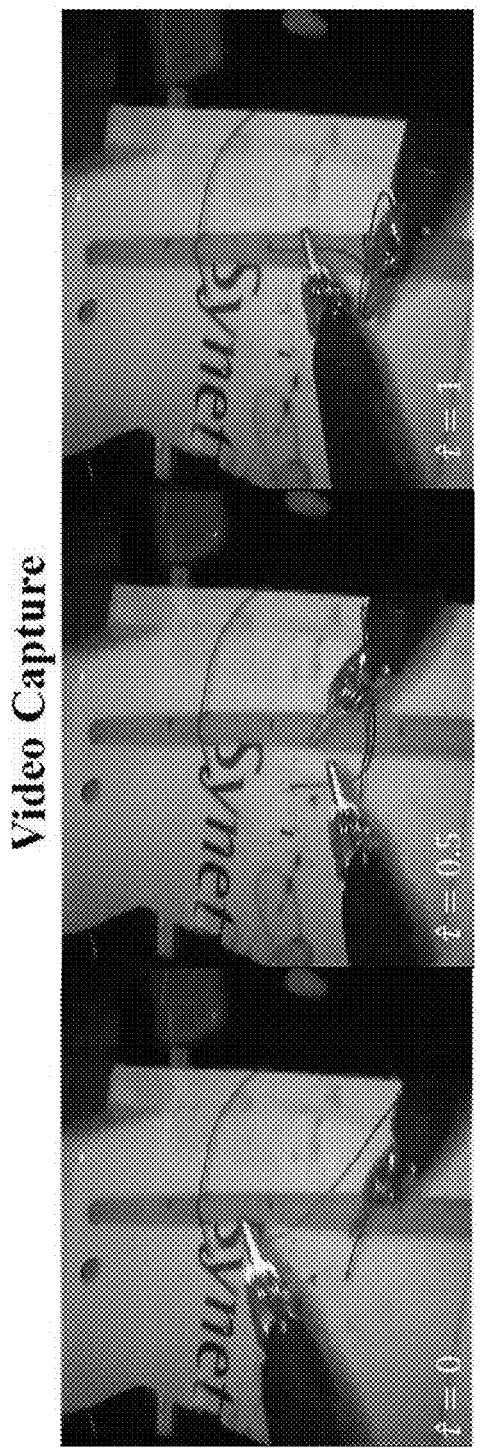
FIGS. 6A-6D depict bimanual coordination mode recognition for an instance of making a C loop.
Figure 6B:
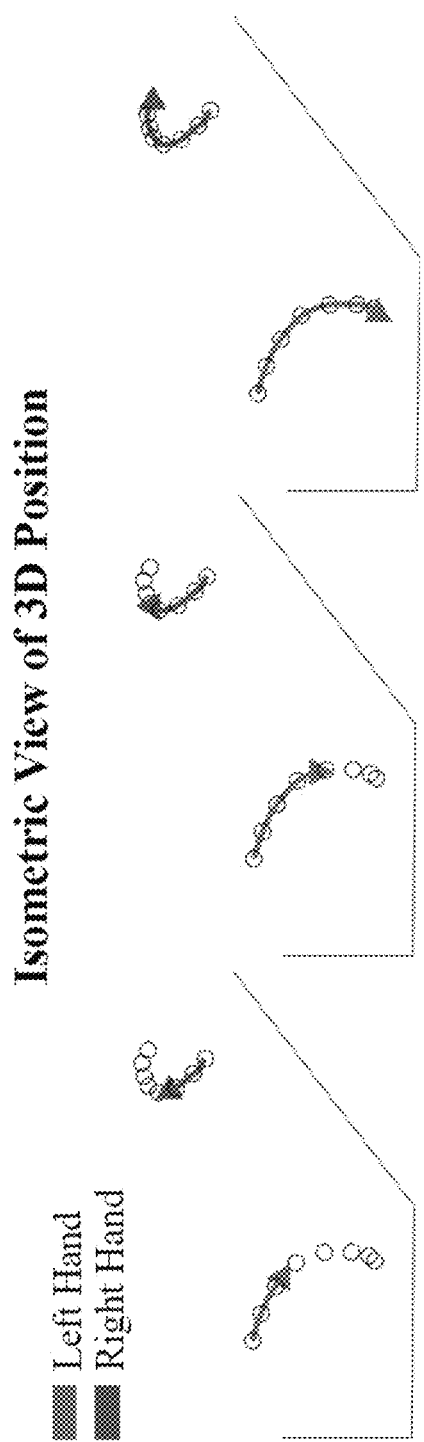
Figure 6C:
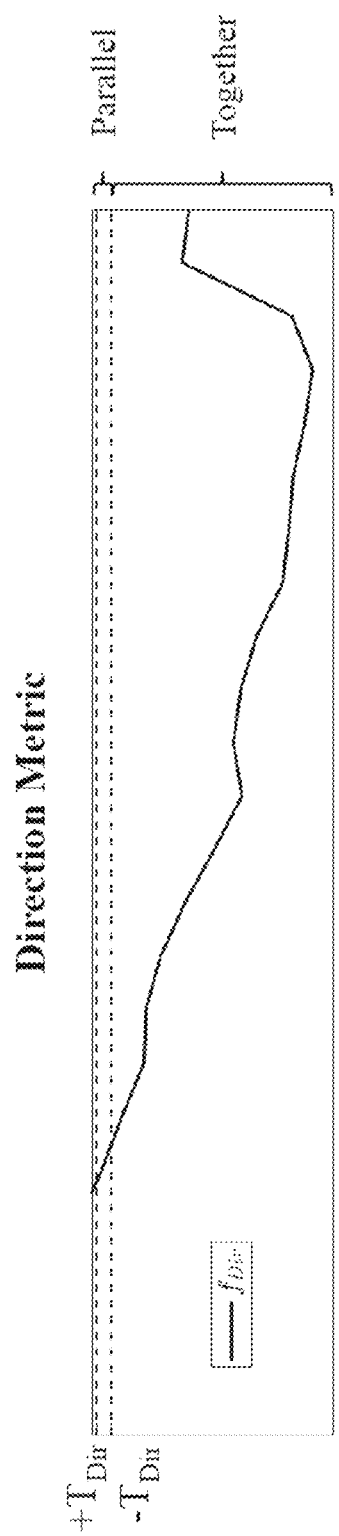
Figure 6D:
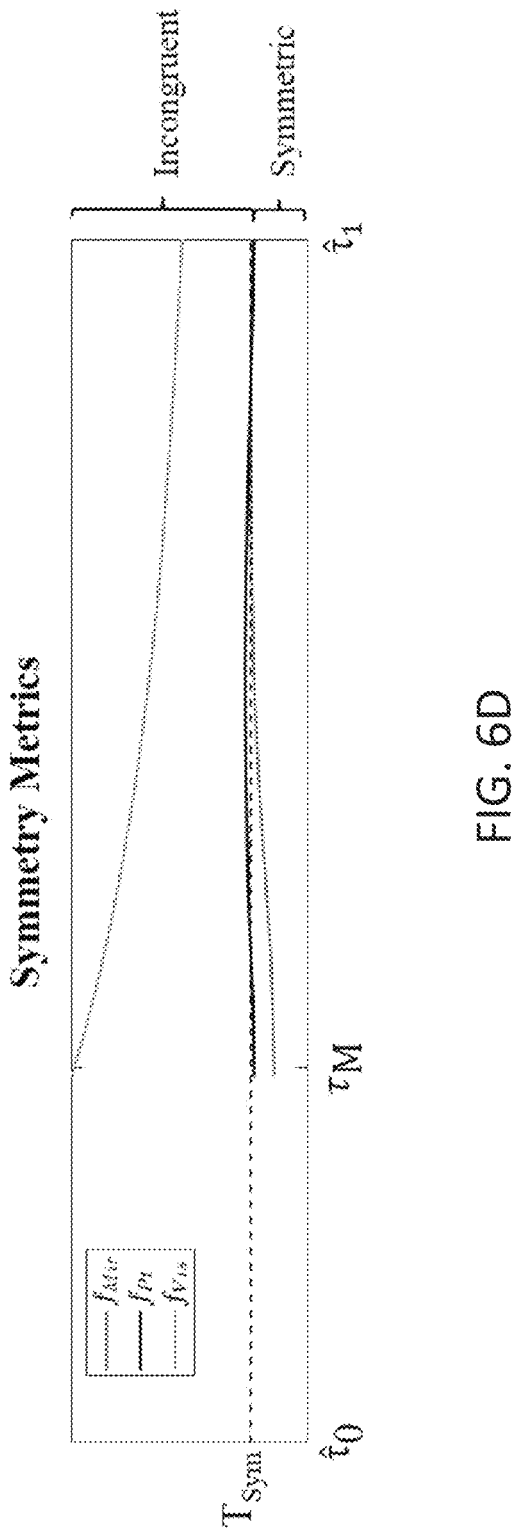
Figure 7A:
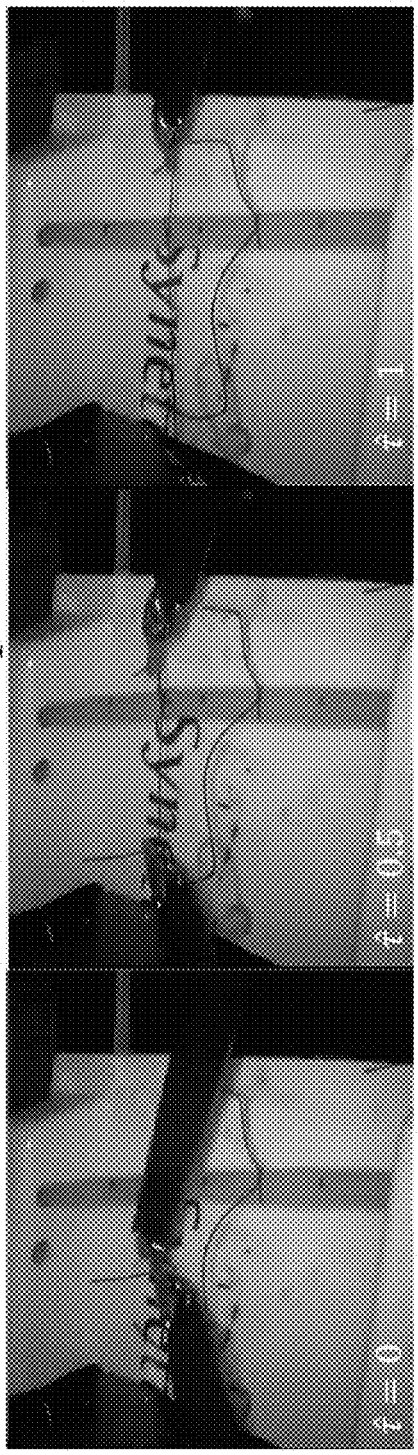
FIGS. 7A-7D depict bimanual coordination mode recognition for an instance of suture pulling.
Figure 7B:
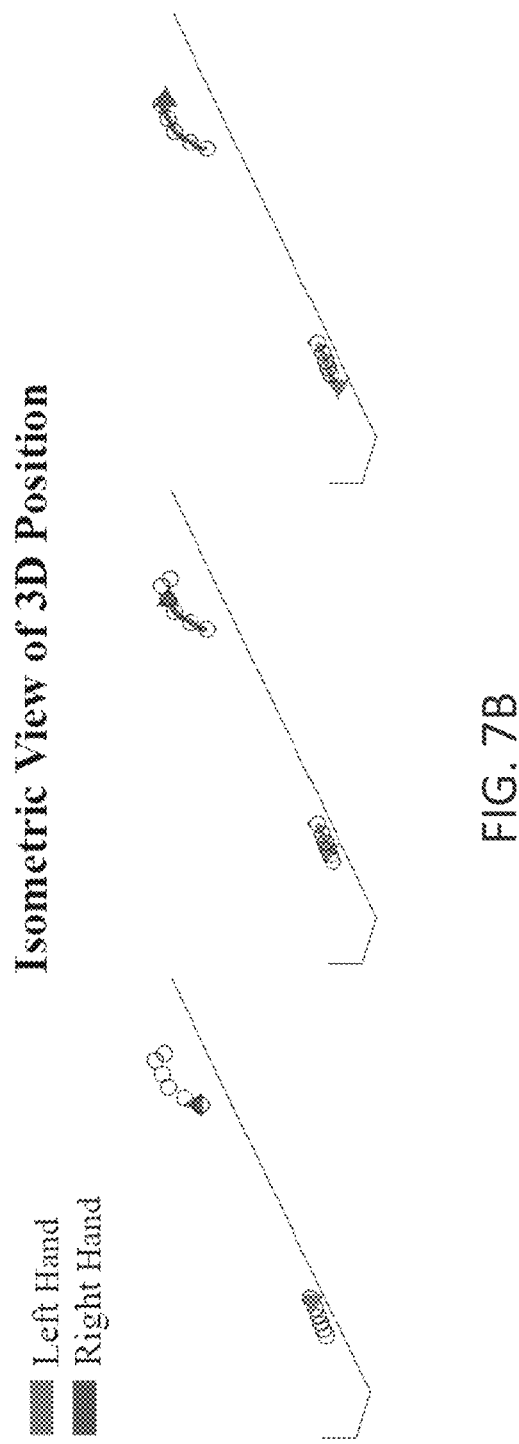
Figure 7C:
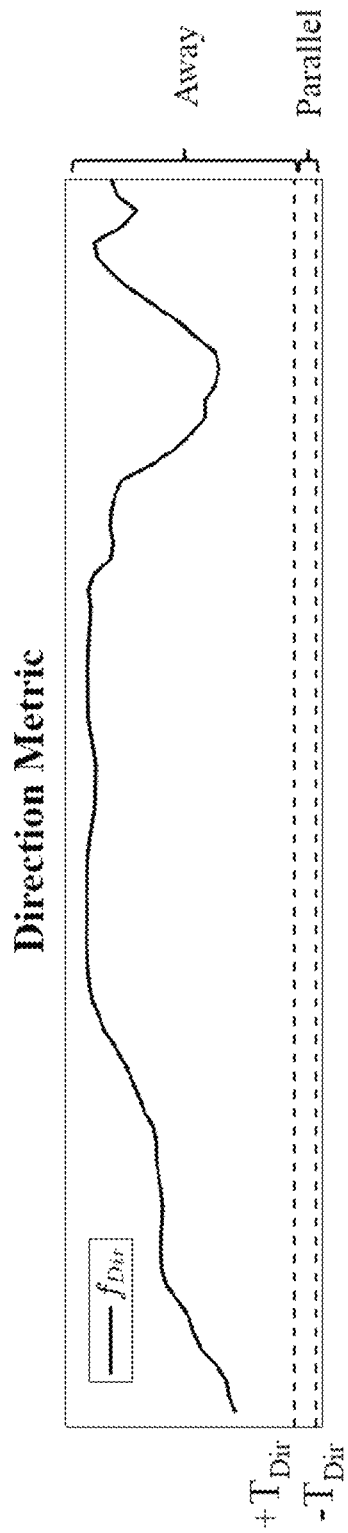
Figure 7D:
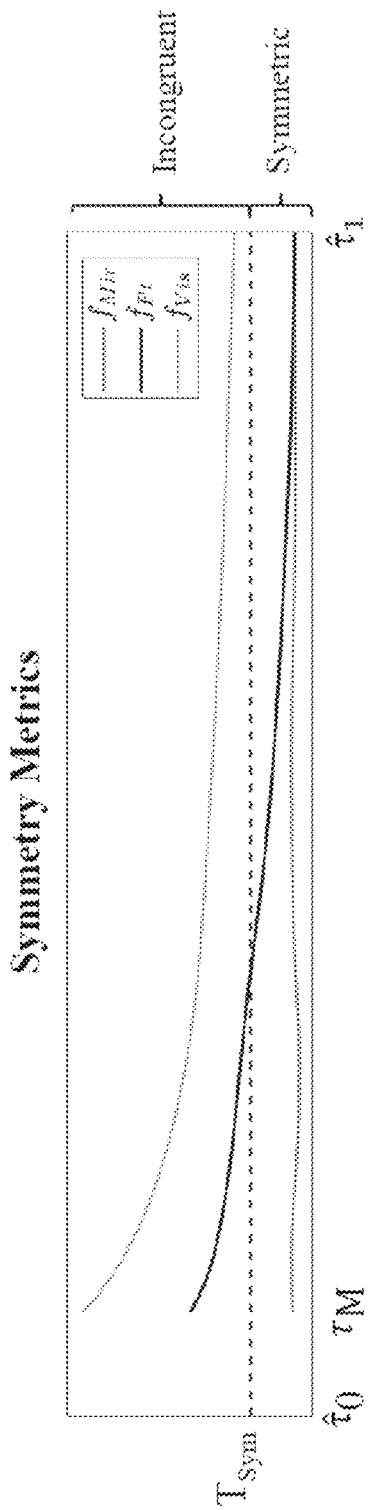

Mean and standard deviation after normalization for $f_{Mir}$ was 0.00458 and 0.00268, for $f_{P_t}$ was 0.0056 and 0.00317, and for $f_{V\ is}$ was 0.00632 and 0.00351, respectively. Using $f_{P_t}$ and $f_{V\ is}$, we determined the approximate standard deviation of noise, $\sigma_w$, to be 0.006 for this task. FIGS. 5A and 58 depict confusion matrices for bimanual coordination mode prediction of (a) direction and (b) symmetry types as compared to ground truth trajectories, post-movement of 2D bimanual path following trials. The overall recognition accuracy for direction was 92.3% with individual accuracies of 94.2% for together, 87.6% for parallel, and 94.1% for away (FIG. 5A). The overall accuracy for symmetry was 86.0% (FIG. 5B). Individual types of symmetry were recognized with accuracies of 83.7% for mirror, 96.4% for point, 97.0% for visual, and 33.9% for incongruent.

For the 3D surgical robotic tasks, the predicted bimanual motion modes of completed movements of surgical gestures are summarized in Table II.

TABLE II

Surgical Task Bimanual Analysis Results

| | Transfering Needle | | | Making C Loop | | | Pulling Suture | | |
|---|---|---|---|---|---|---|---|---|---|
| Surgical Gesture | Together | Parallel | Away | Together | Parallel | Away | Together | Parallel | Away |
| Mirror | 94 | 9 | 7 | 20 | 3 | 3 | 15 | 1 | 19 |
| Point | 28 | 2 | 0 | 3 | 3 | 1 | 1 | 0 | 39 |
| Visual | 0 | 0 | 0 | 0 | 0 | 0 | 0 | 3 | 0 |
| Incongruent | 38 | 4 | 6 | 18 | 5 | 2 | 3 | 1 | 2 |

The majority of transferring needle movements have bimanual coordination mode with direction of together and mirror symmetry (50%). Many others have symmetry type incongruent (20%) or point (15%). The majority of making C loop movements have direction together with symmetry type mirror (34%) or incongruent (31%). Only 12% of making C loop gestures had symmetry type point. For pulling suture movements, the majority have bimanual coordination mode away and point (46%) or mirror symmetry (23%). Bimanual coordination modes of surgical movements were able to be predicted within 250 milliseconds.

IV. Discussion

The purpose of this study was to develop an online recognition method of bimanual coordination modes (i.e., bimanual direction and symmetry) using geometric descriptors of left and right upper limb motion. We developed this framework based on trajectories obtained during virtual 2D bimanual path following tasks completed by humans operating haptic devices. We tested the offline recognition accuracy of bimanual direction and symmetry during these trials, and compared how the framework transfers to 3D trajectories of the da Vinci Surgical System's surgeon-side manipulators during bimanual surgical training tasks. The recognition method presented in this study had high accuracy for all direction types and symmetric bimanual movements. Note that these accuracies indicate the statistical significance of computed metrics (FIG. 4) for this data set. The confusion of recognizing incongruent movements that we observed in the 2D tasks could be attributed to movement coupling. Humans have a natural tendency to couple their movements, so the actual measured movements may have deviated from the incongruent ground truth trajectories to trajectories that were symmetric [27], [28].

Our results which showed how classifying bimanual motion during robot-assisted surgical tasks were found to be fairly intuitive regarding the predicted bimanual directions. To transfer a needle or make a c loop, one needs to bring the hands together. Pulling a suture involves the hands moving away to tighten the suturing thread. Surprisingly, very few movements during "making a c loop" gestures had point symmetry. In order to make the loop, one has to wrap thread with one tool in a spiral motion around the other. We suggest the discrepancy here may be due to two reasons. The first is that the spiraling wrap may be captured better in the rotation of the wrists than in the position data. Second, the majority of the beginning of the movement may be point symmetric, but finished as incongruent, and we have reported the predictions for the fully completed movement.

Another important consideration is that each gesture contains variability regarding bimanual coordination modes. Some movements of needle transfer and suture pulling are also parallel. Some of this variability comes from extraneous movements made during a gesture that were picked up by the movement detection method that we used. Such extraneous movements may also be indicative of performance during the task. However, the variability in bimanual coordination modes may also be attributed to the environment. We expected to see most suture pulling movements to be mirror symmetric, but more were point symmetric.

FIGS. 6A-6D depict bimanual coordination mode recognition for an instance of making a C loop with (a) video capture, (b) 3 dimensional position plots of the left and right hand, and (c) direction, $f_{Dir}$, and (d) symmetry metrics, $f_{Mir}$, $f_{Pt}$, and $f_{V\,is}$ computed over parametrized time of the movement. This example has a bimanual coordination mode of direction type together and point symmetry. FIGS. 7A-7D depict bimanual coordination mode recognition for an instance of suture pulling with (a) video capture, (b) 3 dimensional position plots of the left and right hand, and (c) direction, $f_{Dir}$, and (d) symmetry metrics, $f_{Mir}$, $f_{Pt}$, and $f_{V\,is}$ computed over parametrized time of the movement. This example has a bimanual coordination mode of direction type away and starts as mirror symmetry then changes to point symmetry. From FIGS. 6A and 7A, we can see that there is a tube blocking the right tool from pulling the thread in a mirror symmetric fashion. Operators adapted their movements to go over this tube, thereby making the movement point symmetric. This is evidence that there are different bimanual coordination modes used to accomplish the same gestures. A closer look at the correlation of task performance and bimanual coordination modes has the potential to improve our understanding of how a task may best be performed.

For trials that were correctly classified in the 2D bimanual path following data set, the time to predict the movements' bimanual coordination mode (on the order of hundreds of milliseconds) compared to the time of movement was short enough that the prediction could be integrated into the control of a robotic system. We suggest the most important benefit of this study is the ability to predict coordination as it evolves over time. Movements may change direction or symmetry type as they are performed, as indicated by FIGS. 6 and 7. Our proposed and tested method would allow for the visualization and integration of those changes in a robotic system, which if leveraged properly may improve performance. One method to do so would be in the form of haptic force feedback. For teleoperated systems such as the da Vinci Surgical System, there exists an opportunity to push users toward skillful types of coordination that are found in expert users, or to push them away from idealized trajectories through error amplification so that users can learn to be skillful in more challenging environments.

There are a few limitations of this study, such as the exclusion of other characterizations of bimanual movement that could also be important, depending on a given application. These include the number of targets, scaling, sequence, and temporal classifications (e.g. phase of cyclical motions) of bimanual motion [20], [29]. In addition, the selection of the thresholds when generalizing the method to different tasks requires some manual tuning using statistical methods dependent on the task and sampled set. One explanation of this result is that different tasks could require different noise characterizations. Another explanation is that overfitting of the first data set may have contributed to difficulty in generalizing. A study involving physical neuroscience methods that look at processes and activation of the brain during bimanual motion may help in determining appropriate thresholds for labeling movements, especially with regards to symmetry. We suggest observing the effects of performing movements with varying degrees of symmetry and direction (i.e., varying $f_{Sym}$) on cognitive processes would be beneficial, as done similarly in a prior study [30].

V. Conclusion and Future Work

In this Example 1, we demonstrate ability to recognize bimanual coordination modes from human movement trajectories using purely geometric features. This development may well integrate with the control system of a co-robotic systems, such as an upper-limb rehabilitation or surgical robots, for augmenting performance due to a fast computation time. We have also shown the variability of movements in realistic tasks as related to bimanual coordination modes, thus noting the importance of this kind of classification in bimanual movement analysis, especially as it relates to surgical skill assessment. We believe that this study has the potential to impact how humans are modeled in human-machine systems, particularly those that can provide feedback, as well as how human bimanual motions are modeled in general. We also expect that this approach will facilitate the opportunity to provide meaningful feedback with sufficient temporal resolution.

In future work, we intend to explore automated methods for tuning thresholds in the method presented in this paper so that it is more easily applicable across tasks. We also plan to incorporate other classifications of bimanual movement, such as number of targets, scaling, and sequence, and look at various forms of feedback during movement to observe how it affects training of fine, bimanual motor skills.

Example 2

I. Introduction

Devising systems that understand and leverage human movement is imperative in our modern society. Human operators and robotic devices are interacting more closely, both physically and intelligently, to accomplish a variety of tasks. Exoskeletons are worn directly on the body to increase movement efficiency and reduce energy expenditure during industrial work [31,32] and ambulation [33,34]. They may also assist with activities of daily living, augment rehabilitation exercises for upper-limbs [35-38] and lower-limb [39,40], or facilitate sports training [41]. Surgical robots [42,43] are bimanually controlled by human-operators who must coordinate their movements to accurately perform intricate tasks. Drivers in autonomous vehicles may be required to resume control of steering [44]. In the video game industry, virtual and augmented reality bring the entire human body into the gaming experience. Underlying the control of all these robotic systems is the human operator's ability to coordinate his or her bilateral limbs. By understanding the mechanisms that govern coordination and limitations those mechanisms impose on human performance, we can devise intelligent control to manipulate outcomes of an activity. To devise such a control, the notion of coordination need be posed in an objective manner, suitable for computation. Therefore, a mathematically defined classification of coordinated bilateral movement could greatly benefit the design of human-operated robotic devices. Herein, we present such a mathematical framework with emphasis toward discrete, bimanual movements.

Figure 8:
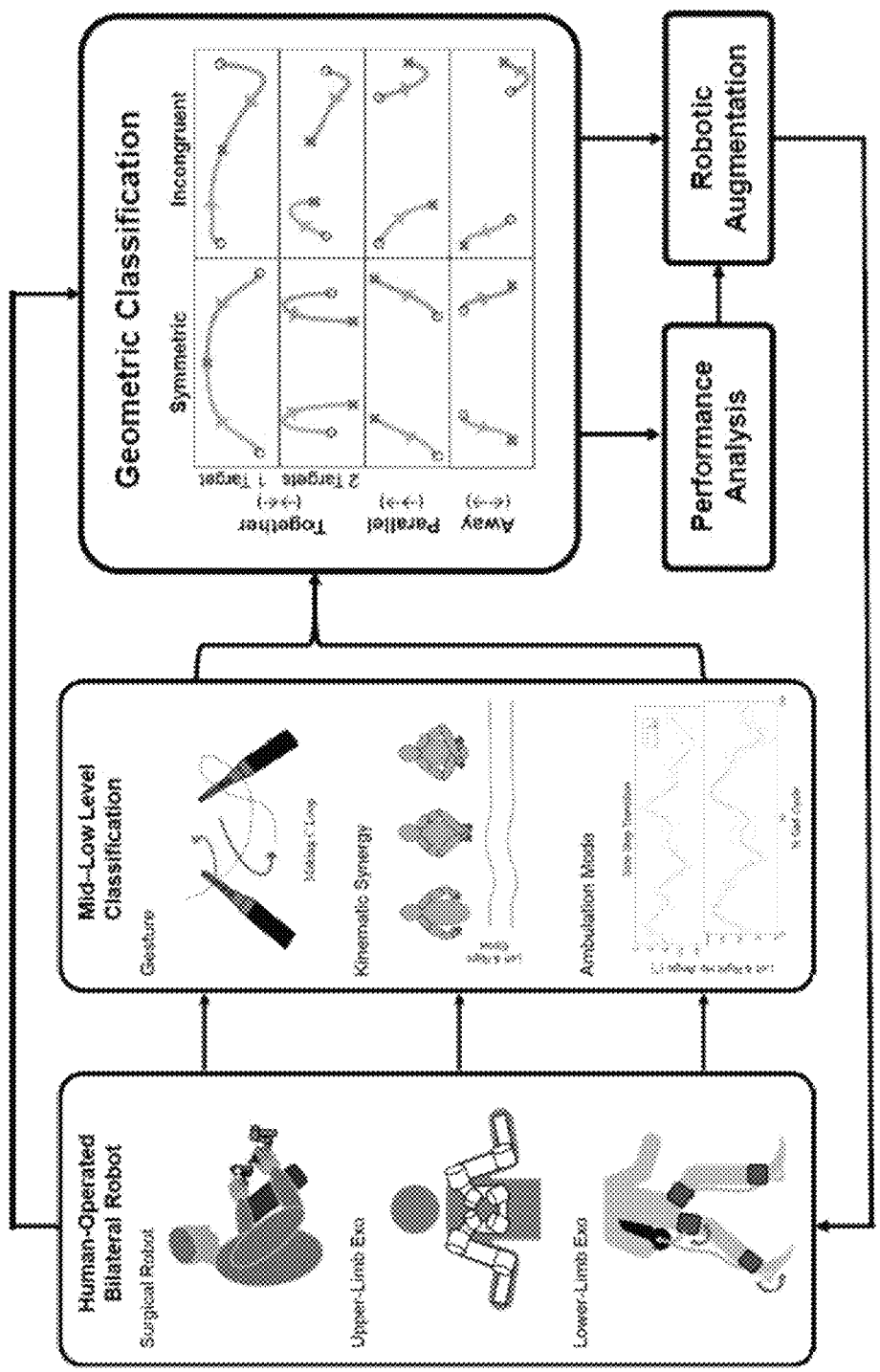
FIG. 8 depicts a schematic of how bimanual geometric classification may integrate into a robotic control system.

Current classifications of bimanual human movement used by roboticists are primarily data-driven and focused on two objectives: activity recognition or movement replication. For activity recognition, typically a task or set of tasks are broken into relevant subtasks, referred to as gestures [45,46], movemes [47], or in the case of robotic surgery, "surgemes" [48]. Each gesture may be thought of as a class of movements and can be used to detect the stage of an activity or feed into a decision procedure to provide robotic assistance. Several classifications for bimanual grasping and manipulation [49-51] as well as bipedal ambulation modes [52] have been proposed in this manner. To generate autonomous robotic movement, lower-level classification is necessary. Subsets of gestures can be derived from specific task demonstrations. The demonstrations may be used directly to replicate movement in a robotic limb, or they may be further decomposed into "synergies". Synergies are derived via principal component analysis on large data sets to reduce dimensionality, and they provide building blocks that researches can combine to replicate movement [53,54]. This is an effective method to create human-like trajectories or grasp strategies for robotic manipulators. However, these classification methods do not lend themselves efficiently to augmentation for human-operated robotic devices. Synergies and gestures are task- and operator-specific, and have not been linked to general human performance. As such, devising methods to augment movement with a robot for a particular gesture or combination of synergies is difficult. A classification relating gestures, synergies, and human performance across a wide-breadth of bimanual activities may provide better intuition and a streamlined method for the design of robotic augmentation. FIG. 8 depicts a schematic of how bimanual geometric classification may integrate into a robotic control system.

The geometry of bimanual movement correlates to human performance, can be objectively defined, and may lend itself more intuitively to current augmentation methods in robotic systems. Researchers have linked various features of bimanual movements, like the scaling [55-57] or symmetry [58,59], to the performance outcomes of bimanual tasks. More details on the relation between geometric features of bimanual movement and performance may be found in the Supplemental Text section, below. As well as their relation to human performance, geometric features can be objectively defined. This is pertinent to integration in robotic systems as well as comparison of data across studies. Finally, many current robotic augmentation methods in human performance and training applications use force feedback [41]. For example, force feedback may be implemented via virtual springs and dampers, and these forces can be designed to restrict or guide movement given a desired movement geometry. To the best of our knowledge, there are no comprehensive classification frameworks tailored to robotic systems and the coordination of bimanual human movements from a geometric perspective.

This rest of this paper is organized as follows. First, we present formal, geometric definitions for the ideal cases of bimanual coordination. We also cover the well-posedness of the respective classes. Next, we consider the problem of noise corrupted bimanual movement signals as would be available in a sampled robotic system and propose scalar metric-based methods to distinguish classes. Threshold methods derived from statistical principles are also presented for the case of discrete classification. We apply the methods to a 2D bimanual trajectory following data set to validate the approach. Then, we apply the methods to a 3D surgical training data set to show applicability and generalizability of the framework. We then present the results of our experiments. Finally, we discuss the implications of the approach, results of the application, and limitations.

II. Geometric Classes of Bimanual Coordination

In this section, we provide formal definitions for a coordinated bimanual movement and respective classes. There are five main classes: i) sequence, ii) scaling, iii) number of targets, iv) direction, and v) symmetry.

A. Elementary Definitions

Let $\phi(t)$ be a continuous trajectory, such that $\phi: T \to W \subset R_p$. Here we consider a workspace, W, that is finite and reachable in p-dimensional space and time parameter, $t \in T = [t_0, t_1]$.

Definition 0.1 (Bimanual Movement). The set of bimanual movements, B, is the set of paired, continuous trajectories $\phi_L(t)$ and $\phi_R(t)$ occurring within domain T and each parameterizable by $\tau \in [0,1]$, such that $\phi(\tau)/=c$ where c is a constant.

By this definition, we note that bimanual movements B exclude stationary, i.e. single point, trajectories.

Definition 0.2 (Sequence). Denote the tangential velocity of trajectory $\phi(t)$ as $\phi'(t)=d\phi/dt$. A bimanual movement B is simultaneous in time segment $\tau_{Sq}=[t_o, t_o] \subseteq \tau$ if $\|\dot{\phi}_L(t)\|_2 > 0$ and $\|\dot{\phi}_R(t)\|_2 > 0$ $\forall t \in \tau_{Sq}$. The movement is otherwise sequential.

Next, it is important to denote the scaling of a bimanual movement, which may be defined in two ways. The first is by the length traveled by each trajectory defined by the line integral. The second is by volume, which may be thought of as the space taken up by each trajectory.

Definition 0.3 (Scaling). Let S denote the cumulative distance traveled by trajectory $\phi$:

$$S = \int_{t_0}^{t_1} \sqrt{\overline{\phi(\tau) \cdot \phi(\tau)}} d\tau$$

bimanual scaling is the ratio $$f_{Sc} = S_L/S_R \quad (1)$$

A bimanual movement is left scaled if $f_{Sc} > 1$. The bimanual movement is right scaled if $1/f_{Sc} > 1$. The movement is otherwise unscaled.

Definition 0.4 (Number of Targets). A bimanual movement is of 1-Target if there exists a simply connected subspace $N \subset W$ such that $\phi_L(t_1), \phi_R(t_1) \in N$. Otherwise, it is of 2-Targets.

As an example, consider the set of 3D bimanual movements and choose N to be a sphere with center at the midpoint of $\phi_L(t_1)$ and $\phi_R(t_1)$. We can define threshold $T_{NoT}$ equal to the diameter of N, such that if $\|\phi_L(t_1) - \phi_R(t_1)\|_2 \leq T_{NoT}$, then the movement is of 1-Target.

Definition 0.5 (Direction). Let $d(\tau)$ be the $l^2$-norm of the difference of parameterized trajectories $\phi_L$ and $\phi_R$ that compose a bimanual movement $$d(\tau) = \|\phi_L(\tau) - \phi_R(\tau)\|_2$$

Denote metric $f_{Dir}$, such that $$f_{Dir}(\tau) = d'(\tau) \quad (2)$$

and small threshold $T_{Dir} > 0$. A bimanual movement has direction of away if $f_{Dir} > T_{Dir}$; parallel if $-T_{Dir} \leq f_{Dir} \leq T_{Dir}$; or together if $f_{Dir} < -T_{Dir}$ in segment $T_{Dir} = [\tau_a, \tau_b]$.

B. Symmetry Definitions

Definition 0.6 (bimanual Symmetry). A bimanual movement is symmetric if one point set may be equated to the other by a linear transformation of the form $$\phi_L(\tau) = f_{Sc} Q \phi_R(\tau) + v \quad (3)$$

where $f_{Sc}$ is the scaling of the movement (Eq. 1), Q is an orthogonal rotation and reflection matrix, and v is a constant, translation vector. If the bimanual movement does not satisfy this definition, then it is incongruent.

(Mirror Symmetry) A bimanual movement has mirror symmetry if there exists a plane P, and unit vector, q, normal to P such that $$Q = I - 2qq^T \quad (4)$$

where I is the identity matrix.

(Point Symmetry) A bimanual movement is point symmetric if $Q = -I$.

(Visual Symmetry) A bimanual movement is visual symmetric if $Q = I$.

Figure 9:
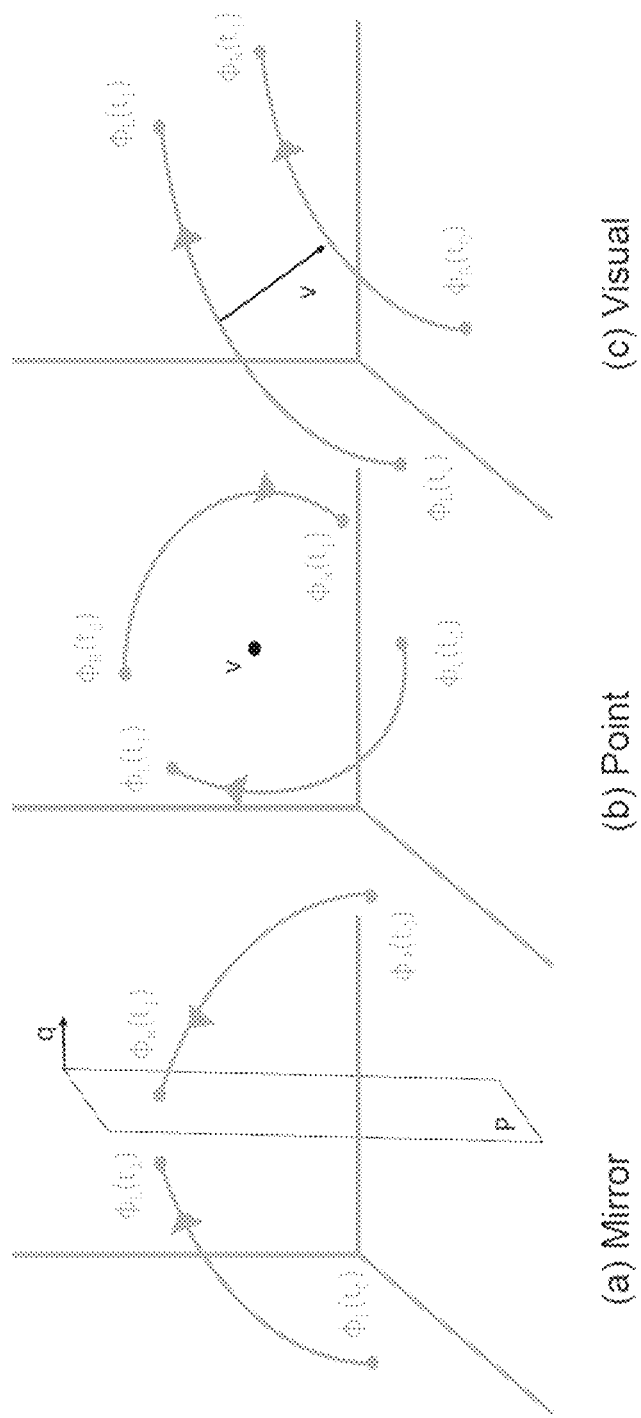
FIG. 9 depicts an illustration of different symmetry types for a 3D bimanual movement.
Figure 10:
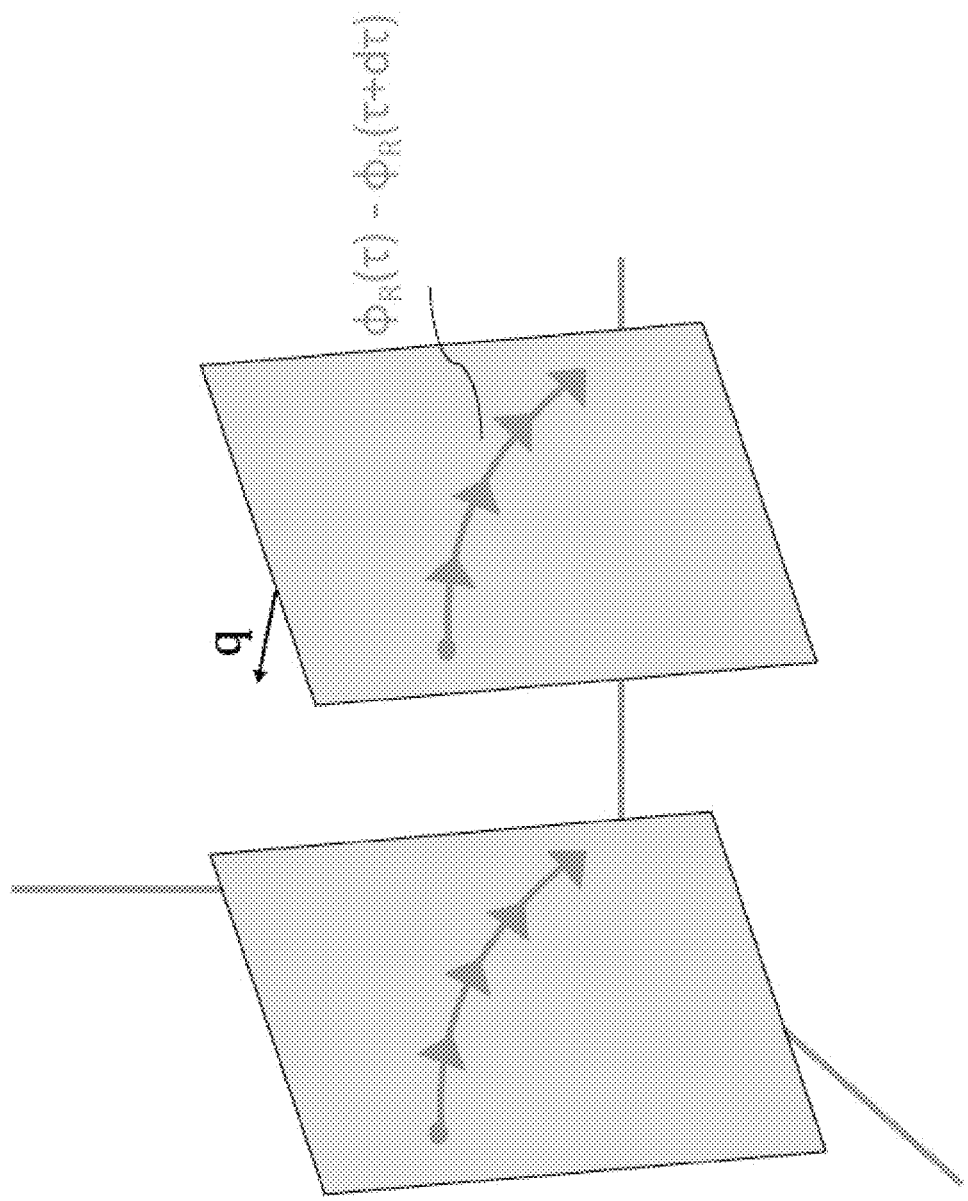
FIG. 10 depicts an example of a 3D bimanual movement with both visual and mirror symmetry.

The subclasses of symmetry for bimanual movements are distinguished by the rotation and reflection component, Q. Mirror symmetry is a Householder reflection, point symmetry is a reflection through the origin, and visual symmetry is a simple translation, as shown in FIGS. 9 and 10.

C. Well-Posedness of Classes

It is important to understand the overlap, or intersection, of classes, so informed decisions can be made regarding discrete classification of measured trajectories. Knowledge of classes and class bounds can help to set thresholds or inform an algorithm to more accurately and efficiently classify bimanual movements.

Proposition 0.1. If a bimanual movement is of visual symmetry, it has direction of parallel for $$T_{Dir} > \sqrt{p} |f_{Sc} - 1| \|\nabla \phi_R\|_\infty.$$

Proof. The proof comes directly from the definitions of direction and visual symmetry. If visual symmetric, then $\phi_L(\tau) = f_{Sc} \phi_R(\tau) + v$, so $$|f_{Dir}(\tau)| = |\lim_{x \to 0} \|\phi_L(\tau + d\tau) - \phi_L(\tau + d\tau)\|_2 / d\tau - \|\phi_L(\tau) - \phi_R(\tau)\|_2 / d\tau | \leq \lim_{x \to 0} |f_{Sc} - 1| \|\phi_R(\tau + d\tau) - \phi_R(\tau)\|_2 / d\tau \leq \sqrt{p} |f_{Sc} - 1| \|\nabla \phi_R(\tau)\|_\infty$$

Therefore, $$-\sqrt{p}|(f_{Sc}-1)| \|\nabla \phi_R\|_\infty \leq f_{Dir}(\tau) \leq \sqrt{p}|(f_{Sc}-1)| \|\nabla \phi_R\|_\infty$$

This helps us to recognize this type of symmetry efficiently by simply using the metric for bimanual direction. It is of interest to note how the threshold for parallel direction will depend on the scaling of the bimanual movement and the trajectory gradient. Also, for an unscaled, visual symmetric bimanual movement, $f_{Dir}(\tau) = 0$ and is thus always parallel.

From the definition of symmetry, we see that all possible bimanual movements are included due to the "catch-all" definition of incongruency. However, we will show that the set of all mirror symmetric bimanual movements is not mutually exclusive from the set of all point symmetric bimanual movements nor the set of all visual symmetric bimanual movements. First, we will show that the sets of all point symmetric bimanual movements and visual symmetric bimanual movements are mutually exclusive.

Now let us show the conditions under which mirror symmetry overlaps the other types of symmetry.

Proposition 0.3. The sets of mirror and visual symmetric bimanual movements are not mutually exclusive. They intersect if the trajectories are symmetric and can be described in a lower dimensional space.

Proof. Let us consider a bimanual movement that is both mirror symmetric and visual symmetric. By Definition 0.6

$$\phi_L = f_{Sc}(I - 2qq^T)\phi_R + v_{Mir} = f_{Sc}\phi_R + v_{Vis}$$

Therefore, $$q^T \phi_R = c \forall \tau$$

where c is a constant. This implies $$q^T(\phi_R(\tau+d\tau) - \phi_R(\tau)) = 0$$

The only possible solutions for the above are such that 1) $\phi_R(\tau) = \phi_R(\tau+d\tau)$, which means $\phi_R$ is constant or 2) $\phi_R(\tau+d\tau) - \phi_R(\tau)$ is orthogonal to q. If 1), then $\phi_R$ is constant, which contradicts Definition 0.1. If 2) the trajectories of the bimanual movement exist in the plane to which q is orthogonal and the symmetry is of a lower dimension.

Remark 0.1. For two dimensional trajectories, this means that the trajectories are parallel lines.

Proposition 0.4. The set of mirror and point symmetric bimanual movements are not mutually exclusive. They intersect when the trajectories are opposing straight lines.

Proof. Consider a bimanual movement that is both mirror symmetric and point symmetric. By Definition 0.6

$$\phi_L = b(I - 2qq^T)\phi_R + v_{Mir} = -b\phi_R + v_{Pt}$$

This can be reduced to $$(I - qq^T)\phi_R = c$$

Therefore, $$(I - qq^T)(\phi_R(\tau+d\tau) - \phi_R(\tau)) = 0 \quad (5)$$

As with Proposition 0.3, there are two possible solutions. 1) Contradictory to Definition 0.1, $\phi_R(\tau+d\tau) = \phi_R(\tau)$ or 2) $\phi_R(\tau+d\tau) - \phi_R(\tau) = \alpha q$, where $\alpha$ is a scalar. This would mean that the trajectory is a straight line.

Proposition 0.3 and Proposition 0.4 provide clear intersections of our sets of bimanual movements with particular symmetries. Point and visual symmetry are mutually exclusive, mirror and point symmetry only intersect for opposing straight line trajectories, and mirror and visual symmetry intersect in the case of parallel movements that can be reduced to a lower dimension.

II. Human Coordination Classification Problem

For the purposes of human movement classification, it is convenient to consider a coupled robotic-human model as a sampled (discretized) system corrupted by noise. Consider the system $$x_{k+1} = f(x_k, u_k, \zeta_k)$$

$$\hat{\phi}_k = h(x_k, \eta_k) \quad (6)$$

Where x is the state of the human model, u is a motor command, $\hat{\phi}$ is the estimated trajectory available to the robotic system, and $\zeta$ are noise terms, and k=0, 1, . . . , n. In the following, we will present discretized, scalar metrics that are indicative of the classes of sequence, scaling, direction, and symmetry with relation to equation 6. We will also discuss characterization of noise terms with relation to the metrics such that we can define thresholds by way of portmanteau tests for discrete classification. However, the following metrics may be used in near real-time without the need to discretely classify a bimanual movement with regard to its sequence, scaling, direction, and symmetry.

A. Sequence

Sequencing of bimanual movements is a problem of movement onset and offset detection. We can say if the velocity component of the state, v, is such that $\|v_L\|_2$ and $\|v_R\|_2 > T_{Sq}$ for a time segment $T_{Sq}$, then the movement is simultaneous for that segment. Setting threshold $T_{Sq}$ can be done using the square of the magnitude of linear velocity. If we assume that an idle velocity signal is zero-mean and Gaussian with variance $\sigma_v^2$, then the square of the magnitude is akin to a $\chi_p^2$ variable.

$$\hat{f}_{Sq} = \frac{1}{\sigma_v^2} \|v\|_2^2 \sim \chi_p^2 \quad (7)$$

Therefore, we can normalize the velocity signal by $\sigma_v$ to a standard random Gaussian variable and set $T_{Sq}$ with regard to a desired significance level for movement onset and offset. We may also use a likelihood-ratio test with desired significance level for particularly noisy signals [60].

B. Scaling

For scaling, we can discretize equation 1 to be $$\hat{S}(k) = \Sigma_{i=0}^{k-1} \|\hat{\phi}_{i+1} - \hat{\phi}_i\|_2$$

Therefore, the discretized scaling metric is $$\hat{f}_{Sc}(k) = \frac{\hat{S}_L(k)}{\hat{S}_R(k)} \quad (8)$$

where $\hat{S}_L$ and $\hat{S}_R$ are random variables with means $S_L(k)$ and $S_R(k)$ and variances $\sigma_L^2$, and $\sigma_R^2$ proportional to the noise of the system in equation 6. Equation 8 is the ratio of two random variables. If the sides are coupled, then we can expect correlation of the cumulative distance variables $\hat{S}_L$ and $\hat{S}_R$. It has been shown [61] that the log of this distribution can be approximated as a normal random variable such that $$\log \hat{f}_{Sc} \sim N\left(\log f_{Sc}, \frac{\sigma_L^2}{S_L^2} + \frac{\sigma_R^2}{S_R^2}\right) \quad (9)$$

If sides are uncoupled, then we can expect zero correlation between the cumulative distance variables and approximate the metric according to [62] as $$\hat{f}_{Sc} \sim N\left(f_{Sc}, f_{Sc}^2\left(\frac{\sigma_L^2}{S_L^2} + \frac{\sigma_R^2}{S_R^2}\right)\right) \quad (10)$$

Given an unscaled bimanual movement, $S_L(k) = S_R(k) = S^*(k)$, both equation 9 and equation 10 represent normally distributed random variables with the same variance, $$\sigma_{Sc}^2 = (\sigma_L^2 + \sigma_R^2)/S^{*2}$$

centered at 0 and 1, respectively. Note that $\sigma_{Sc}^2$ represents the square of the noise-to-signal ratio. From here, a threshold, $T_{Sc}$ similar to movement detection for sequence can be made simply with respect to the normal distribution and a desired significance level. To determine the scaling of a bimanual movement, first check metric $\hat{f}_{Sc}$. If it is less than 1, then invert it. Then, if it is less than threshold $T_{Sc}$, classify the movement as unscaled.

B. Direction

We will now consider the problem of discerning the underlying subclass of direction. Due to the potential of uneven sampling density along the trajectories and the need to parameterize over distance, each sampled trajectory must be processed as follows. The estimate of each trajectory, $\hat{\phi}$, must be such that $\|\hat{\phi}_{k+1}-\hat{\phi}_k\|_2=\rho$ is constant for all k. This gives an equidistant estimate of the parameterized trajectory, $\phi(\tau)$, and allows us to discretize equation (2). Let $z_k=\hat{\phi}_{lk}-\hat{\phi}_{rk}$. Then $$\hat{f}_{Dir}(k) = \underset{k}{\text{median}} \, \|z_k\|_2 - \|z_{k-1}\|_2 \tag{11}$$

We take the median in order to get a robust metric, which represents the primary direction of the trajectory. If the mean is taken, this equation becomes equal to the difference of norms of $z_n$ and $z_0$, which is the change in distance from the start of the trajectory to the end.

Figure 11A:
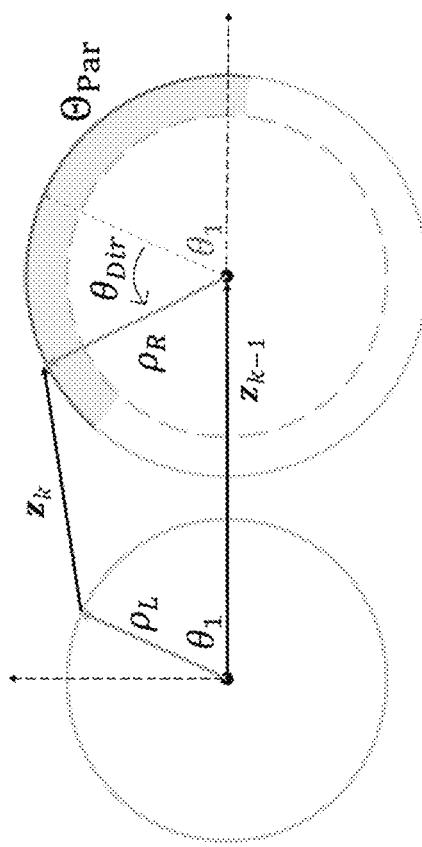
FIG. 11A depicts an illustration of finding minimum and maximum change in distance between successive points, $f_{Dir}$ given that a movement is parallel for 2D bimanual movements.
Figure 11C:
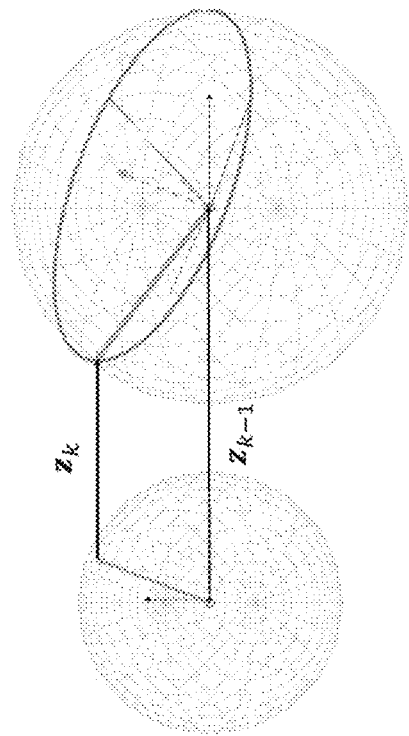
FIG. 11C depicts a top view of the projected ellipse used to obtain the 3D solution, which is orthogonal to $z_{k-1}$.
Figure 11B:
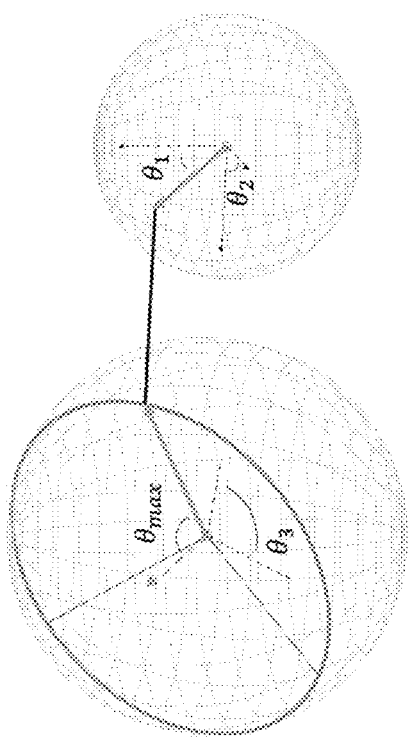
FIG. 11B depicts an illustration of finding minimum and maximum change in distance between successive points, $f_{Dir}$ given that a movement is parallel for 3D bimanual movements.

Now we will develop a test for discerning the subclass of direction by choosing a threshold, $T_{Dir}$. Since we parameterized the trajectories to be equidistant, we have bounded the successive change in distance of left and right trajectories such that $\hat{f}Dir \in [-(\rho_L+\rho_R), (\rho_L+\rho_R)]$. The threshold $T_{Dir}$ could be set with respect to thirds or other fractions of this range, but we will pose another with respect to a separation angle, $\vartheta_{Dir}$, and scaling, $f_{Sc}$. The change in contralateral distance, $f_{Dir}$, is dependent on $2(p-1)$ angles. For example, a 2D bimanual movement will depend on the separation angle $\vartheta_{Dir}$, which may be restricted for parallel movements to a range $\vartheta_{Dir} \in \theta_{Par}$, and one other angle $\vartheta_1$ (FIGS. 11A-11C). Due to the symmetry of the problem, there are two solutions to $\vartheta_1$ that give the minimum $\hat{f}Dir$ and two solutions that give the maximum $\hat{f}Dir$ such that a movement may still be considered parallel, i.e. $-T_{Dir}<\hat{f}_{Dir}<T_{Dir}$. The minimum and maximum are achieved at the bounds of the range $\theta_{Par}$, indicated by $\vartheta_{max}$, and coincide such that $z_k$ is parallel to $z_{k-1}$. This leads to a convenient form for choosing threshold $T_{Dir}$. Given that the ratio of $\rho_L$ and $\rho_R$ is the scaling $f_{Sc} \leq 1$, $$\tan\theta_1 = \frac{\sin\theta_{max}}{f_{Sc} - \cos\theta_{max}} \tag{12}$$

Using this value for $\vartheta_1$, we can get the maximum and minimum distances to set the threshold, $$T_{Dir} = \rho_L\left[\cos\theta_{max} - \frac{1}{f_{Sc}}\cos(\theta_1 + \theta_{max})\right] \tag{13}$$

Note that equation (13) is reliant on the choices of a minimum $\rho$ (assumed to be $\rho_L$), scaling, and the allowed parallel range $\theta_{Par}$.

For 3-dimensional trajectories, the problem becomes restricted to a sphere (see FIGS. 11A-11C). We designate the vector of the change in trajectory of the left side with respect to spherical coordinates $\vartheta_1$ and $\vartheta_2$ and for the right side with respect to angle $\vartheta_{Dir}$ and $\vartheta_3 \in [0, 2\pi]$. In order to find the minimum and maximum change in distance, we must solve the following nonlinear system of trigonometric equations $$\tan\theta_1 = \frac{\cos\theta_{max} - f_{Sc}}{\cos\theta_3 \sin\theta_{max}} \tag{14}$$

$$\tan\theta_2 = \frac{\sin\theta_3 \sin\theta_{max}}{(f_{Sc} - \cos\theta_{max})\sin\theta_1 - \cos\theta_1\cos\theta_3\sin\theta_{max}} \tag{15}$$

$$\tan\theta_3 = -\tan\theta_2 \sec\theta_1 \tag{16}$$

Note that equation (14) and equation (15) ensure that $z_k$ is parallel to $z_{k-1}$. Equation (16) is the answer to minimizing metric $\hat{f}_{Dir}$ with respect to $\vartheta_3$. With the solved angles, we can set the threshold for 3D bimanual movements $$T_{Dir}=\cos\theta_1 \cos\theta_2 \cos\theta_3 - \sin\theta_2 \sin\theta_3 \sin\theta_{max}+\sin\theta_1 \cos\theta_2(\cos\theta_{max}-f_{Sc}) \tag{17}$$

Similar to equation 13, this threshold is again reliant on choices of $\rho$ and the allowable parallel range.

For higher dimensional bimanual movements, it may be more convenient to solve for a threshold with given separation angle range using analytic optimization and hypersphere coordinates. Moreover, setting the threshold $T_{Dir}$ for any dimension relies on the choices of $\rho_L$ and $\rho_R$.

C. Symmetry Recognition

For symmetry, we use the same equidistant estimate of a trajectory as for direction to produce matrix $\hat{\Phi}=[\hat{\phi}_k^T] \in \mathbb{R}^{n \times p}$, such that $\|\hat{\phi}_{k+1}-\hat{\phi}_k\|_2=\rho$ is constant for all k. For the following, we note this matrix as composed of the intended trajectory with underlying symmetry and noise.

Modified Procrustes Analysis

Now we will look at cases of symmetry and how to discern them, which may be more error prone, especially when regarding human movement. Procrustes analysis provides an excellent tool for determining the symmetry of two different point set matrices [63]. This method determines the optimal orthogonal rotation and reflection matrix Q, scaling $f_{Sc}$, and constant translation component v to minimize the following Frobenius norm $$f_{Sym} = \min_{f_{Sc},Q,v} \|\hat{\Phi}_L - f_{Sc}\hat{\Phi}_R Q + v\|_F^2 \tag{18}$$

It is known that the solution to equation (18) with regards to Q can be solved by reducing to the following, $$f_{Sym} = \min_Q \|\hat{\Phi}_{0L} - \hat{\Phi}_{0R} Q\|_F^2$$

such that $\Phi_0 = \overline{\Phi}/\|\overline{\Phi}\|_F$ is the normalized matrix of $\phi$ with respect to centering and scaling. In this method, Q is determined by the product of the orthogonal matrices of the singular value decomposition of $\Phi_{0L}^T \Phi_{0R}$. However, this method will produce a Q that may represent any type of symmetry between the two point sets. If specific types of symmetry, like those we have defined herein, are of interest, we must modify the traditional Procrustes method by limiting the reflection-rotation component, Q, to those definitions.

$$\hat{f}_{Sym} = \min_{Q \in [I, -I, I-2qq^T]} \|\hat{\Phi}_{0L} - \hat{\Phi}_{0R} Q\|_F^2 \tag{19}$$

By doing so, we can split the minimization into the relevant types of symmetry.

$$\hat{f}_{Vis} = \|\hat{\Phi}_{0L} - \hat{\Phi}_{0R}Q\|_F^2 \quad (20)$$

$$\hat{f}_{Pt} = \|\hat{\Phi}_{0L} - \hat{\Phi}_{0R}Q\|_F^2 \quad (21)$$

$$\hat{f}_{Mir} = \min_q \|\hat{\Phi}_{0L} - \hat{\Phi}_{0R}(I - 2qq^T)\|_F^2 \quad (22)$$

The metric for mirror symmetry can be solved by $$\hat{f}_{Mir} = 2\left[1 - tr\left(\hat{\Phi}_{0R}^T \hat{\Phi}_{0L}\right) + 2\min_q q^T \hat{\Phi}_{0R}^T \hat{\Phi}_{0L} q\right]$$

Thus, the solution to equation (22) comes from the eigenvalues of matrix $$\hat{\Phi}_{Sym} \triangleq \frac{1}{2}(\hat{\Phi}_{0R}^T \hat{\Phi}_{0L} + \hat{\Phi}_{0L}^T \hat{\Phi}_{0R}) \quad (23)$$

such that $$f_{Mir} = 2(1 - \Sigma\lambda + 2\lambda_{min}) \quad (24)$$

where $\Sigma\lambda = tr((\hat{\phi}\,\text{Sym}))$ and $\lambda_{min}$ is the minimum eigenvalue of $\hat{\phi}\,\text{Sym}$. For two-dimensional trajectories, the solution can be written as follows $$f_{Mir} = 2(1 - \lambda_{max} + \lambda_{min}) \quad (24)$$

where $\lambda_{max}$ is the maximum eigenvalue of $\hat{\phi}_{Sym}$.

With metrics for the relative symmetry subclasses we will go over a test to discretely classify a bimanual movement. Using Q from the minimization, we can obtain a symmetry noise matrix $W=[w_k^T]$ with $w_k$ having autocovariance as related to the system in equation 6. Since $\hat{f}_{Sym}$ is the sum of dot products of the row vectors of $W$, we can perform Mahalonibis whitening on $W$ using the autocovariance. From here, we can use the appropriate $\chi_{np}^2$ test statistic. However, for high dimensional data and correlated data, like sampled bimanual trajectories, this way of testing becomes unreliable. Instead, we use a binomial test on the number of points in the whitened noise matrix $W$ outside a threshold, $T_{Sym}$, set to a desired significance from the $\chi_p^2$ distribution.

III. Results

A. 2D Bimanual Trajectory Following

With each relative metric, we got the following distributions and recognition accuracies for scaling, direction, and symmetry.

Scaling

Figures 12A, 12B:
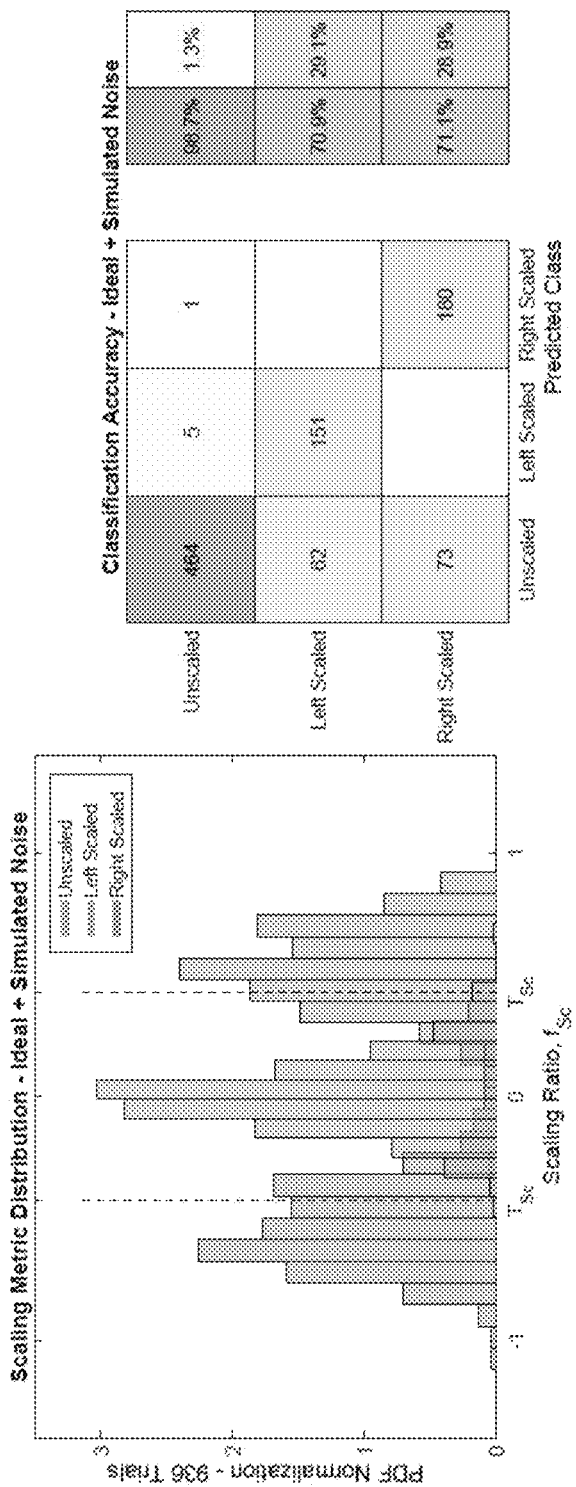
FIGS. 12A-12D depict histograms of $f_{Sc}$ values post movement from experimental bimanual movements of humans and white-noise corrupted ideal trajectories. Scaling for ideal trajectories was generated up to 2.
Figures 12C, 12D:
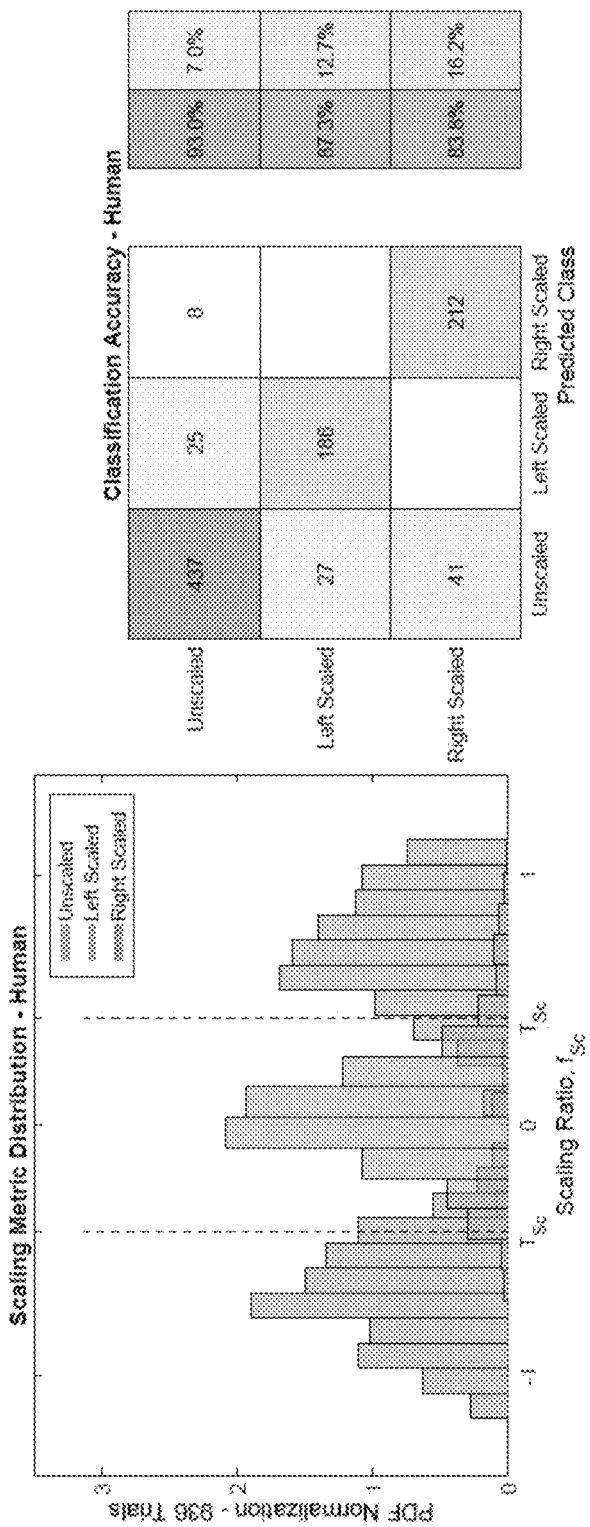

For scaling, statistics for ideal trajectories with simulated noise and human-generated trajectories are summarized in Table III, and they may be visualized in FIGS. 12A and 12C. With a threshold, $T_{Sc}$, set at 0.427, we are able to achieve classification accuracy of 98.7% and 93.0% post movement for ideal trajectories with simulated noise and human movements, respectively (FIGS. 12B and 12D).

TABLE III

Bimanual Coordination Metric Statistical Summary

| | Bimanual Path Following | | | |
|---|---|---|---|---|
| | Ideal + Simulated Noise | | Human | |
| Coordination Class | Mean | Variance | Mean | Variance |
| Scaling, $\hat{f}_{Sc}$ | | | | |
| Unscaled | 0.01 | 0.15 | 0.05 | 0.24 |
| Direction, $\hat{f}_{Dir}$ (mm) | | | | |

TABLE III-continued

Bimanual Coordination Metric Statistical Summary

| | | | | |
|---|---|---|---|---|
| Parallel | 0.0 | 0.16 | 0.1 | 0.81 |
| Together | −1.7 | 0.09 | −2.2 | 0.36 |
| Away | 16 | 0.16 | 2.3 | 0.49 |

| | Median | 95th Percentile | Median | 95th Percentile |
|---|---|---|---|---|
| Symmetry, $\hat{f}_{Sym}$ | | | | |
| Mirror | — | — | 0.013 | 0.131 |
| Point | — | — | 0.033 | 0.237 |
| Visual | — | — | 0.032 | 0.222 |

| Robotic Surgical Tasks | | |
|---|---|---|
| | Mean | Variance |
| Scaling, $\hat{f}_{Sc}$ | | |
| Unscaled | 1.22 | 0.01 |
| Left Scaled | 2.61 | 1.62 |
| Right Scaled | 2.64 | 1.30 |
| Direction, $\hat{f}_{Dir}$ (mm) | | |
| Parallel | −0.3 | 0.49 |
| Together | −2.6 | 1.00 |
| Away | 2.6 | 0.81 |

Direction

Figures 13A, 13B:
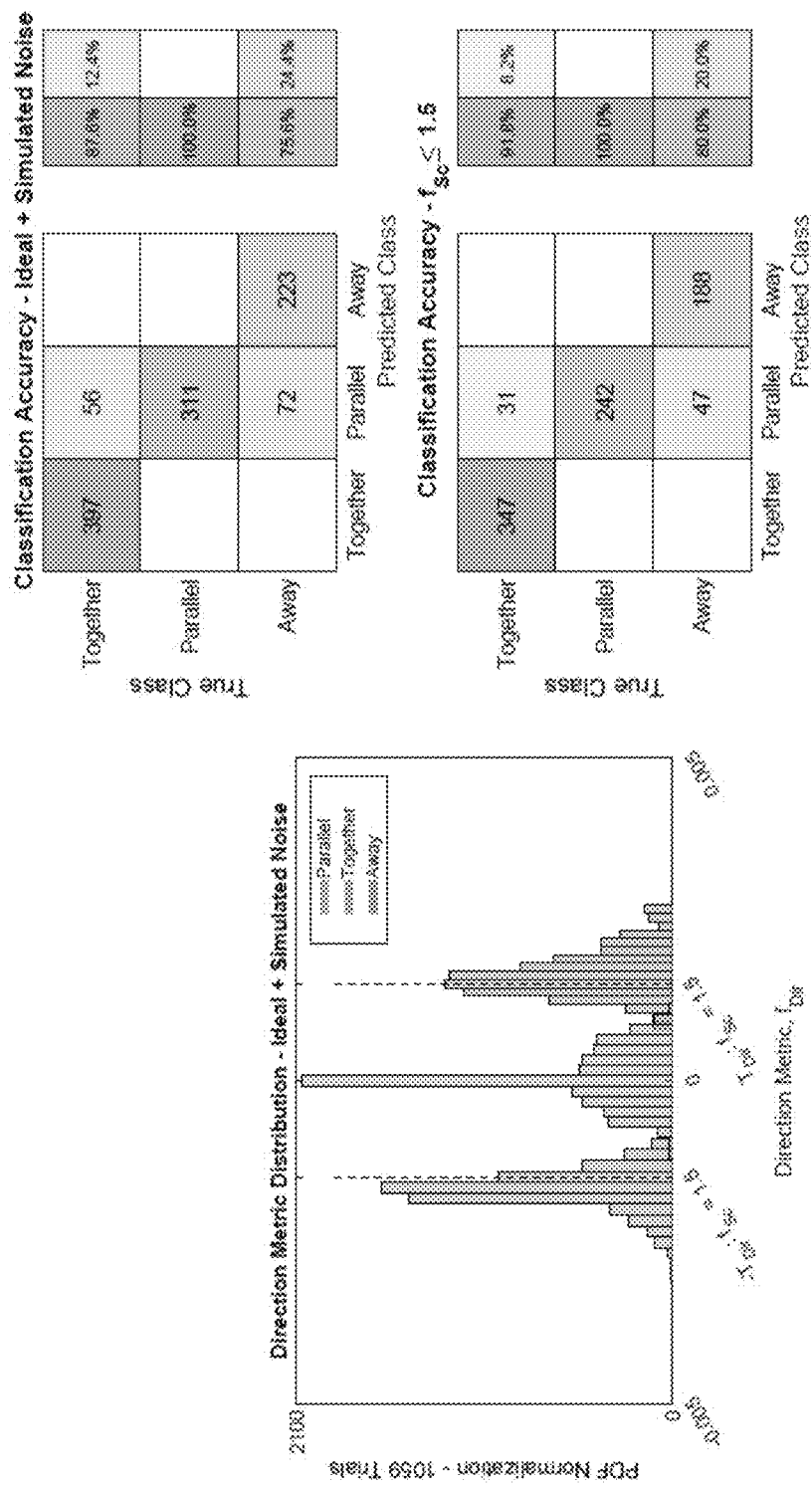
FIGS. 13A-13D depict histograms of $f_{Dir}$ values from bimanual trajectories with varying scale in the ideal case with simulated additive noise and experimental case from human movement. Theoretical thresholds, $T_{Dir}$, are marked by black dividers for the scaling value of $f_{Sc}=1.5$.
Figures 13C, 13D:
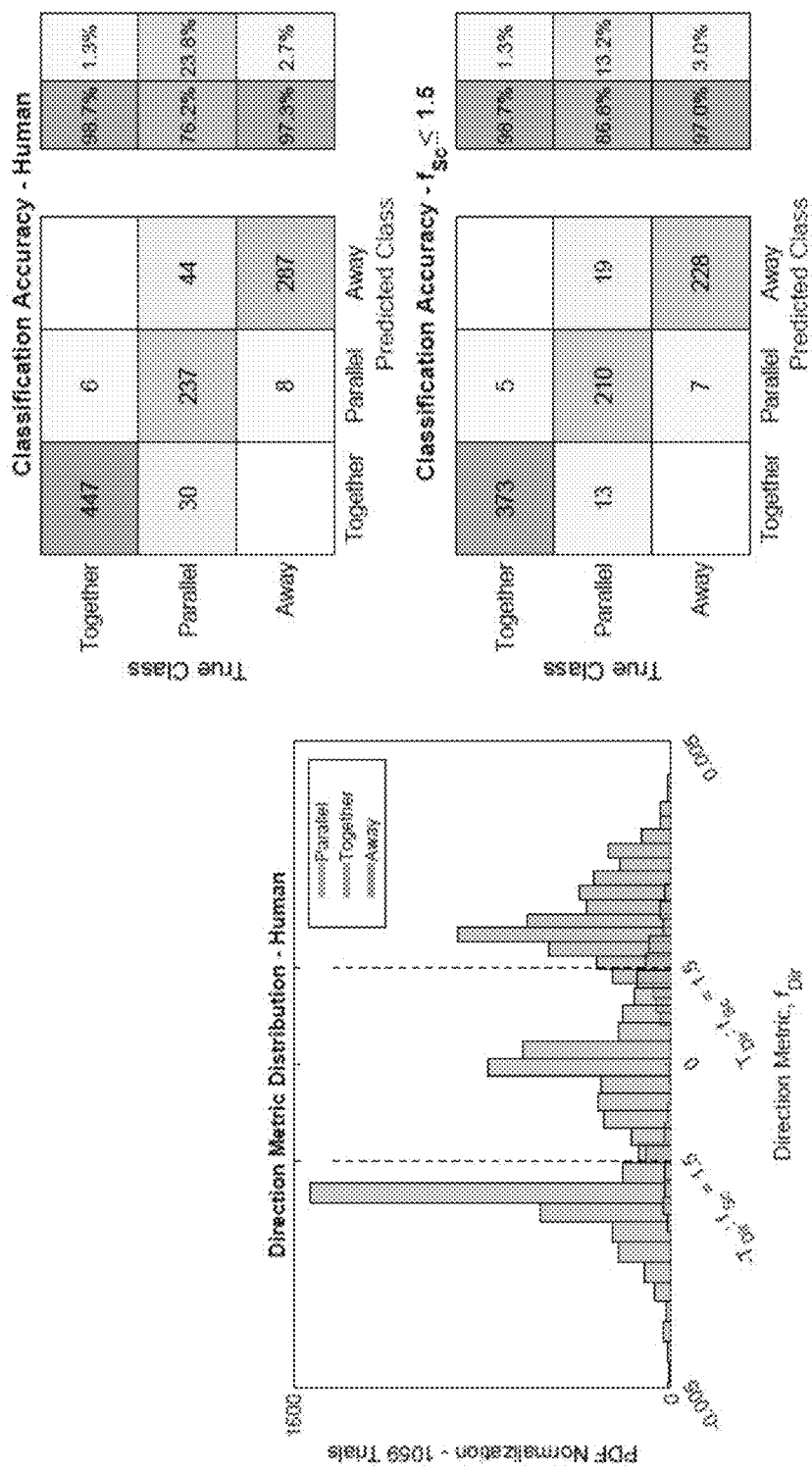

Statistics for direction are summarized and split by direction type in Table III, and distributions may be visualized in FIGS. 13A and 13C. With $T_{Dir}$ threshold set according to equation 13 at a minimum $\rho$ of 1 mm and $\theta_{par}=[-70°, 70°]$, we correctly classified 311 of 311 (100%) ideal parallel trajectories with simulated noise regardless of scaling (FIG. 13B). An overall accuracy of 87.9% was obtained for ideal trajectories with simulated noise for all scalings. For human-generated trajectories, we correctly classified 237 of 311 (76.2%) considering all trajectory scalings and 210 of 242 (86.8%) for trajectories with scaling less than or equal to 1.5 (FIG. 13D).

Symmetry

Figure 14A:
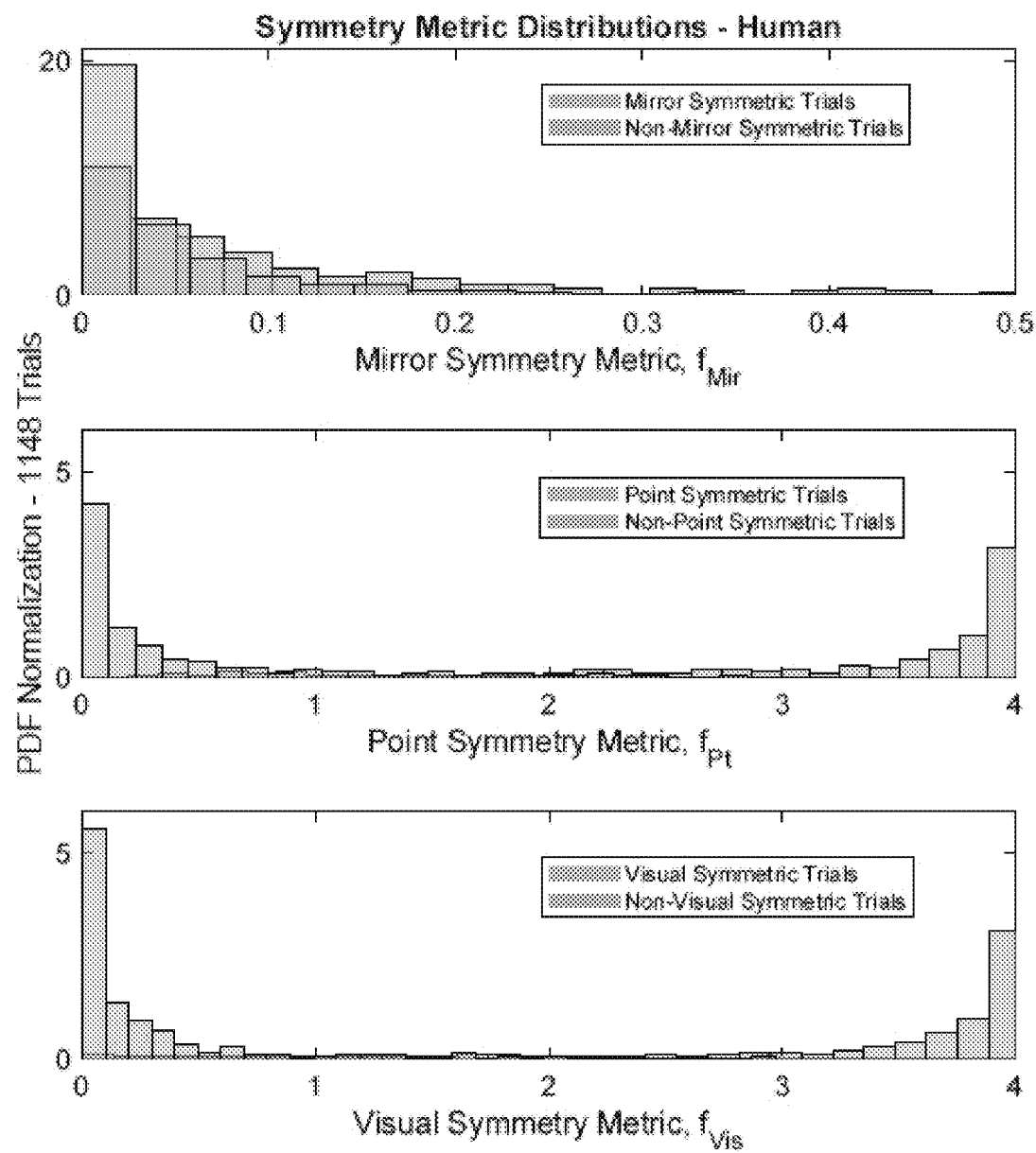
FIG. 14A depicts histograms of $f_{Sym}$ values after full movement from human-generated bimanual movements split into relative symmetry types. Theoretical thresholds were chosen at a significance value of 0.95 for mirror symmetry and 0.8 for point and visual symmetries. Distributions of the specific symmetry metric for trials of a different symmetry type are shown in orange.
Figure 14B:
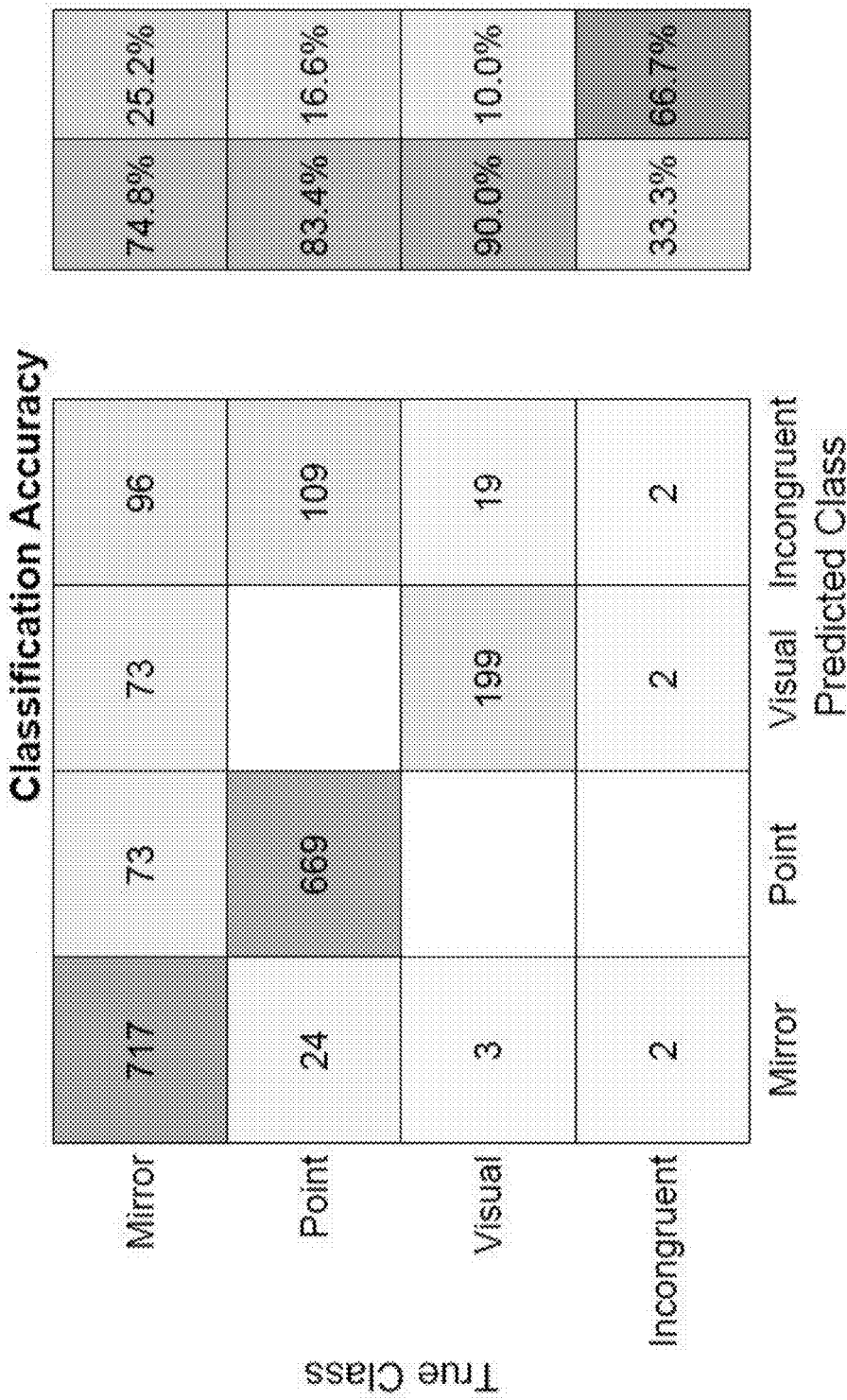
FIG. 14B depicts a confusion chart of discretely classifying symmetry type after whitening the symmetry noise matrix.

Since symmetry metrics, $\hat{f}_{Sym}$, are bound at a minimum value of 0 and skew toward a maximum value of 4, we present the statistics as median and 95th percentile in Table III. The distributions may be seen in FIG. 14A. After classification on ideal trajectories, 668 trials were both mirror and point symmetric and 172 trials were both mirror and visual symmetric. Also, 6 trials remained as incongruent. We were able to correctly classify 717 of 959 (74.8%) mirror, 669 of 802 (83.4%) point, 199 of 221 (90.0%) visual, and 2 of 6 (33.3%) incongruent human-generated trajectories as compared to classification of ideally generated trajectories. FIG. 14B depicts a confusion chart of discretely classifying symmetry type after whitening the symmetry noise matrix.

B. 3D Bimanual Surgical Tasks

Figure 15A:
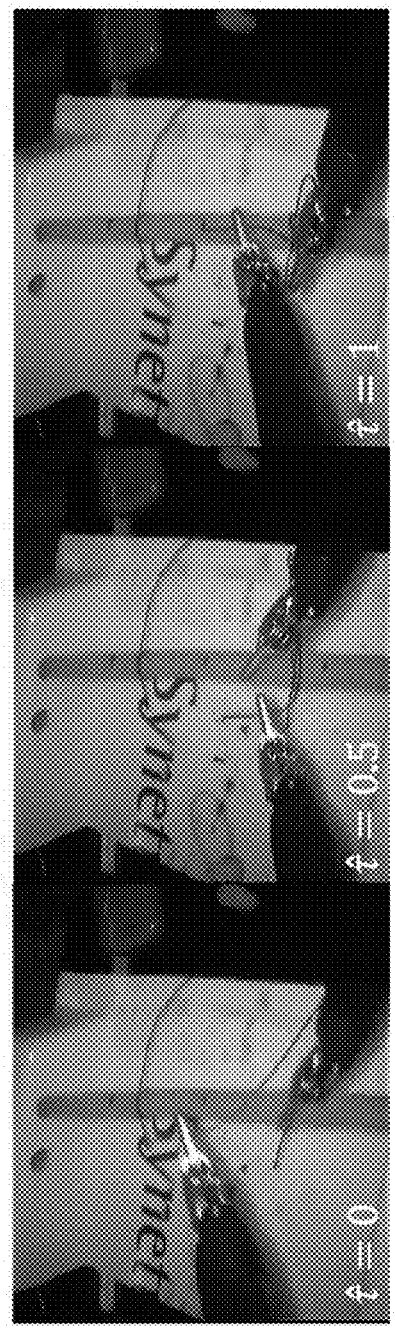
FIGS. 15A-15D depict online bimanual coordination metric computation for making a C-loop.
Figure 15B:
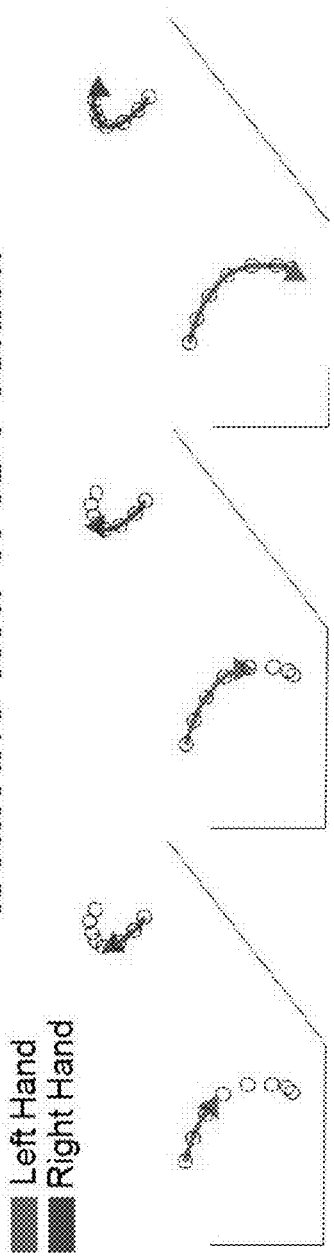
Figure 15C:
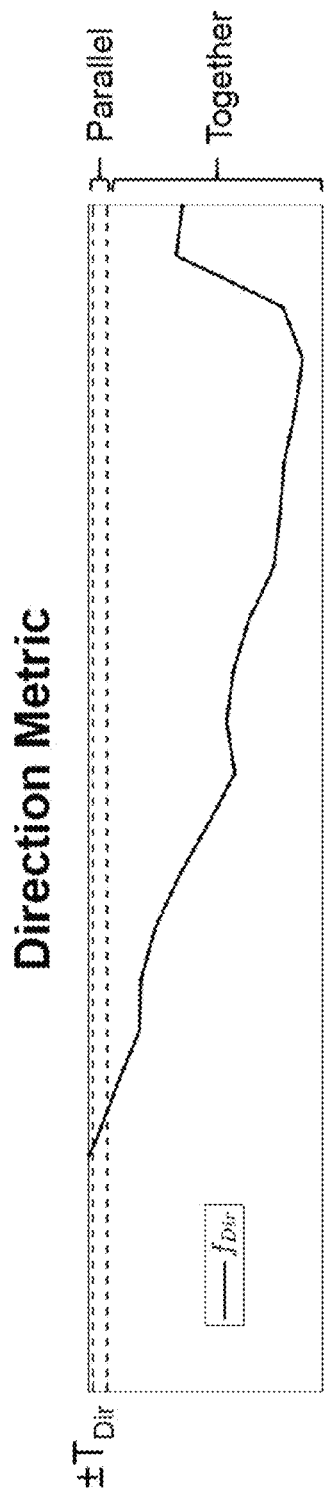
Figure 15D:
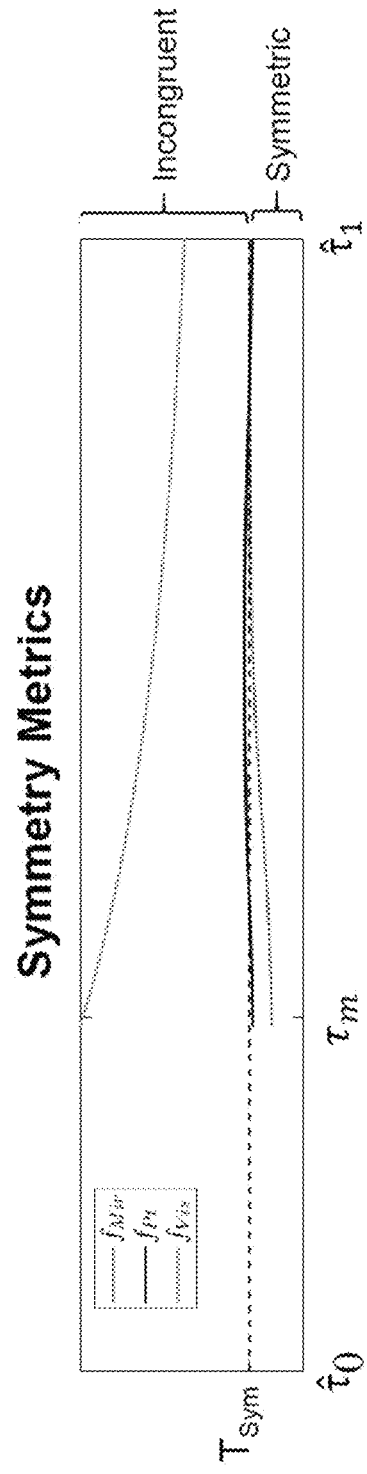
Figure 15E:
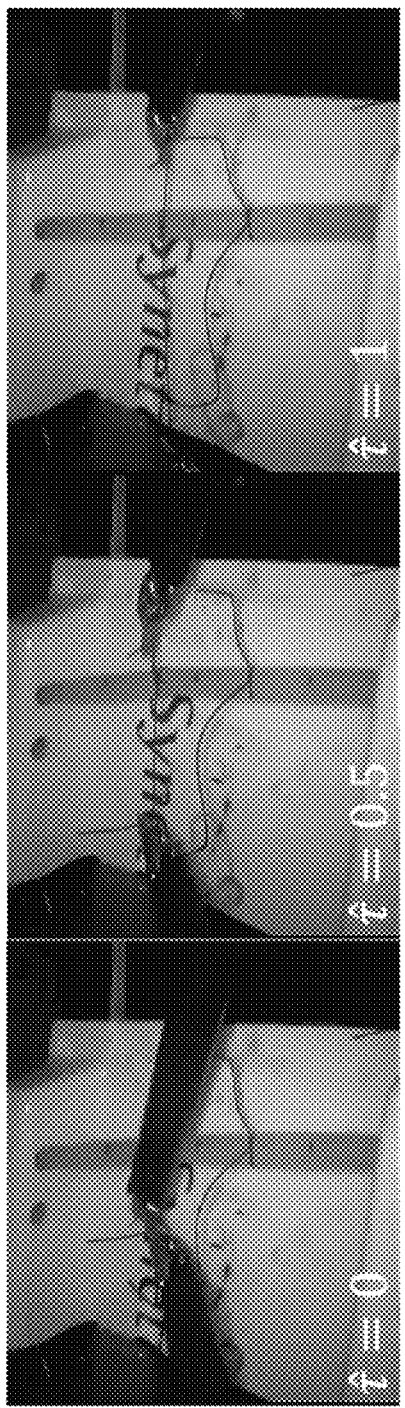
FIGS. 15E-15H depict online bimanual coordination metric computation for suture pulling.
Figure 15F:
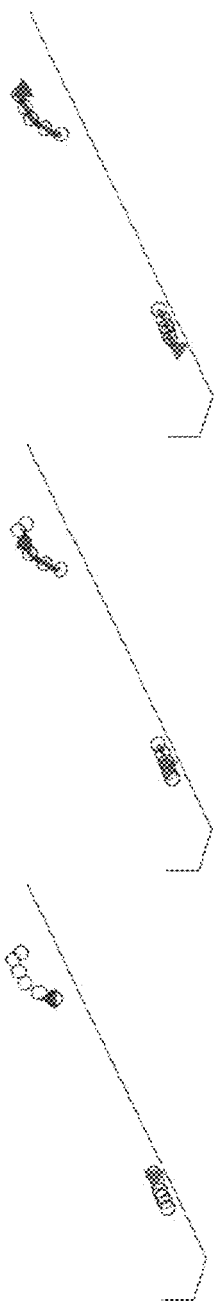
Figure 15G:
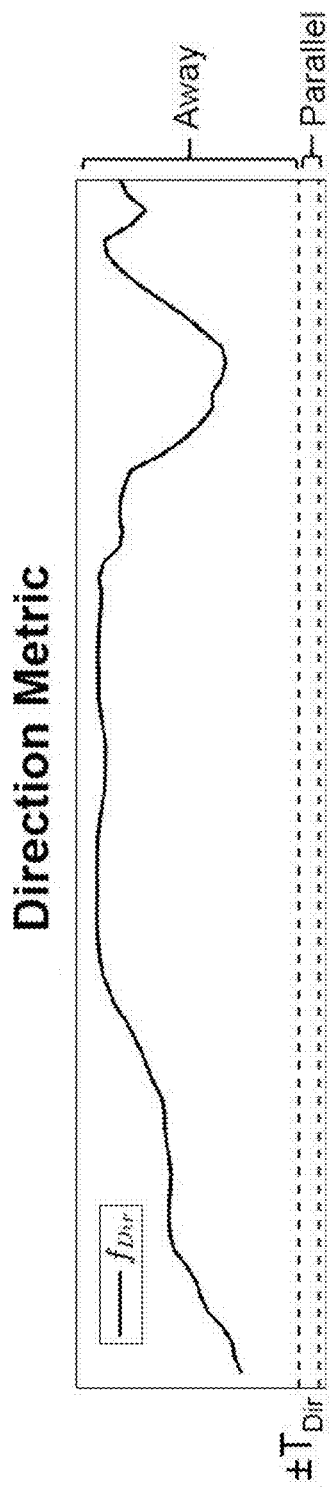
Figure 15H:
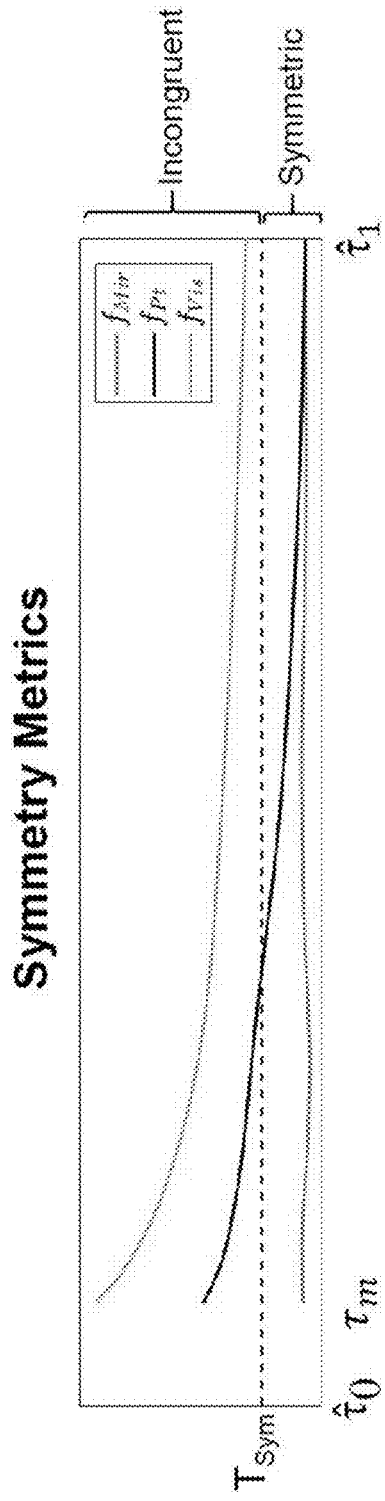

FIGS. 15A-15D depict online bimanual coordination metric computation for making a C-loop. FIGS. 15E-15H depict online bimanual coordination metric computation for suture pulling. FIGS. 15A and 15E are video capture images, FIGS. 15B and 15F are 3D position plots of the left and right hand. FIGS. 15C and 15G plot the direction metrics, $f_{Dir}$, computed over the parameterized movement. FIGS. 15D and 15H plot the symmetry metrics, $f_{Sym}$, computed over the parameterized movement. Making a C-loop has direction of "together" and "point" symmetry. Suture pulling has direction "away" and symmetry starting as "mirrored" then changing to "point."

The statistical results of classified movements from the 3D robotic surgical tasks are organized in Table III and Table IV. Table III contains means, variances, medians, and 95th percentiles for the relative metrics of all bimanual movements within a particular class. Table IV lists the number of bimanual movements labeled with a particular bimanual coordination class for experts and novices. Expertise was labeled within the data set. Some cells are colored with yellow and green. Yellow corresponds to an expected mode of coordination for the respective gestures, and green corresponds to the majority of a classified movement type. For example, we expect the gesture of "making a C-loop" to have direction of together and point symmetry. For direction, the number of movements with direction together is colored yellow, but since the majority of movements analyzed were of direction parallel, the cell for parallel movements is colored green. For symmetry of expert movements, point symmetry was both expected and contained majority of movements, so the cell was colored green.

however, is parameter based. This provides less ambiguity, more automation, and more comparability across studies. We also note that the use of thresholds isn't necessary because the metrics for scaling, direction, and symmetry are all continuously variable. These metrics can be used without defining strict limits on the different types of scaling, direction, and symmetry. Also, it is worth mentioning that the method can be used on data other than end-effector position. Using velocity or acceleration data for symmetry analysis may more closely tie together findings presented in this paper and studies on human motor planning and control.

The methods presented in this paper have shown to effectively sequence a movement and determine its scaling, bimanual direction, and symmetry with greater than 80% overall accuracy with respect to ideally generated trajectories. We showed the method for predicting direction is sufficiently accurate given three parameters of the move-

TABLE IV

Bimanual Surgical Gesture Coordination Classification Results

| | | Direction | | | Symmetry | | | | Scaling | | |
| --- | --- | --- | --- | --- | --- | --- | --- | --- | --- | --- | --- |
| | | | | | | | | | | L- | R- |
| | Gesture | Together | Parallel | Away | Mirror | Point | Visual | Incon. | Unscaled | Scaled | Scaled |
| Expert | Making a C-loop | 10 | 52 | 0 | 18 | 24 | 6 | 14 | 10 | 26 | 26 |
| | Pulling Suture | 16 | 18 | 32 | 48 | 14 | 0 | 4 | 10 | 30 | 26 |
| | Transferring Needle | 26 | 46 | 0 | 40 | 12 | 8 | 12 | 12 | 24 | 36 |
| Novice | Making a C-loop | 4 | 50 | 4 | 18 | 16 | 10 | 14 | 8 | 42 | 8 |
| | Pulling Suture | 18 | 46 | 64 | 78 | 14 | 10 | 26 | 38 | 48 | 42 |
| | Transferring Needle | 62 | 68 | 10 | 86 | 28 | 4 | 22 | 36 | 70 | 34 |

For symmetry, the measured shape and scale coefficients of the gamma distributions fit to $f_{Sym}$ values were 2.4 and 0.011 for mirror symmetry, 3.84 and 0.022 for point symmetry, and 7 and 0.014 for visual symmetry. With threshold significance at 0.9, thresholds for the types of symmetry were 0.048, 0.142, and 0.148 for mirror, point, and visual respectively.

IV. Discussion

In this Example 2, we presented a mathematical framework to describe the coordination of two trajectories using geometric features of kinematic data. We then developed classification methods from statistical principles to distinguish between classes of bimanual coordination given noisy, imperfect trajectories as measured from human-operated robotic systems. Finally, we applied this method to two different data sets to show its validity and application to real-world tasks.

All metrics of bimanual coordination as presented by this paper are easily computable by most modern microcontrollers within enough time to relay feedback to an operator. Therefore, we suggest this method is capable of being implemented online for adaptive control of a robotic system. This includes the metric for symmetry, which is the most complex since it requires eigenvalue decomposition. However, for applications with low trajectory dimension and reasonable trajectory lengths, online computation is feasible. Even though this method is better for lower dimensional kinematic data, it is possible to use the definitions and methods presented here for data of any dimension. Also the presented method is task independent, except for the classification of symmetry. Classification requires the use of thresholds, but the process of choosing these thresholds, ment (allowable range, scaling, and resolution). For symmetry, we showed overlap of types of symmetry, and we showed that characteristics of the system noise will affect distribution of the symmetry metrics. Thresholds for classification of symmetry types must be set with these in mind.

Regarding the overall approach, we note the following limitations. The presence of signal dependent noise in human reaching movements has been well established [64, 65], but we consider generally dependent noise for normalization of the symmetry metric and symmetry type classification. A specific model-based approach to characterize noise, such as a signal-dependent noise model, might provide clearer implications for the study of symmetric bimanual movement. For example, it may lead to a better method of choosing thresholds for symmetry. Secondly, we note the low number of incongruent trajectory trials included in this study, especially for simulated trajectories. We also attribute this to the random generation of incongruent trajectories. After manual inspection, many were found to be close to symmetric trajectories. Also, the low classification accuracy for incongruent human movements may be more indicative of the natural tendency for humans to couple their movements.

Regarding the analysis on the surgical training task data set, there is high variation in both expert and novice groups for both movement direction and symmetry. We can potentially relate this to differences in the local area of operation, the segmentation of subgestures, or error in the labeling of gestures. We also notice a greater variability in modes of coordination used by novices as compared to experts. We suggest, this may be due to the choppiness of movements or the lack of a robust set of "synergies" for performing the tasks. Further analysis into how these metrics change from novice to expert or as a subject trains has the potential to inform training techniques.

Regarding limitations for the application of the presented method, we note the following. The sequencing method presented in this paper was an effective tool to recognize human movement artifacts in the recorded signals. However, due to non-fluid, choppy movements, many of the extracted movements from the JIGSAWS data set may have been less suitable for analysis of bimanual coordination classes presented here. Many of the intended full movements were broken into segmented submovements. Therefore, the overall method in its current state may prove more useful on heavily processed data, such as mean trajectories as extracted from Learning from Demonstration (LfD) techniques or kinematic synergies [53]. Also, trajectories considered by this method need be at least once differentiable. Trajectories with sharp corners are more likely to be sequenced into multiple submovements. Future work regarding the segmentation of movements and automatic recognition of bimanual movements will be done to improve analysis and online implementation of the overall method.

V. Materials and Methods

We applied our approach to two different data sets for validation and to showcase applicability to realistic tasks.

A. Validation on 2D Bimanual Trajectory Following

Validation for the recognition of bimanual coordination modes was performed on a two dimensional kinematic data set [59]. This data set was collected from a bimanual trajectory following experiment during which subjects performed various bimanual movements that followed an ideal trajectory. We used only trials in which subjects performed simultaneous movements for all results. Data for this set were collected on a coupled 3D Systems Geomagic Touch system at 500 Hz with a resolution of 0.055 mm and synchronized by the Robot Operating System (ROS). Position data were filtered with a moving average filter of length 240 ms.

Variance of idle velocity signals was computed manually by taking 30 random samples of idle data. Sequencing for the data set was done using a velocity threshold band based on a significance of 0.7 for the lower band and 0.999 for the upper band. Offset detection was done using the lower threshold and full movement completion (i.e., reached a radius of 1.5 cm within the end of the ideal trajectory). Scaling of unscaled ideal trajectories was 1, and for scaled trajectories, it ranged from 1.5 to 2. Using the quantile function for a normal distribution, we set our threshold with significance level of 0.9 such that $T_{Sc}=0.427$.

Ideal trajectories were corrupted with independent pseudo-random generated noise with zero mean and 0.3 mm standard deviation to get simulated distributions for scaling, direction, and symmetry metrics. We report statistics on the distributions of each metric and perform discrete classification as according to the previous sections. For discrete classification of symmetry, ideal trajectories were also whitened and tested for symmetry type. Therefore, some ideal trajectories had multiple symmetry types (e.g., mirror and point) and some ideal trajectories even though not perfectly symmetry were classified as symmetric instead of incongruent. Classification accuracies for bimanual coordination classes are reported as per type.

Some trials were excluded from analysis of different bimanual metrics. For scaling results, we excluded trials of one target due to inconsistent scaling. For direction results, a small number of trials were excluded because the ideally generated trajectory did not fit the definition for "parallel". For these excluded trials, ideal parallel trajectories were generated by fitting a curve to randomly placed control points within a range of 160° [59], so the ideally fit curve did not necessarily intersect the control points.

B. Application to Bimanual Surgical Tasks

To show the generalization from a known 2D task to realistic 3D tasks, we implemented our method on the JHU-ISI Gesture and Skill Assessment Working Set (JIGSAWS) [66]. JIGSAWS is a 3D kinematic data set taken from robotic surgical training tasks, knot tying, suturing, and needle passing, and performed by 8 subjects ranging from novice to expert surgeon. This data set is labeled to correspond with 15 different surgical gestures. Some gestures are unimanual, and since we are interested in bimanual movement coordination, we limit the analyzed gestures to those requiring both hands, namely "Making a C-loop", "Pulling Suture", and "Transferring Needle". Position data were taken from the master manipulators at 30 Hz and filtered with a moving average filter of length 50 ms.

Variance of idle velocity signals was computed manually by taking 30 random samples of idle data. Sequencing for the data set was done using a velocity threshold band with a significance of 0.7 for the lower band and 0.998 for the upper band. Only movements of sufficient length of over 0.5 seconds were considered for analysis. The scaling threshold was set at $T_{Sc}=1.4$ using an assumed distribution specified by equation 10. The threshold for direction was set according to a minimum change in distance, $\rho=1$ mm. Symmetry distributions and thresholds were chosen through a manual selection process. A sample of 100 movements as segmented from trials labeled as performed by expert surgeons from the data set were evaluated for the type of symmetry from viewed plots of position data and computed $\hat{f}_{Sym}$ values. These values were compared to histograms for the full pool of samples. Gamma distributions were fitted to the separated groups, and then thresholds for symmetry types were set using a significance level of 0.9. Types of symmetries are prioritized in the classification decision in the following order: mirror, point, then visual.

VI. Supplemental Text

A. Classes of Coordinated Bimanual Movement and Human Motor Control

Coordination has long been studied, especially by fields interested in human motor control (i.e., neuroscience, biomechanics, medicine, etc.) [58,67]. Unfortunately, some of the language in prior studies has been subjective, ambiguous, or lacking agreement, especially when compared across disciplines. A recent push has been made to unify and present a common language, thus making it easier to advance our understanding of human coordination [68]. It is from this common language that we formulated our classification, which includes the classes of sequence, scaling, number of targets, direction, and symmetry.

Sequence is determined by the timing of the motion of hands. Hands may either move sequentially, one after the other, or simultaneously. This notion of sequence is not to be misconstrued with phase characterization. Phase concerns cyclic or rhythmic movements rather than discrete ones. Prior research on the sequence of movements has two main findings. The first is choice of movement sequence by a performer. In many tasks, a sequence of movements directed toward completing a task starts with the non-dominant hand to establish stability [69,70]. Also, in more difficult manual tasks, novice performers tend to have choppier and more sequential movements, choosing not to use the hands simultaneously to achieve better accuracy [70]. This may be related to the other characteristics of the motions necessary for the task and difficulty in producing the motor commands.

Scaling of movement compares the size of one side to the other. Studies on laterality find that the non-dominant hand typically makes larger movements as compared to the dominant [69]. This is done so the non-dominant hand stabilizes the movement of the dominant, so it may be controlled more intricately. Disruptions in scaling can lead to poor performance of either hand. It has been shown that when performing symmetric tasks, if the scaling of one hand is increased, the accuracy of the contralateral decreases [55-57].

The number of targets of a movement closely aligns with the number of tasks being performed. A single target means a single task while two or more can mean multitasking. The number of targets and the attention necessary to reach the target(s) plays a key role in performance of bimanual tasks. Typically, movements with two or more targets are more difficult and have lower accuracy for novices because of the division of attention. However, this is not al-ways the case. Interestingly, one study found that single target tasks show less spatiotemporal coupling during point symmetric movements, especially for stroke patients [71]. This could potentially be due to higher reliance on the dominant or non-paretic arm to complete the single task. Also, other factors of bimanual movement and conceptualization of the movement therein could influence performance given the number of targets. Understanding the number of targets being attempted may help more advanced systems to provide assistance during task execution.

Direction of a bimanual movements is a less studied factor. Prior experiments require subjects to move their limbs in varying directions with respect to each other, but the factor of direction itself is usually grouped with particular symmetries or differing number of targets. However, we can relate the notion of direction to aspects of established motor control models, such as the stochastic optimal control and estimation model for reaching [65]. In this model and similar models, perception of movement is corrupted by multiplicative noise scaled by distance away from the center of focus. Therefore, the farther away from visual focus the movement is, the worse one's ability to estimate the position or velocity of the movement becomes. In terms of direction, it is logical to think how the direction of one hand compared to the other can affect sensory perception. The farther the hands move away from each other, the more divided one's attention must be, which may cause multiplicatively increasing error. In the stochastic optimal control model, we must also consider generation of motor commands. Certain directions of the hands may also indicate multiple targets, thereby implicating separate control policies for each hand. Moreover, while direction cannot directly relate to current theories on upper-limb motor control, it has the potential to indirectly indicate useful results from the theories, such as an expected increase in error from increased distance between the hands.

Symmetry of human movement is a long studied phenomenon in the areas of physiology, psychology, neuroscience, laterality, and many more. The treatment here will focus on symmetry as it relates to human motor control and learning and how it has been leveraged in bimanual robotic systems. The first thing to note are the different types of symmetries observed in various rhythmic and goal-oriented tasks. In many tapping tasks, in-phase and 180° out-of-phase movements are the most stable while asynchronous out-of-phase movements can be trained [72,73]. For goal-oriented tasks, there are three main types of symmetries that are considered: mirror symmetry, point symmetry, and visual symmetry [68]. Mirror symmetry is noted as symmetry across the sagittal plane. Point symmetry is noted as opposing symmetrical movements such as turning a steering wheel or throwing two pieces of string around each other to form a knot. Visual symmetry is noted as a coupled movement of the limbs in the same direction like lifting and moving a single object.

With regard to real-world problems, symmetry tends to appear most in work on rehabilitative efforts, especially for persons with brain injury like stroke. Due to injury, bimanual coordination becomes impaired and coupling strength diminishes [74,75]. Mirror symmetry tends to be the easiest and most stable form of movement because of the similar activation of homologous muscles in symmetric orientation [76,77]. Therefore, the command signals need not differentiate and require more processing from the central nervous system. Some forms of therapy, i.e. mirror therapy, attempt to leverage the mirrored coupling of upper limb movements to affect physical change in the paretic arm of brain-injury patients [78,79]. It is hypothesized that by coupling the movement, the brain can form new connections to the paretic side [79,80]. Recently, several upper limb robotic devices or exoskeletons have been created to assist with this therapy by generating movement in the paretic arm as measured and mirrored from the non-paretic side [80-82]. Therefore, it is important to be specific when considering symmetry, objectively define symmetry for use in the robotic systems that leverage it, and create classes and class boundaries for comparison across studies.

Example 3

I. Introduction

Haptic feedback holds great promise as a tool to improve motor performance and skill training. Haptic feedback, when designed to guide motion or provide performance indicators, appears in research on medical training simulators [83,84], sports training [85,86], and rehabilitation exercises [87-89], to name a few. In these applications, researchers have tested various forms of haptic feedback including vibration cues [87,89,90] and virtual forces [84-86,88]. Vibration cues serve to provide extrasensory information (e.g., situational awareness or direction cues), while virtual forces change the dynamics of a task to assist or resist an operator. Overall, the results of these tests tend to show reduction in movement error or improvement in other specified performance objectives, like smoothness, for well-designed feedback strategies.

The paradigm for designing haptic feedback currently relies on measured performance objectives (e.g., error) as related to predetermined, "desired" trajectories or environmental factors of a given task. Researchers use haptics to both assist and resist operators based on these dependencies [91]. Assistive feedback aids users to improve performance and potentially encourage perseverance in training. In two path following studies, vibration cues informed subjects of significant deviation from the intended path [92,93]. For both studies, the trials with vibration cues correlated with decreased positional error. For one study, the cues also correlated with improved speed given additional smoothness-based feedback [92]. Haptic assistance has also been implemented via guiding forces. Researchers have employed guidance via proportional-derivative (PD) control to train subjects to follow 3D paths in simple path following tasks as well as surgical training tasks [94,95]. This kind of haptic feedback was reported to reduce positional error and improve efficiency as compared to visual guidance alone.

Similar haptic guidance has been used in rhythmic tasks to decouple bimanual movements more accurately [97]. In the case of motor skill training, resistive haptic feedback is hypothesized to enhance adaptation and learning over assistive feedback due to a developed reliance on the assistance [91]. Several studies have shown that in both simple reaching tasks and surgical training tasks, subjects who experience resistive or error enhancing feedback learn better than their counterparts who receive assistive feedback or no feedback at all [84,98]. While all these prior approaches to haptic feedback design show promise for improving motor performance and training, they require exact specification of a desired trajectory and have not fully considered bimanual coordination.

Bimanual coordination is an important facet of performance in many motor skills, both elementary and advanced. Prior work has shown that bimanual movements can be classified according to geometric characteristics, like direction and symmetry, through robotic sensing [99]. This type of classification is of interest in interdisciplinary, motor control studies [100] and correlates with varied performance during path following [101,102]. By designing haptic feedback with regard to a high-level, geometric classification of bimanual coordination, it becomes independent of unique trajectories. Also, we can potentially shape movement of the bimanual limbs by coupling them through augmented haptic forces. To investigate the effects of bimanually-dependent haptic feedback on performance as related to a geometric classification of bimanual coordination, we conducted a 2D trajectory following experiment and present the results in this paper.

II. Methods a. Subjects

A total of 11 able-bodied subjects, aged 19 to 31 years (mean 24 yrs), were recruited for the study. Of these subjects, 7 were born as male and 4 were born as female. All subjects provided informed consent. All subjects were right handed except for two. Of the two, one was ambidextrous. This subject reported use of the right hand for writing and throwing and use of the left for activities like swinging clubs or bats. We surveyed subjects on experience with human-machine interfaces using a scale of 1 (no experience) to 4 (able to program a human-machine system). The survey results were evenly distributed for all choices (1s: n=3, 2s: n=2, 3s: n=2, and 4s: n=4).

B. Bimanually-Dependent Haptic Forces

The focus of this work is the assessment of bimanually-dependent haptic forces on performance outcomes of movements with specified coordination. Each haptic force was implemented virtually. All subjects experienced a base haptic force during every movement and one of five bimanually-dependent haptic feedback conditions (FIG. 16).

Figure 16:
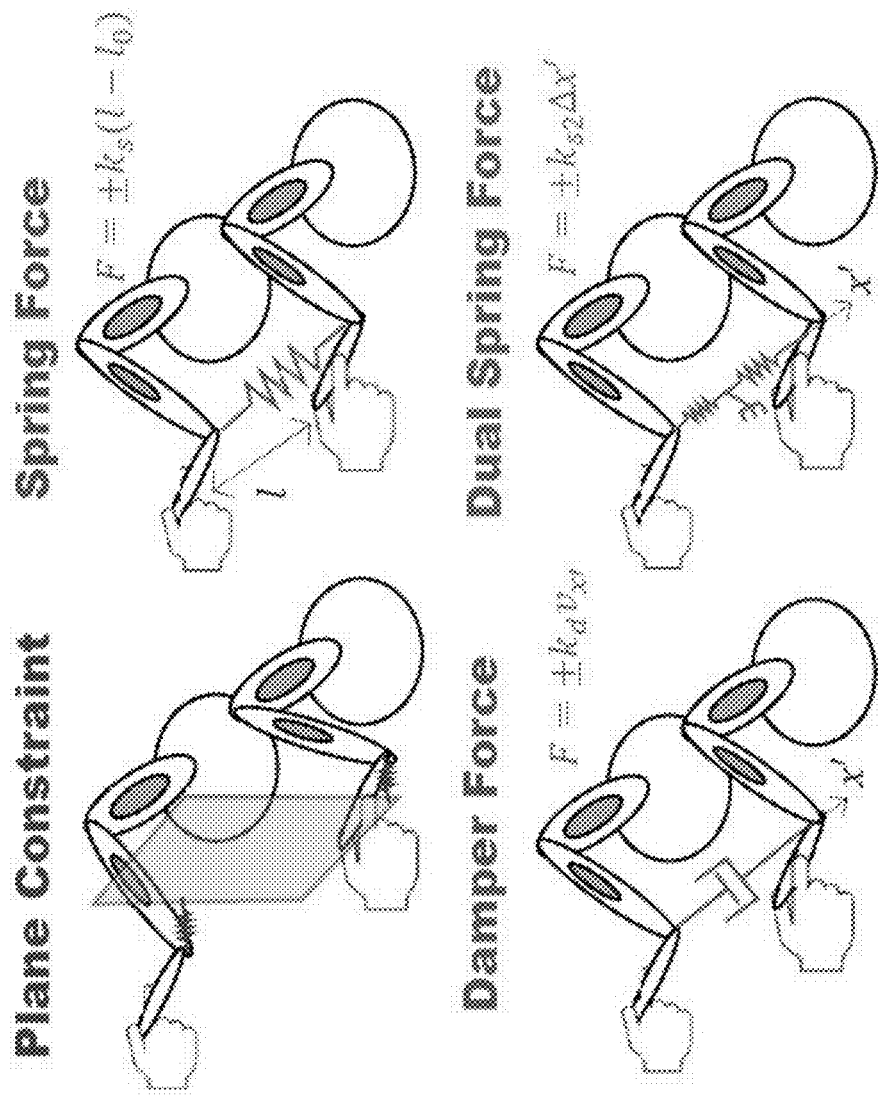
FIG. 16 depicts an illustration of the bimanually-dependent haptic forces used in an example.

FIG. 16 depicts an illustration of the bimanually-dependent haptic forces used in this Example 3. Springs constrained subjects to a vertical 2D plane for all trials. A virtual spring constrained the distance between hands. A virtual damper constrained velocity toward or away from each hand. A dual spring force pulled the hands together to a central position.

The base haptic force was a vertical 2-dimensional plane constraint that was imposed by stiff, virtual spring forces set with spring constant of $k_p$=120 N/m. This constraint was imposed to ensure the task was 2D and reduce any error due to movement in or out of the plane. The five bimanually-dependent haptic feedback conditions were:

1) Null: No haptic forces except for the plane constraint
2) Spring: A virtual spring between the hands set at an initial length equal to the distance between starting positions and set with spring constant, $k_s$=10 N/m
3) Damper: A virtual damper between the hands and set with damping constant, $k_d$=10 N/m/s
4) Combo. Spring-Damper: Additively combined spring and damping forces
5) Dual Spring: Two springs grounded at the midpoint of the hands and set with spring constant, $k_{s2}$=15 N/m.

C. Trajectory Following Experiment

Figure 17:
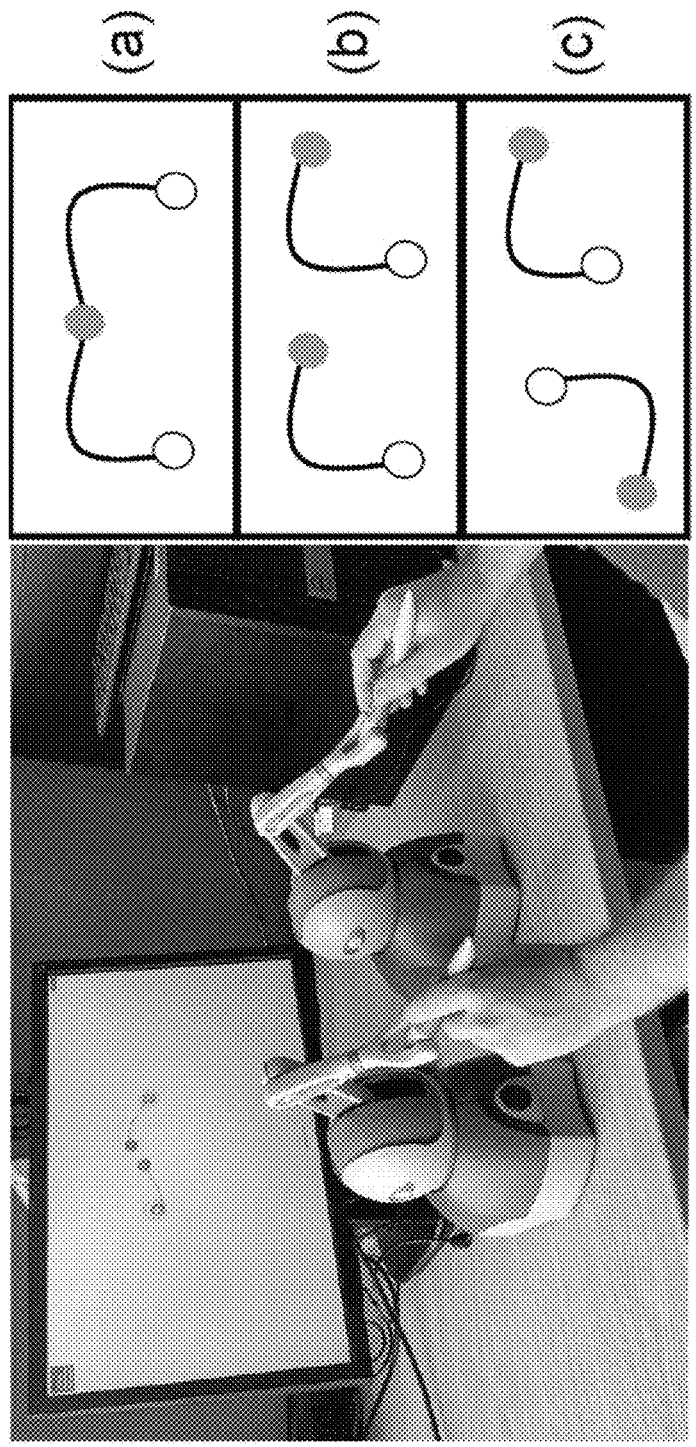
FIG. 17 depicts a bimanual trajectory following with haptic devices and example coordination modes.

FIG. 17 depicts a bimanual trajectory following with haptic devices and example coordination modes. Trajectories were randomly generated to have a particular coordination mode, defined as having a specified number of targets, direction, and symmetry. For example, panel (a) of FIG. 17 has one target, direction of together, and mirror symmetry, panel (b) of FIG. 17 has two targets, direction of parallel, and visual symmetry, and panel (c) of FIG. 17 has two targets, direction of away, and point symmetry.

Subjects sat at a desk with arm rest, computer monitor, and two Geomagic Touch™ haptic devices to perform bimanual trajectory following. We adjusted the setup for subjects to reach the entire workspace comfortably (FIG. 17). Subjects used the haptic devices to control gray, spherical cursors on screen. Trajectories were demonstrated by red spheres of the same size as the cursors. Black traces of the trajectories lasted until the red spheres completed the demonstration. Subjects could replay the trajectory as many times as needed before attempting to reproduce it. However, subjects were instructed not to attempt the trajectory until the red spheres finished the demonstration. All trajectories started from the same location and were randomly generated to have a coordination mode, similar to a previous experiment [102]. Coordination modes are sets of trajectories with particular types of symmetry, direction, and number of targets [99,102]. Number of targets are 1 and 2. Direction types are together (Tog) when the distance between hands decreases, parallel (Par) when the distance between hands remains near constant, and away (Awy) when the distance between hands increases. Symmetry types are mirror (Mir), point (Pt), visual (Vis), and incongruent (Inc). Panels (a), (b), and (c) of FIG. 17 each show an example of a different coordination mode.

The experiment consisted of 1 training session and 4 randomized experimental blocks. For the training session, the primary author demonstrated the task to subjects. Then, subjects performed 16 practice trajectories. Subjects experienced each type of haptic condition during practice but were not explicitly told the types of haptic forces. Subjects were instructed to reproduce each trajectory as accurately and smoothly as possible in one discrete movement. Each experimental block contained one randomized type of bimanually-dependent haptic feedback, including the null condition, and 4 repetitions of trajectories for a particular coordination mode for a total of 44 trajectories per block and 176 trajectories total. All 44 trajectories in each block were randomized both by generation and order.

D. Data Acquisition and Processing

Data were acquired at 120 Hz from the haptic devices and processed with moving average filters. The position data filter was of length 250 ms. The velocity data, acceleration data, and jerk data filters were of length 83 ms. Subject trajectories were trimmed using a log-likelihood ratio onset detection method [103]. For the completion condition, velocity data was continuously monitored until the computed innovations dropped below the onset threshold. Then, the subsequent local minimum was marked as the completion point. Every trajectory was manually checked for errors. Errors include short movement time (<0.25 s), an onset or offset at greater than 20% into the velocity curve, or a sequential movement indicated by clear separation of left and right hand velocity curves. If a subject's trajectory was deemed to have any of these errors, then the trajectory was removed from analysis. A total of 144 trajectories (7.4% of total data) were removed.

E. Performance Objectives

To assess performance, we computed two main performance outcome metrics and one supplementary metric. The first main metric is trajectory correlation error, defined by $$\text{Trajectory Correlation Error} = 1 - \frac{\text{Cov}(\Phi, \Phi^*)}{\sigma(\Phi)\sigma(\Phi^*)} \quad (1)$$

where $\phi$ and $\phi^*$ are matrices of equal length vectors that are tangent to the subject and ideal trajectory, Cov(•) is the covariance function, and σ(•) is the standard deviation. Trajectory correlation error is a reflection of shape accuracy as compared to the demonstrated trajectory [102,104]. The second metric is dimensionless integrated absolute jerk (DIAJ) [102,105], a measure of smoothness, defined by $$DIAJ = \frac{D}{v_{mean}} \int_D \left\| \frac{d^3 x(t)}{dt^3} \right\| dt \quad (2)$$

where $d^3 x(t)/dt^3$ is the third derivative of position with respect to time, D is the movement time duration, and $v_{mean}$ is the mean velocity.

For each main performance outcome metric, we summed both left and right hand scores. The supplementary metric was average speed, so we could assess the speed-accuracy trade-off. Speed was averaged for each trajectory and between left and right hands.

F. Statistical Analysis and Hypothesis Testing

Figure 18:
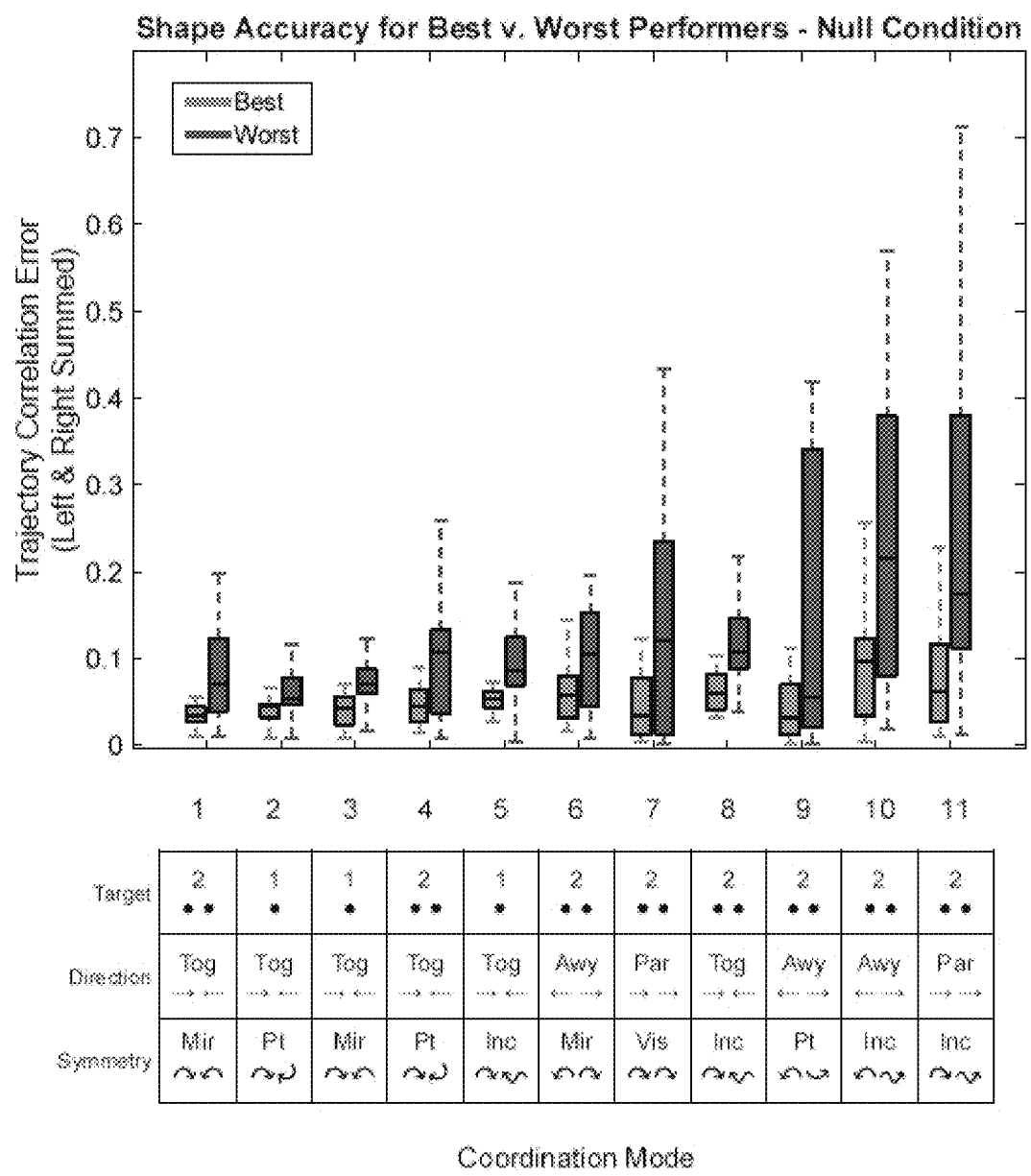
FIG. 18 depicts shape accuracy box plots for best and worst performers over the eleven bimanual coordination modes.

FIG. 18 depicts shape accuracy box plots for best and worst performers over the eleven bimanual coordination modes. Boxes show 25th to 75th percentiles and median. Whiskers extend to minimum points and maximum points within 1.5× the inter-quartile range. The worst performers had higher trajectory correlation error and may benefit more from bimanually-dependent haptic feedback.

For subjects who perform worse under null conditions, we hypothesize: (1) a spring will improve the shape of parallel trajectories due to the distance constraint between the hands, (2) a damper will improve the shape of point symmetric trajectories due to a rotational constraint, (3) dual springs will improve trajectories of one target due to a pull toward a center location, and (4) a damper will improve smoothness for all trajectories due to its velocity resistance and relation to jerk. To test our hypotheses and analyze effects of bimanually-dependent haptic forces on bimanual coordination modes, we first split subjects into best and worst performers for each coordination mode under the null condition by using a normalized score (FIG. 18). This was done because performance augmentation is typically applied to novices or persons who perform worse at a given task. The score was computed as the sum of the assessed performance outcome's median and variance and normalized by the group maximum. Also, coordination modes are ordered by this score.

We fit a generalized linear mixed-model (GLMM) to data from the worst performers with subjects as a random effect and ran several multiple comparison tests [106,107]. The GLMM was estimated via Laplace method, and trajectory correlation error was fit with gamma errors and a reciprocal link function, while DIAJ and speed were fit with normal errors. Bimanually-dependent haptic forces were modeled as fixed effects. Effects of experimental block were removed from the model due to clear insignificance. Multiple comparisons were performed using sequential F-tests with Bonferroni corrections.

III. Results

Figure 19A:
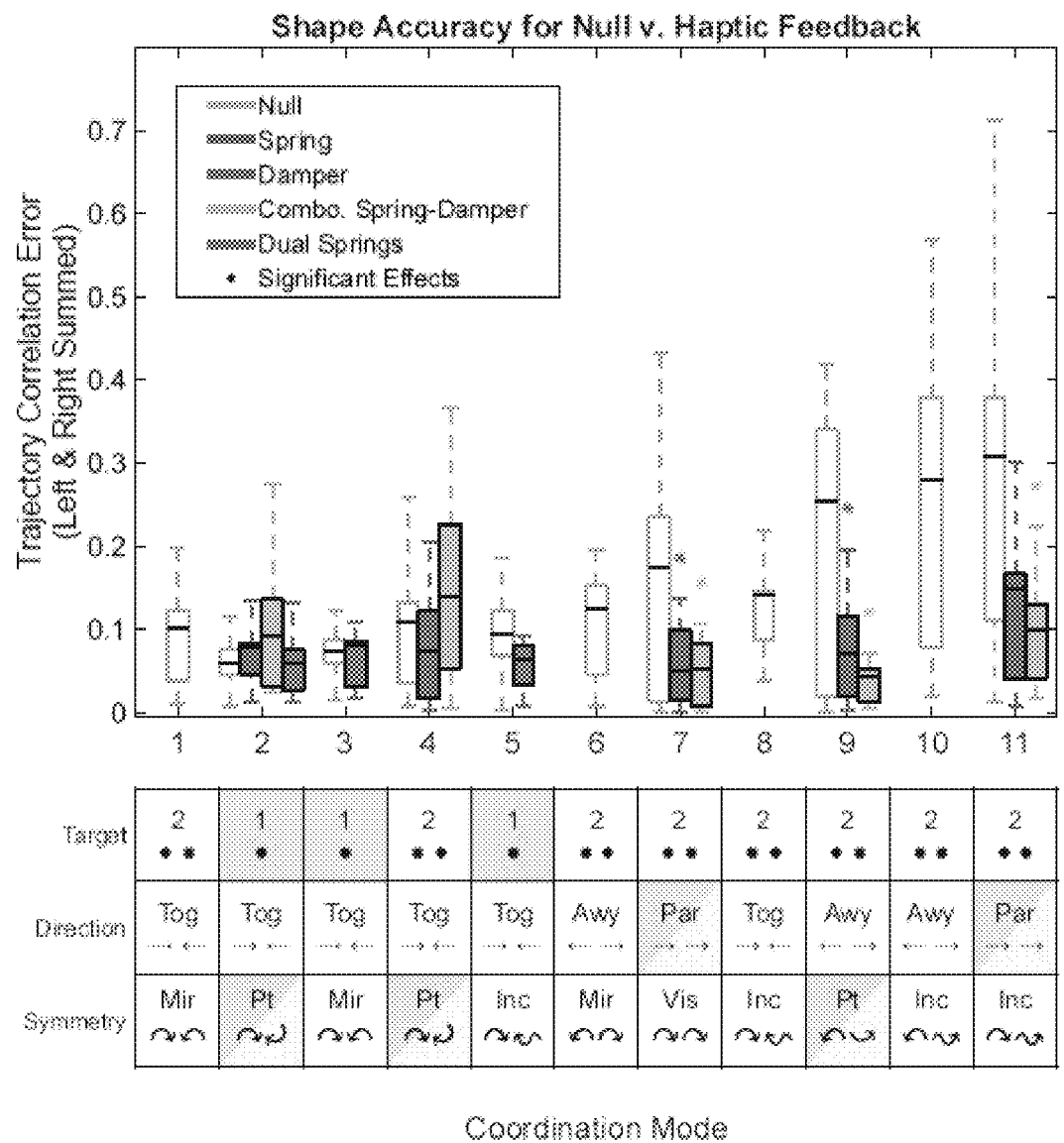
FIG. 19A depicts shape accuracy box plots for haptic conditions as related to hypotheses for worst performers.
Figure 19B:
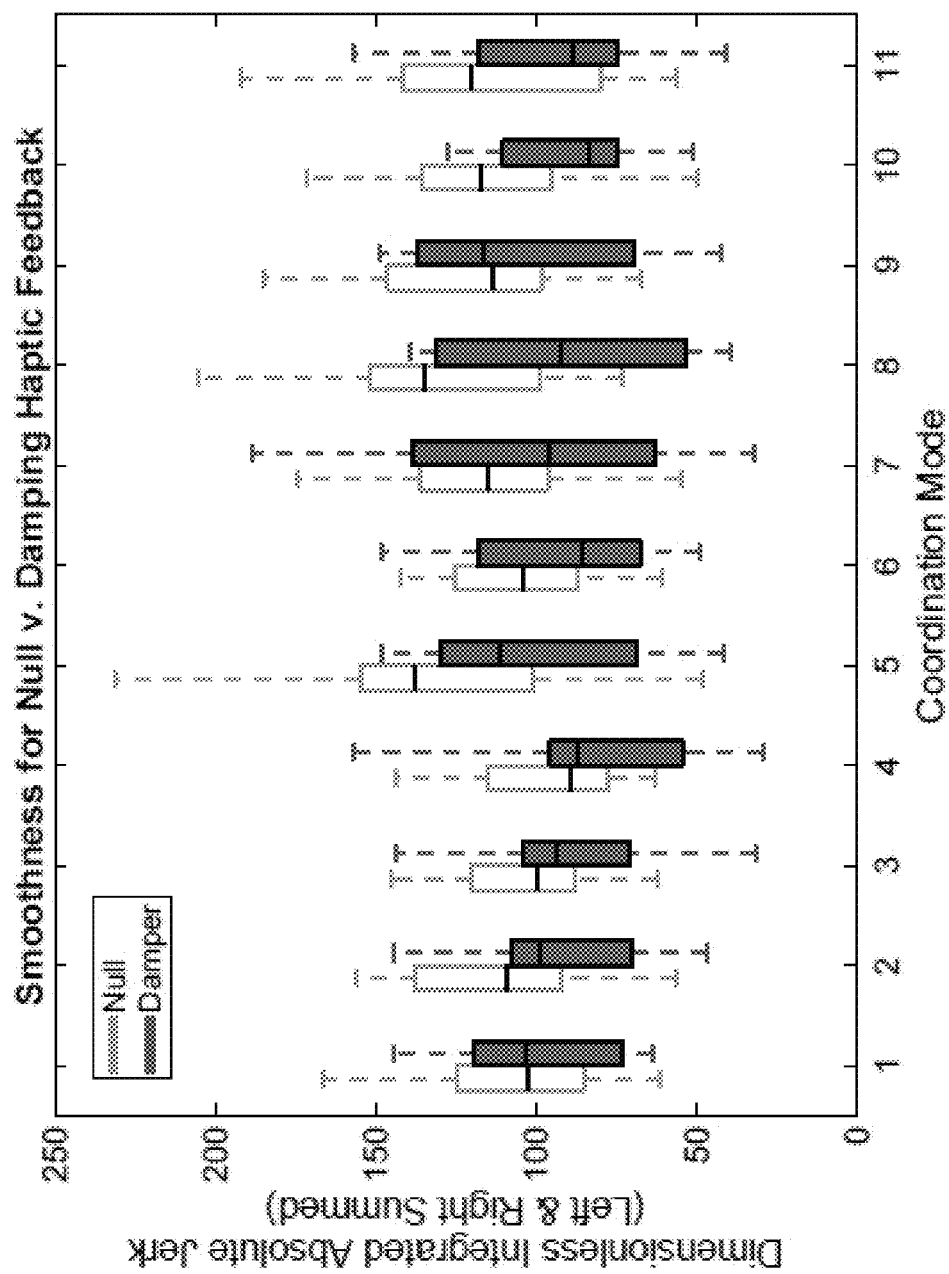
FIG. 19B depicts smoothness box plots for haptic conditions as related to hypotheses for worst performers.

FIG. 19A depicts shape accuracy box plots for haptic conditions as related to hypotheses for worst performers. FIG. 19B depicts smoothness box plots for haptic conditions as related to hypotheses for worst performers. Boxes show 25th to 75th percentiles with mean. For FIG. 19A, shape accuracy, whiskers extend to minimum points and maximum points within 1.5× the interquartile range. For FIG. 19B, smoothness, whiskers extend in both directions to points within 1.5× the interquartile range. Stars above boxes indicate a statistically significant effect of bimanually-dependent haptic feedback as compared to the null condition. Colors in the coordination mode table reflect hypotheses pairings of a coordination mode and haptic feedback condition.

Hypothesis 1) For coordination modes with direction of parallel under the spring condition and spring-damper condition (FIG. 19A—Coordination Modes 7 and 11), trajectory correlation error was reduced as compared to the null condition (F=7.57, p<0.001). The spring condition had an effect on coordination mode 7 of −0.12 (F=9.27, p=0.010) and coordination mode 11 of −0.16 (F=5.12, p=0.095). The spring-damper condition had an effect on coordination mode 7 of −0.12 (F=10.78, p=0.095) and coordination mode 11 of −0.21 (F=7.36, p=0.027).

Regarding speed, the spring condition had increased average speed of 0.4 cm/s for both coordination modes 7 and 11, (F=1.71, p=0.766) and (F=1.61, p=0.819) respectively. The spring-Damper condition also had increased average speed of 0.9 cm/s (F=9.03, p=0.011) and 0.2 cm/s (F=0.33, p=1.000) for coordination modes 7 and 11.

Hypothesis 2) For coordination modes with point symmetry under the damper condition and spring damper condition (FIG. 4(a)—Coordination Modes 2, 4, and 9), trajectory correlation error had significant effects (F=5.04, p<0.001). The damper condition had effect on coordination mode 2 of 0.02 (F=0.81, p=1.000), coordination mode 4 of −0.03 (F=1.59, p=0.833), and coordination mode 9 of 0.18 (F=11.22, p=0.003). The spring-damper condition had effect on coordination mode 2 of 0.03 (F=2.18, p=0.560), coordination mode 4 of 0.03 (F=0.88, p=1.000), and coordination mode 9 of −0.21 (F=13.77, p<0.001).

Regarding speed, the damper condition had decreased average speed of −0.5 cm/s (F=2.25, p=0.536), −0.5 cm/s (F=2.84, p=0.369), and −0.7 cm/s (F=4.79, p=0.116) for coordination modes 2, 4, and 9, respectively. The spring-damper condition had decreased average speed of −0.7 cm/s (F=5.63, p=0.072), −0.5 cm/s (F=3.06, p=0.323), and −1.0 cm/s (F=9.05, p=0.011) for coordination modes 2, 4, and 9, respectively.

Hypothesis 3) For coordination modes with one target under the dual spring condition (FIG. 19A—Coordination Modes 2, 3, and 5), trajectory correlation error had varied but essentially zero effects (F=0.66, p=1.000).

Regarding speed, the dual spring condition had increased average speed of 0.5 cm/s (F=2.24, p=0.540), 1.2 cm/s (F=12.51, p=0.002), and 0.5 cm/s (F=3.26, p=0.286) for coordination modes 2, 3, and 5, respectively.

Hypothesis 4) For smoothness (FIG. 19B), the damper condition showed a reduction in DIAJ for all coordination modes but to no significant overall effect (F=1, p=1.000). Table VI reports the effects of all haptic conditions on DIAJ.

the highest ranked coordination mode with point symmetry (p<0.001). For other coordination modes with point symmetry, no haptic condition with a damper had any effect. There was a decrease in speed for coordination mode 9 given the damper and spring-damper conditions, but only the spring-damper condition was to significant effect. Therefore,

TABLE V

Shape Accuracy Effects of Bimanually-Dependent Haptic Feedback

| | | Coordination Mode | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Num. Targets | 2 | 1 | 1 | 2 | 1 | 2 | 2 | 2 | 2 | 2 | 2 |
| | Direction | Tog | Tog | Tog | Tog | Tog | Awy | Par | Tog | Awy | Awy | Par |
| | Symmetry | Mir | Pt | Mir | Pt | Inc | Mir | Vis | Inc | Pt | Inc | Inc |
| | | | | | | Haptic Force | | | | | | |
| Traj. Corr. Err. | Spring | −0.05 | 0.01 | −0.01 | 0.00 | −0.04 | 0.02 | −0.12** | −0.01 | −0.03 | −0.17 | −0.16 |
| | Damper | −0.03 | 0.02 | −0.02 | −0.03 | −0.01 | −0.02 | −0.10 | 0.02 | −0.18** | −0.01 | −0.16 |
| | Combination | −0.02 | 0.03 | 0.01 | 0.03 | 0.01 | −0.05 | −0.12** | −0.03 | −0.21*** | −0.16 | −0.21* |
| | Dual Spring | 0.03 | 0.00 | 0.01 | 0.01 | −0.03 | 0.02 | 0.01 | 0.12 | −0.13 | −0.08 | −0.07 |
| Speed (cm/s) | Spring | −0.8 | −0.9* | −0.9* | −0.7 | −0.2 | −0.3 | 0.4 | −0.4 | −0.5 | −0.5 | 0.4 |
| | Damper | −1.2** | −0.5 | −0.2 | −0.5 | −0.9* | −0.8* | −0.1 | −0.2 | −0.7 | −0.5 | 0.5 |
| | Combination | −0.7 | −0.7 | −1.1* | −0.5 | −0.2 | −0.9* | 0.9* | 0.0 | −1.0* | −0.4 | 0.2 |
| | Dual Spring | 0.3 | 0.5 | 1.2** | 0.1 | 0.5 | −0.3 | 1.5*** | 1.6*** | 0.2 | 0.3 | 1.2** |

Entries are estimated effects of bimanually-dependent haptic feedback conditions on coordination modes as compared to the null condition. Green entries indicate a reduction in error. Red indicate an increase in error. Shading is by magnitude of effect. Effects with p-values less than 0.05 are indicated with *, less than 0.01 with , and less than 0.001 with *.

IV. Discussion

In this study, able-bodied subjects performed simultaneous, 2D bimanual trajectory following, which required movements of differing number of targets, direction, and symmetry under several bimanually-dependent haptic feedback conditions. We tested if these haptic conditions had effects for worse performers on two main performance outcome measures of accuracy and smoothness, as well as one supplementary performance measure of speed to assess the speed-accuracy trade-off.

With regard to hypothesis (1), we predicted a virtual spring placed between the hands would improve the shape of bi-manual trajectories with parallel direction. This is because parallel bimanual trajectories are characterized by a constant inter-manual distance [99], and the spring resists movements without a constant inter-manual distance. According to our results, the spring and combination spring-damper conditions improved shape accuracy as measured by trajectory correlation error for both coordination modes with direction of parallel. Three of the four experimental conditions were to significant effect (p<0.001). Thus, we accept hypothesis (1). There was not a decrease in speed for these haptic conditions as compared to the null condition, which indicates the increase in accuracy is likely not due to an intentional reduction in speed.

With regard to hypothesis (2), we predicted a virtual damper placed between the hands would improve the shape of trajectories with point symmetry because it resists non-rotational movement. According to our results, the damper and spring-damper conditions improved shape accuracy for there is a chance that the increase in accuracy was due to a reduction in speed. However, a damper directly acts to resist velocity. Table V shows a reduction in speed given the damper condition for all coordination modes except 11. Therefore, this outcome may instead reflect the changed dynamics of the system rather than an intentional reduction in speed. Thus, we also accept hypothesis (2) with stipulations.

With regard to hypothesis (3), we predicted a dual-spring grounded at the mid-point between the hands would improve the shape of trajectories with one target. However, the dual-spring condition had no effect on subjects' shape accuracy for trajectories with one target. Thus, we reject hypothesis (3). There was an increase in speed for these experimental conditions, and one of the conditions was to significant effect. However, due to reasons described previously, this outcome may simply reflect changes in system dynamics rather than intent. We also note that the coordination modes with one target were ranked lower. This means that for the group overall, these coordination modes had lower trajectory correlation error (FIG. 18) and may have been easier to perform. In other words, there may be no need to provide assistance for these types of movements because they are already performed well. There is a chance that given more difficult movements with a single target, this type of feedback may improve performance. However, this is speculation and would require further study to prove.

With regard to hypothesis (4), we predicted the damper condition would improve smoothness due to its direct impedance to velocity and closer relation to jerk. While the damper condition improved smoothness as measured by DIAJ for all coordination modes, it did not do so to significant effect. Additionally, the combination spring-damper condition tended to worsen smoothness (Table VI). Thus, we also reject hypothesis (4).

TABLE VI

Smoothness Effects of Bimanually-Dependent Haptic Feedback

| | | Coordination Mode | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Num. Targets | 2 | 1 | 1 | 2 | 1 | 2 | 2 | 2 | 2 | 2 | 2 |
| | Direction | Tog | Tog | Tog | Tog | Tog | Awy | Par | Tog | Awy | Awy | Par |
| | Symmetry | Mir | Pt | Mir | Pt | Inc | Mir | Vis | Inc | Pt | Inc | Inc |
| DIAJ | Spring | 8 | −2 | 19 | 20 | −1 | −11 | −17 | 1 | 13 | 40 | 5 |
| | Damper | −12 | −25 | −4 | −14 | −14 | −8 | −12 | −32 | −10 | −20 | −13 |
| | Combination | 18 | 3 | 54** | 23 | 33 | 9 | −12 | 5 | 25 | 38 | −14 |
| | Dual Spring | −5 | −21 | −10 | −11 | −34 | 14 | −12 | −29 | 68*** | 8 | −4 |

Entries are estimated effects of a type of bimanually-dependent haptic feedback on a particular coordination mode as compared to the null condition. Green entries indicate a reduction in DIAJ (i.e., smoother movement), while red indicate an increase in DIAJ. Shading is by magnitude of effect. Effects with p-values less than 0.05 are indicated with *, less than 0.01 with , and less than 0.001 with *.

More generally, it appears bimanually-dependent haptic forces tend to improve shape accuracy of coordination modes 7-11 to greater effect. Interestingly, statistical significance in these effects appears to stem from the geometric properties of both the haptic condition and the trajectories. Contrarily, haptic conditions appear to have little effect on coordination modes 1-6, for which the group as a whole performed better. We also note that this study is non-exhaustive. Its purpose was to investigate the performance effects of several bimanually-dependent haptic feedback conditions on classifications of bimanual coordination. While each haptic condition was designed for a particular class of bimanual coordination, we invite researchers and haptic control designers to use our results as listed in Tables V and VI as a guide. Future work derived from these results may be done to more thoroughly investigate our hypotheses or improve upon the design of the haptic feedback conditions for particular studies and applications.

Our approach uses bimanually-dependent haptic forces in a haptically-enabled robotic system given a set of trajectories that can be classified by geometric properties. Applications that fit this approach include bimanual motor tasks, like robotic surgery or rehabilitation. Assistance may be given in a robotic system via bimanually-dependent haptic forces for corresponding trajectories to potentially improve task performance or assist in training. For certain trainees, this type of feedback may reduce error to allow for learning to occur [108]. However, care must be taken so a dependence on the haptic feedback is not formed [117]. While this study only looked at haptic assistance, another consideration is to design similar bimanually-dependent haptic feedback to resist movement or amplify error to improve training [84, 91,98]. In either case, application-specific considerations should be taken when implementing bimanually-dependent haptic feedback.

This Example 3 comes with some limitations. One limitation regards the effect size of bimanually-dependent haptic feedback on performance outcomes. We do not report effect sizes because importance of effect size will depend on the application. Performance outcomes of tasks requiring extremely precise movements, like surgical operations, may be more sensitive to error. In contrast, the outcome of a large, stabilizing movement may not need to be as precise. The other limitation regards the speed-accuracy tradeoff. We analyzed speed to provide some insight but did not control for speed directly. We made this choice to observe the reaction of subjects to imposed haptic feedback conditions in a motor task performed at a pace of their choosing. This decision was made to provide insight for future applications, such as early phases of motor task training. In future experiments, controlling for speed will help to confirm or contradict the results presented here. Finally, the bimanually-dependent haptic forces have the potential to impact the positional accuracy of a movement as well as the shape accuracy and smoothness. Prior approaches use position-based feedback to reduce or enhance positional error whereas our forces depend on the positional relation of the hands. Future work will be needed to compare bimanually-dependent haptic feedback to other position-based approaches with regard to both effectiveness and ease of implementation.

V. Conclusion

In this Example 3 work we explored the effects of several bimanually-dependent haptic feedback conditions on classes of bimanually coordinated movements. Haptic conditions consisted of virtual springs and dampers implemented between the hands, which were independent of environmental factors and trajectory positions. This benefit has the potential to impact real-time assistance for a variety of robotic systems, including surgical robots and bimanual rehabilitation robots. We showed that subjects who perform worse under null haptic conditions can improve the desired shape of their movements with particular bimanual haptic feedback but may not be able to improve smoothness. We also discussed that the improvement in shape is unlikely due to an intentional reduction in speed. Future work will further investigate these results, provide application of our approach to real-world bimanual tasks, and develop intelligent ways of implementing bimanually-dependent haptic feedback. Moreover, there is an opportunity to develop a future framework for bimanual haptic assistance in diverse, robot-assisted tasks.

Example 4

I. Introduction

Since its inception, robotic surgery has been on the rise for a multitude of operations. Cases in general surgery rose from 1.8% in 2012 to 15.1% in 2018 [109], robotic bariatric surgery cases rose 12.7% from 2015 to 2020 [110], and both general robotic pediatric cases and urology robotic pediatric cases increased 1.3% per quarter in 2010 and 2.0% per quarter in 2019 [111]. Not only have robotic surgical cases increased but the global surgical robot market is expected to reach $11.8 billion USD by 2025 [112]. However, despite the rise in cases and the market, there is an expected shortage of surgeons by 2034 in part due to high cost of medical education [113]. Also, robotic surgical curricula are widely available, but contents are inconsistent and require expert review [114]. While autonomous robotic surgery may help to alleviate this problem, there is still a need for highly trained and capable surgeons before autonomous technologies integrate into regular use. Thus, new robotic training approaches that may rapidly improve surgical ability are needed.

All expert robotic surgeons must first complete basic training to learn how to dexterously manipulate the robot. The majority of basic robotic surgical training curricula resemble laporoscopic training curricula [115]. First, trainees build psychomotor skills on the robot with dry labs, which consist of several tasks, such as peg transfer, needle passing, and knot tying. Trainees are typically required to practice these tasks until they reach proficiency, and one of the key psychomotor skills needed to attain proficiency is bimanual coordination. Trainees learn to use both hands in a complementary and optimal manner to more efficiently perform surgical tasks. Surgeons are directly rated on their ability to use both hands via the Global Evaluative Assessment of Robotic Surgery (GEARS). GEARS is a validated method for determining robotic surgical skill, and it includes "Bi-manual Dexterity" as one of its main components [116, 117]. In practice, trainees are simply instructed by a coach on how to improve performance. No other means of feedback are implemented to accelerate learning to the best of our knowledge. However, several research teams are exploring methods to implement various haptic feedback modalities to accelerate trainee learning. If successful, trainees may begin practice on more advanced tasks earlier and get much needed repetition toward reaching surgical expertise.

The following describes a few tested approaches to leverage robotic surgical systems for training augmentation. One study implemented assistive haptic forces that were based on extracted trajectories of peg transfer and needle passing tasks [118]. This study reported improvements due to haptic assistance in performance metrics of workspace volume and positional error as based on the extracted trajectories. However, there was no improved temporal efficiency nor path efficiency. Two other studies implemented augmented forces during a ring and rail task [119,120]. One of the studies used an assist-as-needed algorithm to guide operators through the task [120]. Researchers of this study found accelerated improvement in performance metrics of time and positional error for the assisted group as compared to a control group. The other study split subjects into groups with assistive or resistive forces. Researchers found the greatest improvement from baseline performance in the group with resistive forces regarding time and positional error [119]. In all cases, the augmented forces implemented on the robotic systems were based on specific, ideal trajectories, which were extracted from demonstration or designed to fit the task environment. Other than completion time, all the reported performance improvements were also based on these ideal trajectories. While these methods show potential for the improvement of psychomotor skill training in robotic surgery, we may be able to augment training without the need of specific trajectory information. We may also be able to tailor the augmented forces to promote learning of particular core psychomotor skills, like bimanual dexterity as described by GEARS.

Given the capabilities of surgical robotic consoles, we can monitor the bimanual coordination of a surgical trainee to provide meaningful feedback and potentially accelerate trainee learning. Bimanual coordination can be defined by geometric features of movement and monitored online through scalar features derived from a stream of kinematic data [121]. The features can describe the scaling, direction, or symmetry of a bimanual movement. Haptic forces can be based on these scalar features to improve the shape of bimanual movements [122] and the requirements of the task. If implemented thoughtfully, bimanually-dependent haptic forces may improve performance and training in more complex tasks, like surgical training. In particular, we hypothesize that a virtual spring set between the hands, such that the onset of the spring force is dependent on the coordination of the upper-limbs, will increase simultaneous bimanual movement and thus improve task performance after training. The following describes an experiment in which we implement augmented bimanually-dependent haptic forces based on the coordination of a trainees hands during a peg transfer task. This approach aims to accelerate performance improvement of the basic psychomotor skills needed to perform robotic surgery while retaining computational efficiency and implementation ease.

II. Methods

A. Subjects

For this experiment, we recruited 10 able-bodied subjects (27±4 yrs). All subjects provided informed consent in accordance with the UT Austin IRB #00000278. Subjects in each group indicated uniformly varied prior experience with human-operated robotics, and no subjects indicated completion of any formal surgical training. Most subjects were right handed except for two subjects, who reported that they were ambidextrous. A summary of subject demographics can be found in Table VII.

TABLE VII

Subject Demographics

Control Group

| Age (yrs) | Gender | Handedness | Robot Exp. (1-4) | Surgical Training Exp. (1-4) |
|---|---|---|---|---|
| 28 | F | A | 1 | 1 |
| 28 | M | R | 4 | 2 |
| 29 | M | R | 2 | 1 |
| 25 | M | R | 2 | 1 |
| 24 | F | R | 1 | 1 |

Haptic Group

| 35 | M | R | 3 | 1 |
| 28 | M | A | 2 | 1 |
| 20 | M | R | 1 | 1 |
| 25 | M | R | 2 | 2 |
| 24 | F | R | 4 | 2 |

B. Apparatus

Figure 20A:
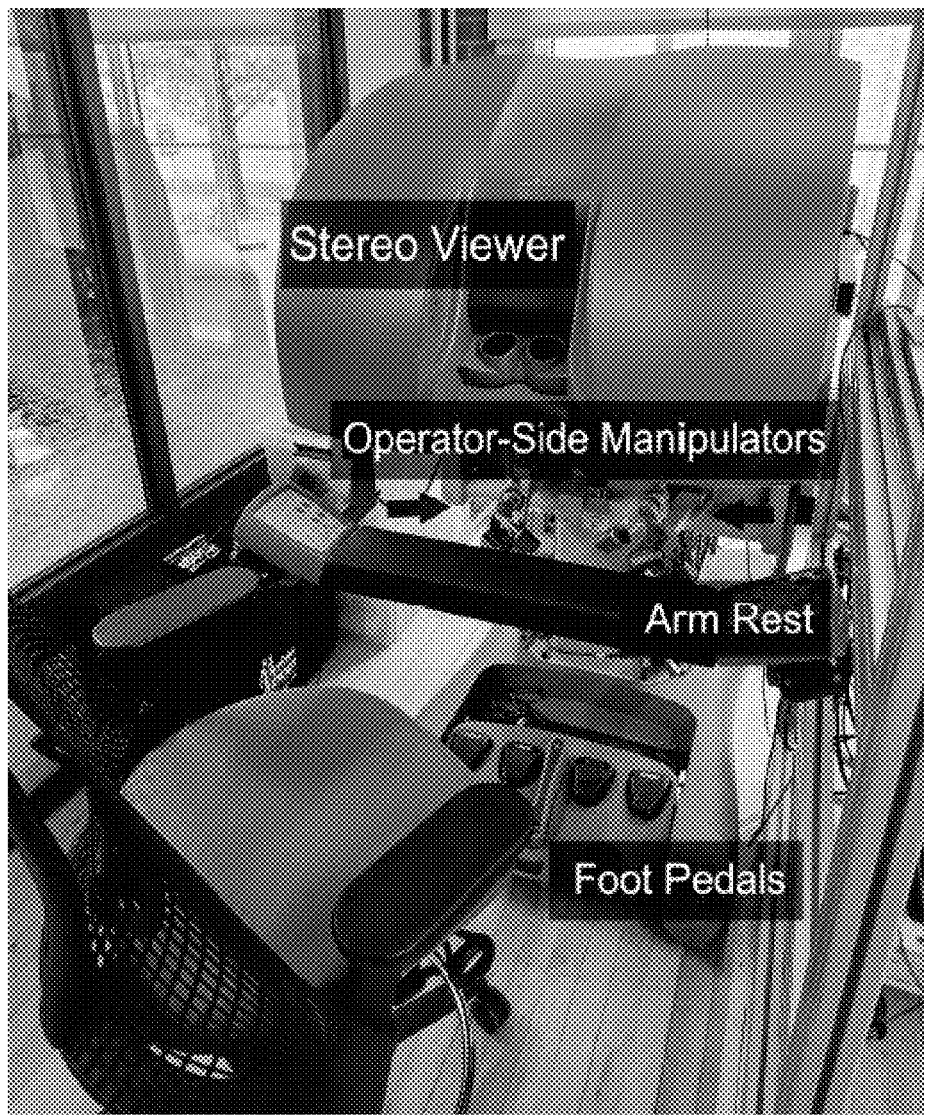
FIG. 20A depicts a daVinci Research Kit operator-side console.
Figure 20B:
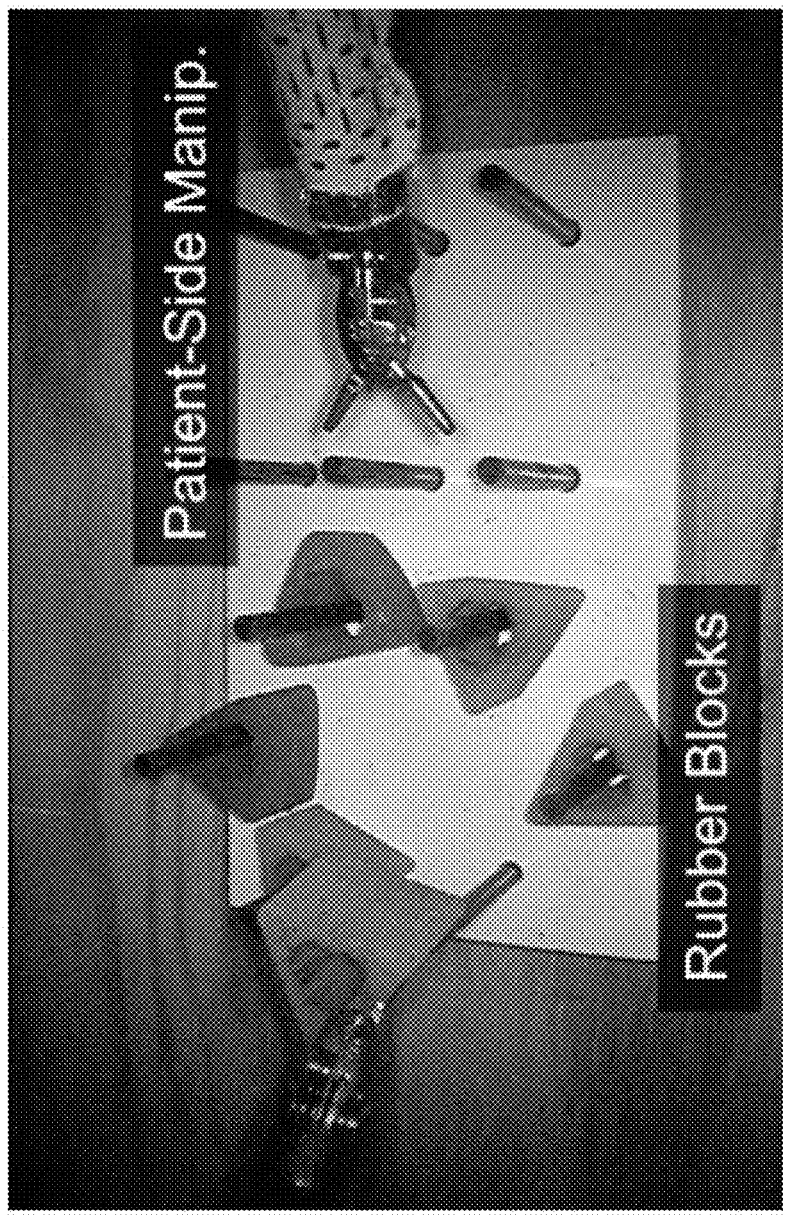
FIG. 20B depicts a subject view of the peg board, rubber blocks, and patient-side manipulators during the peg transfer task.

Training was administered on the daVinci Research Kit (dVRK), a surgical robot. FIG. 20A depicts a daVinci Research Kit operator-side console. The console includes a head rest and stereo viewer, a forearm rest, two operator-side manipulators, and foot pedals. The robot was equipped with two large needle drivers on the "patient" side. Rectified stereo images were displayed to subjects on the console stereo viewer at 30 Hz using the OpenCV library and two 14 inch Arzopa A1 Gamut Slim HD monitors. FIG. 20B depicts a subject view of the peg board, rubber blocks, and patient-side manipulators during the peg transfer task. A pegboard with six rubber blocks was centered within view, and the camera was angled to provide a near isometric view of the blocks. Arms of the operator side were zeroed before each experiment, and the patient-side manipulators were manually adjusted to ensure the entire workspace was reachable. Augmented haptic force feedback was implemented via MATLAB® application, which communicated with the dVRK using the Collaborative Robotics Toolkit (CRTK) [123] and the Robot Operating System (ROS).

C. Peg Transfer Task

Subjects performed a standard peg transfer test, which followed a validated robotic surgery skill training curricula [124-126]. The peg transfer task is described as follows. Subjects first grasp a rubber block with the left patient-side manipulator of the dVRK. Then, in mid-air, they must hand over the block to the right patient-side manipulator and place it on a peg on the right side of the pegboard. This is repeated until all blocks have been transferred from the left side of the pegboard to the right side. Then, the blocks are transferred back to the left side of the pegboard in the same manner. Subjects were timed from grasp of the first peg until the final peg transferred from right to left touched the pegboard. Also, the experimenter kept track of the number of drops.

Figure 21:
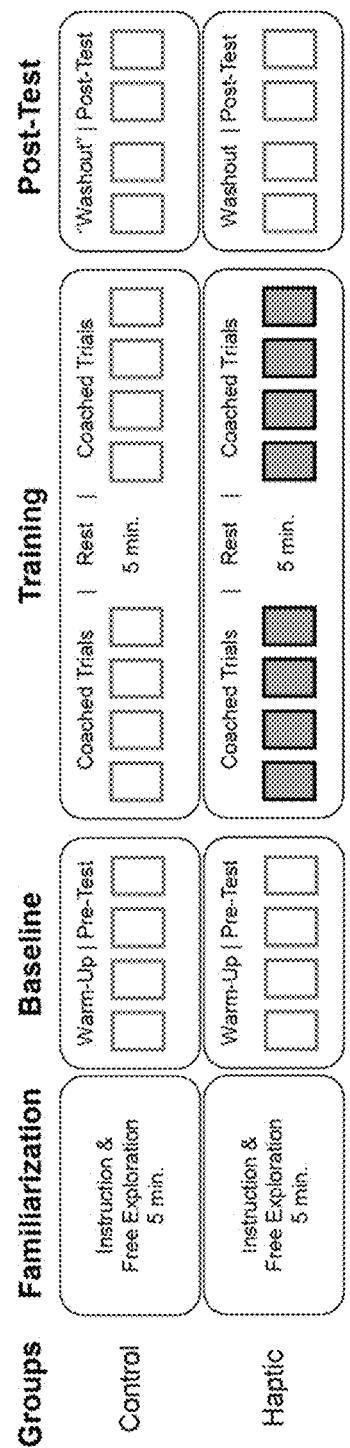
FIG. 21 depicts an experimental diagram of the single day robotic surgical training session.

FIG. 21 depicts an experimental diagram of the single day robotic surgical training session. Subjects were split into a haptic feedback group and a control group. Each group received instruction on dVRK operation and free-exploration time for no more than five minutes. Then, subjects performed baseline trials without haptic feedback. Following baseline, both groups trained for 8 repetitions. Peg transfer trials are marked by boxes, and filled boxes indicate trials with haptic feedback. Finally, groups performed four peg transfers for washout and post-test. Subjects were allowed 5 min. of rest between Baseline and Training, in the middle of Training, and between Training and Post-Test.

The task was split into four experimental blocks (FIG. 21). In the first block, subjects were instructed on operation of the surgical robot by the experimenter, and then they were allowed to familiarize themselves with the system for no more than 5 minutes. In the second block, subjects performed 4 baseline peg transfer trials. They were instructed on how to perform the peg transfer task. The first two trials served as a warm-up, and on the last two trials of the baseline, subjects were asked to perform the task as fast and as accurately as possible to establish a pre-test performance level. In the third block, subjects were coached through 10 training trials with or without augmented, bimanual haptic force feedback. In the fourth block, subjects performed 2 washout trials and 2 post-test trials as similar to the baseline trials. Subjects were limited to 4 minutes per trial, and the full experimental session was limited to no more than 1.5 hours to avoid fatigue. If subjects reached 80 minutes in the experiment, the subsequent two trials were run as the post-test. Subjects were allowed to take short breaks between trials as needed, and subjects were required to take a minimum 5 minute break after the first 4 training trials.

D. Haptic Force Feedback Conditions and Coaching

Figure 22:
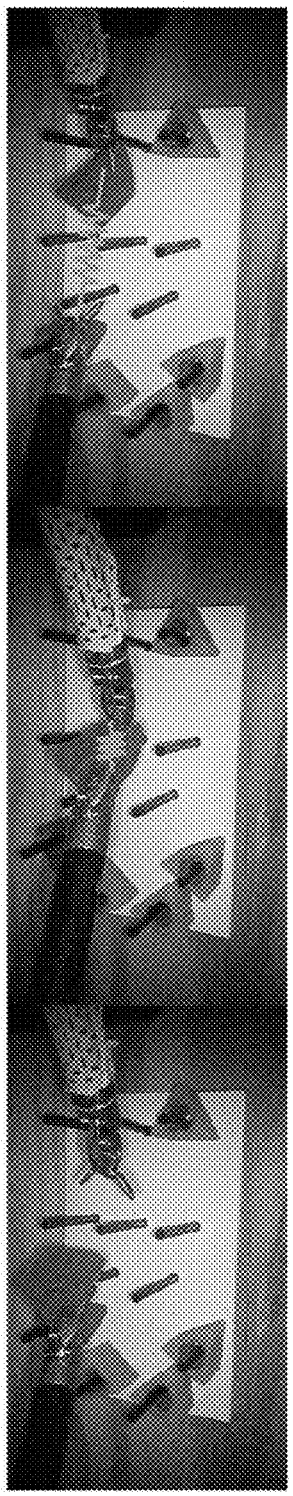
FIG. 22 depicts an overlay of implemented spring force on video capture of a peg transfer demonstration.

FIG. 22 depicts an overlay of implemented spring force on video capture of a peg transfer demonstration. After the tools were moved together to transfer a peg and detected as idle or not moving simultaneously, a virtual spring force was ramped up between the hands. The force was ramped off after a simultaneous movement away was detected. The overlay was not visible to subjects.

Subjects were split into two groups by random computer generation. The first group was a control group that experienced no form of haptic force feedback during the experiment. The second group experienced augmented forces in the form of a virtual spring set between the hands (FIG. 22). The spring had initial length 35 cm, which was approximately the length of the peg board when scaled for teleoperation based on the sequence and direction of the hands. Also, the spring was set with a spring constant of 11 N/m. the length of the peg board when scaled for teleoperation. If a sequential (i.e., non-simultaneous) movement or an idle state was detected and the direction of the hands was together, the force of a spring between the hands was ramped up within 1 s. The sequence of a movement was determined by a simple hysteresis band method. The magnitude of the velocity of a hand was compared to an upper threshold of 3.0 cm/s for movement onset and a lower threshold of 0.8 cm/s for movement stop. If neither hand was in motion, the operator was considered in an idle state. If only one hand was in motion, it was considered a sequential movement.

The direction of the movement was determined by $$\text{Direction} = \begin{cases} \text{Together,} & \text{if } f_{Dir} < -T_{Dir} \\ \text{Parallel,} & \text{if } -T_{Dir} \leq f_{Dir} \leq T_{Dir} \\ \text{Away,} & \text{if } f_{Dir} > T_{Dir} \end{cases} \quad (1)$$

where $$T_{Dir} = \frac{d\|\phi_L(\tau) - \phi_R(\tau)\|_2}{d\tau} \quad (2)$$

Equation (2) measures the change in distance between parameterized left and right hand trajectories, $\phi$. Trajectories are parameterized by $\tau \in [0, 1]$ over distance. The threshold to distinguish between type of direction was set at $T_{Dir}=0$. This parameter was chosen to heavily bias directions of together and away based on observed movements performed during peg transfer. Peg transfer typically is performed with many movements of mirror symmetry and direction of both together and away. It also has little to no movements with a direction of parallel. In a prior experiment [122], we found a spring between the hands had no significant effect on performance for these conditions. Therefore, it was expected that this augmented haptic condition would not inhibit performance and may promote simultaneous use of the hands after a block transfer. A spring may promote simultaneous use by forcing the hands apart to place the transferred block and pick up a new block at the same time.

Regarding coaching, the experimenter would only provide verbal feedback during the training block. Verbal feedback consisted of 3 primary points of focus: grasping technique, placing technique, and instruction to move ones hands simultaneously. In particular, all subjects were coached to simultaneously place a transferred block on a peg while simultaneously moving the opposite hand to pick up another block. The experimenter informed subjects that they may feel haptic forces during the task if their hands become idle or if they are not moving them in a simultaneous manner. Subjects were also instructed to go slow and focus on technique in the first half of training, and then they were instructed to attempt to increase their speed in the second half of training.

E. Data Capture and Analysis

Data were captured at a rate of 100 Hz for all sensors with a 50 ms moving average filter, and velocity data were filtered with a $4^{th}$ order Butterworth filter using a 10 Hz and synced using ROS. Kinematic position data were filtered cutoff frequency. We then processed the data to analyze three performance metrics. The first and main performance metric is an outcome metric. This metric is a normalized score based on number of accidental drops and total elapsed time, and it was used to assess task proficiency.

$$\text{Score} = 240 \text{ s} - \text{time} - \frac{10 \text{ s}}{\text{drop}} - \frac{20 \text{ s}}{UTPeg} \quad (3)$$

Score is the total time taken to perform the task with 10 s and 20 s penalties for drops and pegs left untransferred, respectively, subtracted from the maximum time allowed (240 s). This score is comparable to other robotic surgical training studies, which use similar scoring [126].

The second performance metric was a normalized bimanual movement sequence metric $$\text{Integrated } f_{Sq} = \frac{1}{T} \int_0^T f_{Sq} dt, \quad (4)$$

where T is the total elapsed time and $f_{Sq}$ is defined as $$f_{Sq} = \begin{cases} 0, & \text{if Idle} \\ 1, & \text{if Sequential} \\ 2, & \text{if Simultaneous} \end{cases} \quad (5)$$

The method for measuring idle, sequential, and simultaneous movements is described in Section II D. This measure indicates the percentage of time that a trainee used neither, one, or both hands during task execution. A result closer to 0 indicates more idle time during the task, and a result closer to 2 indicates more simultaneous movement. This metric was chosen as an indicator to assess changes in motor performance that may affect the performance outcome of score.

The third performance metric is path efficiency, which is a measure of total path length.

$$\text{Path Efficiency} = \sum^n S_L + \sum^m S_R \quad (6)$$

In the above equation, path lengths S; of n left hand movements and m right hand movements are summed to get the total path efficiency. Path lengths are defined by the line integral $$S_i = \int_0^1 \sqrt{d\phi_i(\tau) \cdot d\phi_i(\tau)} d\tau \text{ for } i=L,R \quad (7)$$

Path efficiency is a commonly used metric to measure skill in robotic surgical training, and it is comparable to positional error and workspace volume in prior studies [118]. This metric was also chosen as an indicator to assess changes in motor performance that may affect the performance outcome of score. It was also chosen to compare results with prior studies on robotic force augmentation for robotic surgery training.

To perform statistical analysis on the data, we used a two-sample t-test to compare results between groups and a paired-sample t-test to compare pre-test and post-test within groups. For the statistical tests, we used pre-test and post-test means, which consisted of two trials.

III. Results

All subjects completed the 1.5 hour session, but not all completed 16 trials of the peg transfer task. In the haptic group, subjects completed an average of 14 trials, and in the control group, subjects completed an average of 15 trials. The reason some subjects did not complete all 16 trials was due to a slow training pace or the need to reset the dVRK in a few instances due to operational error. If a subject's left hand drifted with the left operator-side manipulator too far outside of the workspace or jerked the manipulator, the system would enter an error state and need to be reset. Addition of the haptic forces did not cause need for the dVRK to be reset. There were no adverse events which caused subjects to withdraw from the study. Also, one subject from the control group was excluded from analysis because the baseline score was over five standard deviations away from the mean of the entire sample. All results are reported as the mean±std.

Figure 23:
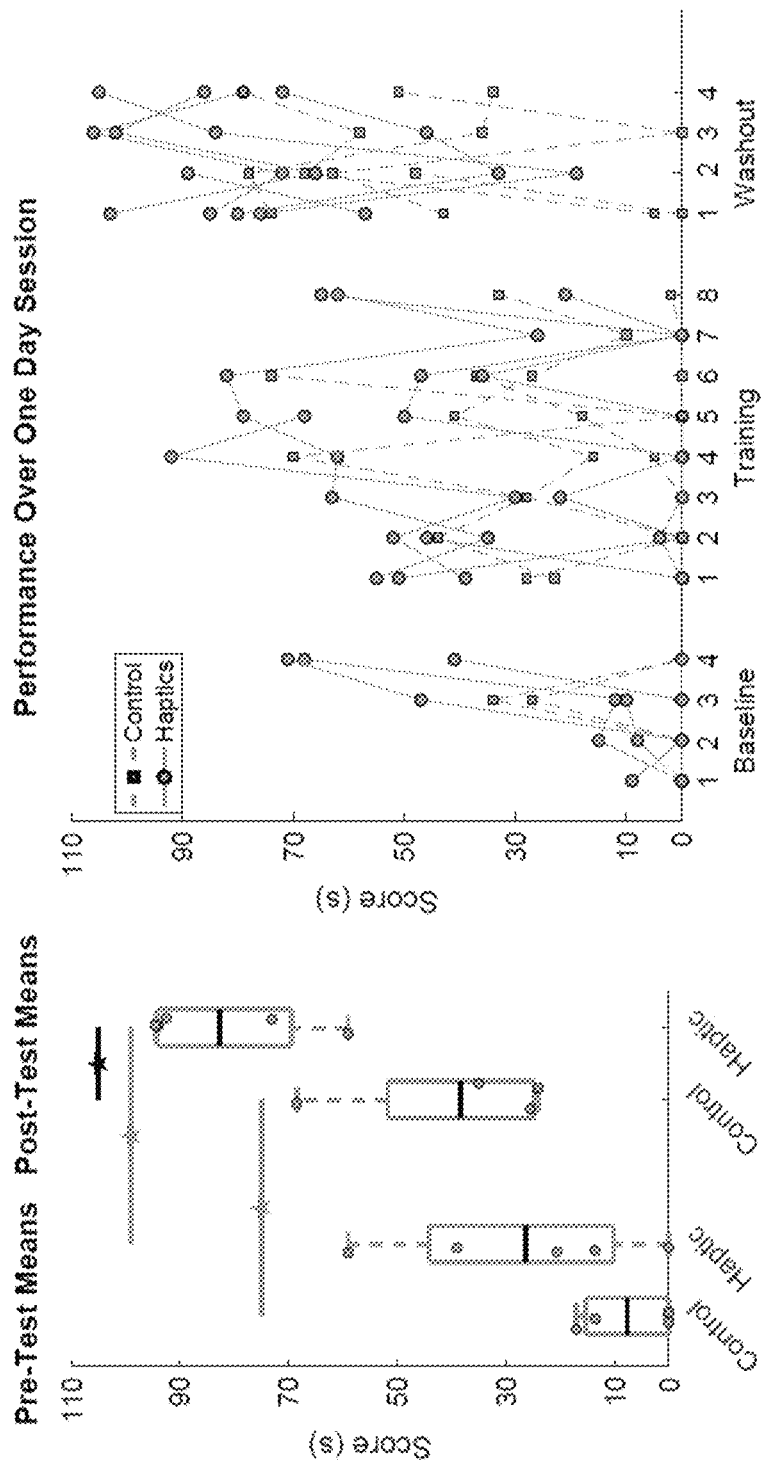
FIG. 23 depicts scores at pre-test, throughout the training session, and at the post-test.

Score) FIG. 23 depicts scores at pre-test, throughout the training session, and at the post-test. Both groups significantly improved, and there was a significant difference between groups at the post test but not at pre-test. The entire sample score at pre-test was 18±20 s. The control group score at pre test was 8±9 s, and the haptic group was 26±23 s (FIG. 23). There was no significance found between groups at pre-test (t=1.52, df=7, p=0.171). The control group score at post-test was 38±21 s, and the haptic group was 83±16 s. There was significance between groups at post-test (t=3.64, df=7, p=0.008). Both groups showed significance between pre-test and post-test. The control group had an improvement in score of 31±14 s (t=4.37, df=3, p=0.022), and the haptic group had an improvement in score of 56±17 s (t=7.60, df=4, p=0.002). There was also significance between groups for score improvement (t=2.46, df=7, p=0.043).

Figure 24:
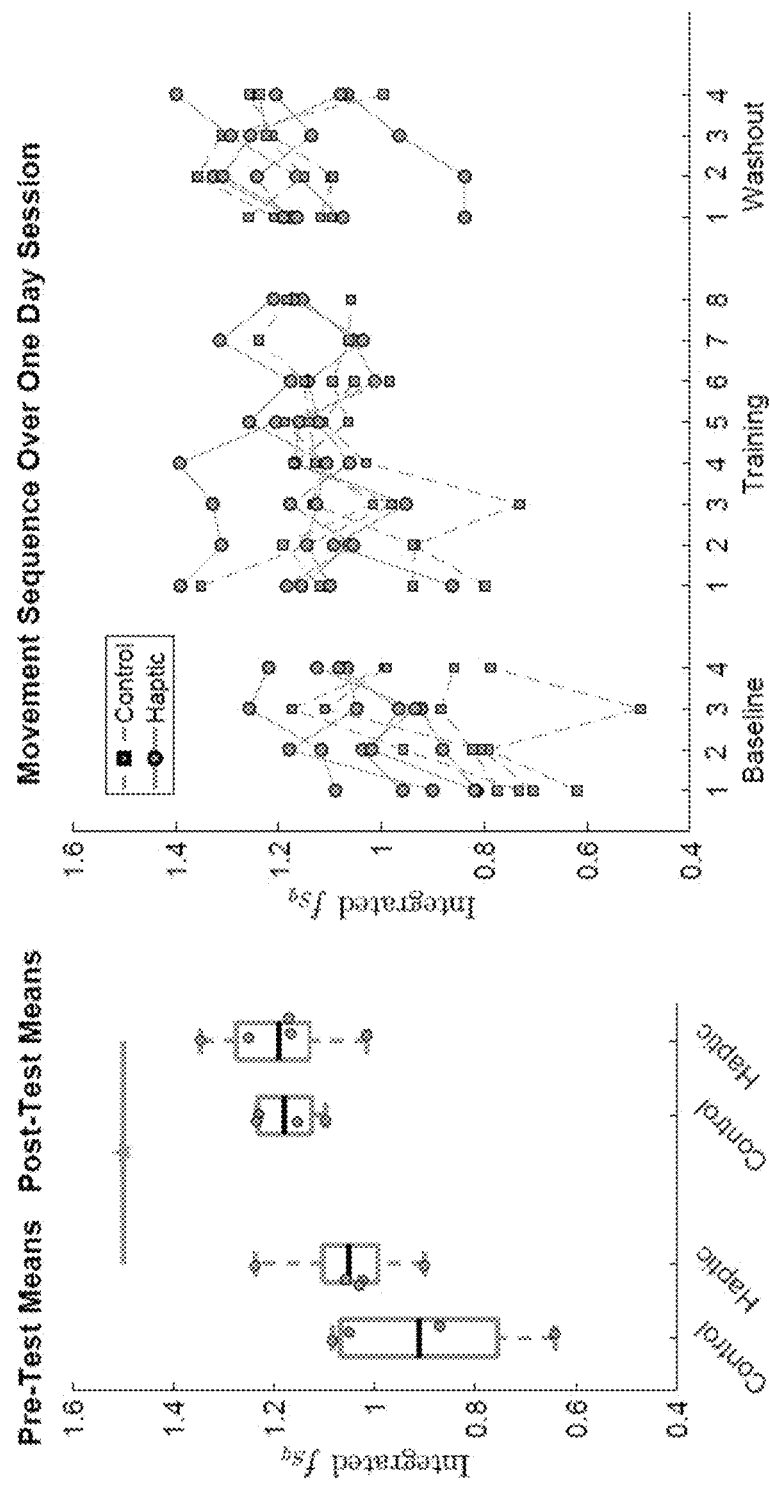
FIG. 24 depicts the integrated $f_{Sq}$ (sequence) metric at pre-test, throughout the training session, and at the post-test.

Integrated $f_{Sq}$) FIG. 24 depicts the integrated $f_{Sq}$ (sequence) metric at pre-test, throughout the training session, and at the post-test. Only the haptic group was found to significantly improve in this metric after the one day session. Only the haptic group was found to significantly improve in this metric after the one day session. The entire sample integrated $f_{Sq}$ at pre-test was 0.99±0.17. The control group mean and std. at pre-test was 0.91±0.20, and the haptic group was 1.05±0.12 (FIG. 24). There was no significance found between groups at pre-test (t=1.28, df=7, p=0.241). The control group at post-test had integrated $f_{Sq}$ of 1.18±0.07, and the haptic group had 1.19±0.12. There was no significance between groups at post-test (t=0.16, df=7, p=0.877). The control group had an increase of 0.27±0.17 (t=3.09, df=3, p=0.054), and the haptic group had an increase of 0.14±0.03 (t=9.24, df=4, p<0.001). There was no significance between groups for increase in integrated $f_{Sq}$ (t=1.64, df=7, p=0.146).

Figure 25:
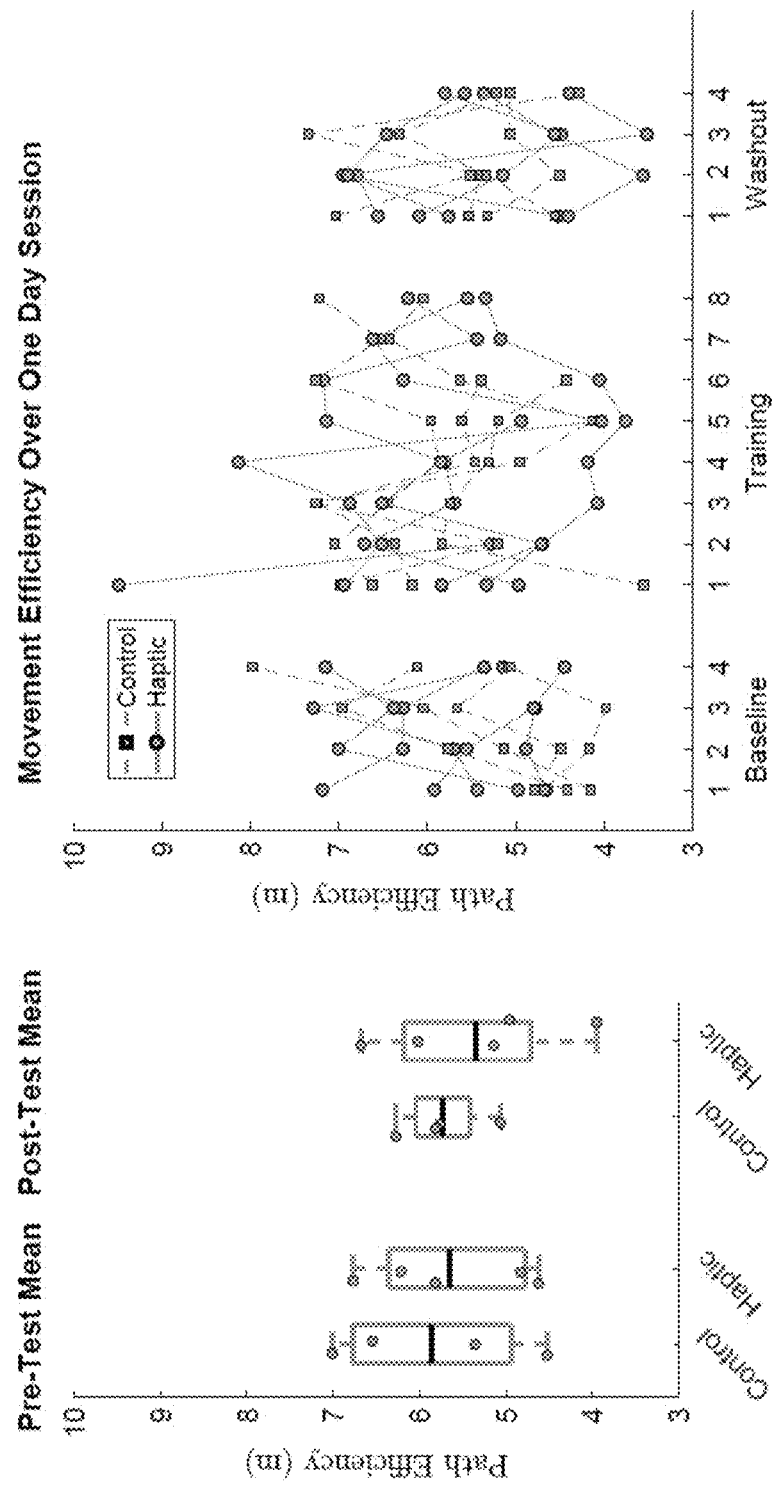
FIG. 25 depicts path efficiency at pre-test, throughout the training session, and at the post-test.

Path Efficiency) FIG. 25 depicts path efficiency at pre-test, throughout the training session, and at the post-test. No significant differences were found between or within groups. The entire sample path efficiency at pre-test was 5.74±0.95 m. The control group path efficiency at pre-test was 5.86±1.13 m, and the haptic group was 5.65±0.91 m (FIG. 25). There was no significance found between groups at pre-test (t=0.31, df=7, p=0.766). The control group path efficiency at post-test was 5.73±0.50 m, and the haptic group was 5.35±1.05 m. There was no significance between groups at post-test (t=0.66, df=7, p=0.529). Neither group showed significance between pre-test and post-test in path efficiency. The control group had an improvement in path efficiency of 0.13±1.58 m (t=0.16, df=3, p=0.880), and the haptic group had an improvement in path efficiency of 0.3±0.73 m (t=0.93, df=4, p=0.407). There was no significance between groups for score improvement (t=0.22, df=7, p=0.835).

IV. Discussion

In this pilot study, we coached subjects in a single 1.5 hour session to perform a peg transfer test on a surgical robot with or without the aid of augmented, bimanually-dependent haptic forces. Augmented haptic forces were based on the coordination of the operator's hands. In particular, if an operator's movements were detected as idle or sequential and the direction of movement was together, a spring between the hands was ramped on. This force pushed operators hands laterally to the left and right side pegs. To draw conclusions, we analyzed performance metrics that reflect time and accuracy, sequence of bimanual movement, and movement efficiency.

The first result to note is the significant improvement of scores by both groups. This result is expected after training on the task for 1.5 hours with targeted feedback. In line with our hypothesis, the group that received augmented haptic force feedback had significantly better post-test scores (p=0.008). Pre-test scores of the haptic group were better than the control group by 18s, but this was not found to be significant (p=0.171). We hypothesized this difference would arise from an increase in simultaneous movement due to influence from the haptic forces. Simultaneous movement during the task, if directed correctly, would improve time efficiency. Both groups showed an increase in Integrated $f_{Sq}$, which shows an increase in simultaneous movement and decrease in idle time. However, the increase was only significant for the haptic group (p<0.001). This may indicate that the better improvement in scores was due to an increase in simultaneous bimanual movement. We also note that groups had no difference at post-test for Integrated $f_{Sq}$, so there is a possibility that improved scores may be due to other effects of the haptic condition or unknown factors. Further study will be required to determine this completely.

We also measured path efficiency as another possible factor that may influence task proficiency and as a comparison to prior studies. While both group means in our experiment improved in path efficiency after training, neither did so to a significant effect. Also, neither group differed at pre-test nor post-test. Our findings are in contrast to Power et al. [118], who also used a peg transfer task in their experiment but implemented a different haptic force modality. They reported no improvement in task time, but they did report improvement in workspace volume and positional error as measured from an ideal trajectory. We suggest this difference may come from relation of the haptic modalities to the mechanics of movement. Power's haptic forces resisted operators from ideal path deviation via proportional control law (i.e., spring-like force), which restricts operators to a smaller workspace and may promote deliberate, space-efficient movements. Our haptic forces deter from idle and non-simultaneous movement, which may promote dual action of the hands and improve temporal efficiency. Together, these results point to an interesting question regarding performance improvement and targeted haptic feedback. This question is: How can particular modalities of haptic feedback be tailored to improve deficiencies in performance of individual trainees? To answer the question, future work may be done similar to a prior study which bases a robotic surgery training curriculum on estimated trainee performance levels [127].

In comparison to the two prior studies that implemented augmented haptic force feedback during a ring and rail task [119,120], we note the following. Both of these studies report an improvement in temporal efficiency and a reduction in positional error. The study reported in this paper and the study by Power et al. differ from these two prior studies in haptic feedback implementation and task. While similar to Power et al., the ring and rail studies use PD control based on position of the rail to guide or resist the trainee. Thus, the haptic feedback affected not only the workspace but the task-oriented direction of motion as well. In tasks without clear trajectories toward completion, this kind of haptic feedback is more difficult to implement. Therefore, in line with motor control and motor learning theory, task dependencies need also be accounted for when designing haptic feedback to improve human motor performance and learning.

With regard to practical implementation of our method, we relate our study to prior robotic surgery training studies without augmented haptic forces. The pre-test and post-test scores in our study are lower than the study from which we based our peg transfer task [126]. In this study, subjects had baseline scores with mean and std. of 134±26 s and post-test scores with mean and std. 167±12 s. These scores are approximately 100 s faster than our results, which indicates less than 1.5 minutes taken to complete the task. The scores of this prior study also reflect proficiency in the peg transfer task, which our subjects were not able to reach in a single 1.5 hour training session. The difference between our study and the other studies which report much higher pre-test and post-test scores [124-126] are the subject demographics. The subjects in these studies included expert surgeons and novice surgeons. Our subjects had limited exposure to surgical training (Table VII) and potentially less motivation to attain proficiency levels. Prior training and motivation are key factors that can affect motor control and motor learning. However, as concurrent with a prior experiment, it appears that subjects who perform worse may stand to benefit more from haptic force augmentation [122]. Regardless, future studies should take into account a subject's current skill level and motivation, if possible, when implementing augmented haptic feedback during training.

Given that this work is a pilot study, we also note the small sample size of the experiment. This study was conducted to test our bimanually-dependent haptic force feedback method against a control group. Results from this experiment may be used to inform larger, future studies. Our results point to the potential for implementing this haptic feedback method in a larger study with a sample that is closer in demographics to the population of robotic surgery trainees. This method may also be altered to augment other surgical training tasks.

V. Conclusions

In this Example 4, we tested a bimanually-dependent haptic force feedback condition against a control in the surgical training task of peg transfer. The haptic condition was a virtual spring set between the hands and onset for bimanual movements of direction together and non-simultaneous movement. This condition is independent of environmental factors and localized trajectory positions. We showed that this haptic force feedback approach can improve temporal efficiency in a peg transfer task, and we showed that this may be due to an increase in simultaneous movement. Finally, we discussed the differences in our approach to prior studies that have implemented haptic force feedback during robotic surgery training tasks. From this discussion, we suggest that haptic feedback can be tailored to fit particular task requirements and performance deficiencies.

Future work will further investigate these results through a larger study, explore other applications of our approach to real-world bimanual tasks, and develop intelligent ways of implementing bimanually-dependent haptic feedback for particular tasks. Moreover, there is an opportunity to develop a future framework for bimanual haptic assistance in diverse, robot-assisted tasks.

Example 5

Figure 26:
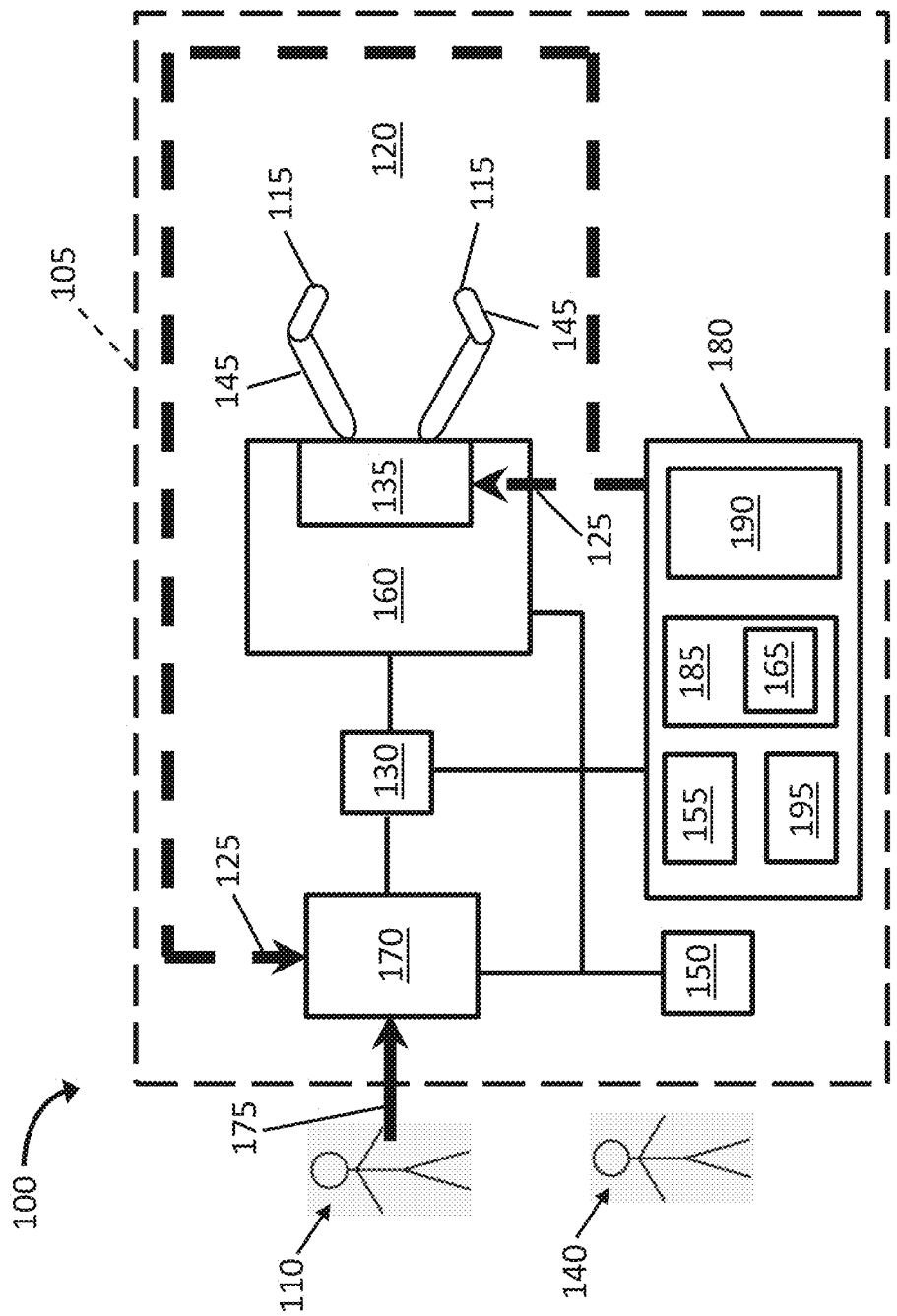
FIG. 26 depicts a system for online recognition of bimanual or bipedal movement coordination modes directed to completing a bimanual or bipedal motor task using a robotic system and including combinations of direction and symmetry, according to some embodiments of the present technology.

FIG. 26 depicts a system (100) for online recognition of bimanual or bipedal movement coordination modes directed to completing a bimanual or bipedal motor task using a robotic system (105) and including combinations of direction and symmetry, according to some embodiments of the present technology. Robotic system (105) includes various mechanical, and analog and digital electronic, components that are directed to producing controlled movements of bimanual (or bipedal) movable structures (145) of a robot (160). The moveable structures (145) of robot (160) may include working ends (115) of one or more useful types (e.g., grasping, cuffing, etc.) for accomplishing tasks in a workspace (120). Robot (160) may include a controller (135) for the moveable structures (145) and/or the working ends (115) thereof. Controller (135) may include mechanical, and analog and digital electronic, components such as, for example and without limitation, servos, motors, linkages, and driver circuitry for the same, that are capable of receiving a control signal and responsively causing directed movements of the moveable structures (145) and/or the working ends (115) thereof.

Robotic system (105) may include a means (170) operably coupled to robot (160) for a subject (110) to provide external (e.g., bimanual or bipedal) control input (175) to teleoperate the robot (160). In some embodiments, such means (170) is or includes a haptic device such as, for example and without limitation, two joysticks, a video game controller, and more advanced and sophisticated haptic devices including one or more of those devices and systems discussed above in one or more of Examples 1-4.

Robotic system (105) may include a computer (180) operably coupled to the robot (160). Computer (180) may interface directly (e.g., by a wired connection) or indirectly (e.g., by a wireless connection) with the controller (135) of robot (160) to provide the aforementioned control signals thereto. In some embodiments, computer (180) may include a variety of digital and/or analog electronic components that are operably coupled to each other to accomplish the useful functions to practice, at least in part, the present technology. In the robotic system (105) shown in FIG. 26, for example and without limitation, computer (180) includes at least one processor (190), one or more memory storage devices (185), an input/output (I/O) controller (195), and a wired and/or wireless communications interface (155). In some embodiments, memory storage device(s) (185) may be, or may include, one or more non-transitory computer (or processor) readable media (165). Robotic system (105) may include an electronic display device (150) operably coupled to computer (180) and configured, or otherwise capable of, enabling subject (110) or another user (140) to view information in human readable form pertaining to operation or performance of robotic system (105).

Robotic system (105) may include means (130) coupled to at least one of computer (180), robot (160), and means (170), for measuring, tracking, or otherwise ascertaining a position or positions of one or more objects of system (100). In some embodiments, such means (130) may be, or may include, at least one position sensor. Position sensor(s) capable of being employed to useful ends for practicing the present technology may be, or may include one or a combination of optical, mechanical, and digital and/or analog electronic components, and may be embodied in examples of devices and techniques including, without limitation, point cloud-based tracking, optical tracking, electromagnetic sensors, and encoders for rotational linkages of movable structures (145) and/or working ends (115) of robot (160).

In some embodiments, position sensor(s) are configured, or otherwise capable of, acquiring and providing to processor(s) (190) (e.g., by way of communication interface (155)), data representative of temporal positions or trajectories of movement of both the left and right hands (or left and right feet) of the subject (110). In other embodiments, position sensor(s) are configured, or otherwise capable of, acquiring and providing to processor(s) (190) data representative of temporal positions or trajectories of movement of both of the working ends (115) of the movable structures (145) of robot (160) (e.g., during its operation by subject (110)).

FIGS. 27-33 depict flow charts of a method (200) for online recognition of bimanual or bipedal movement coordination modes directed to completing a bimanual or bipedal motor task using a robotic system (e.g., robotic system (105) and including combinations of direction and symmetry, according to some embodiments of the present technology. Circled letters in FIGS. 27-33 denote transitions to and from one figure to another figure as those transitions relate to the description of method (200), below. In some embodiment, at least some of the various processes of method (200) may be practiced, implemented, or otherwise performed, at least in part, using system (100).

Figure 27:
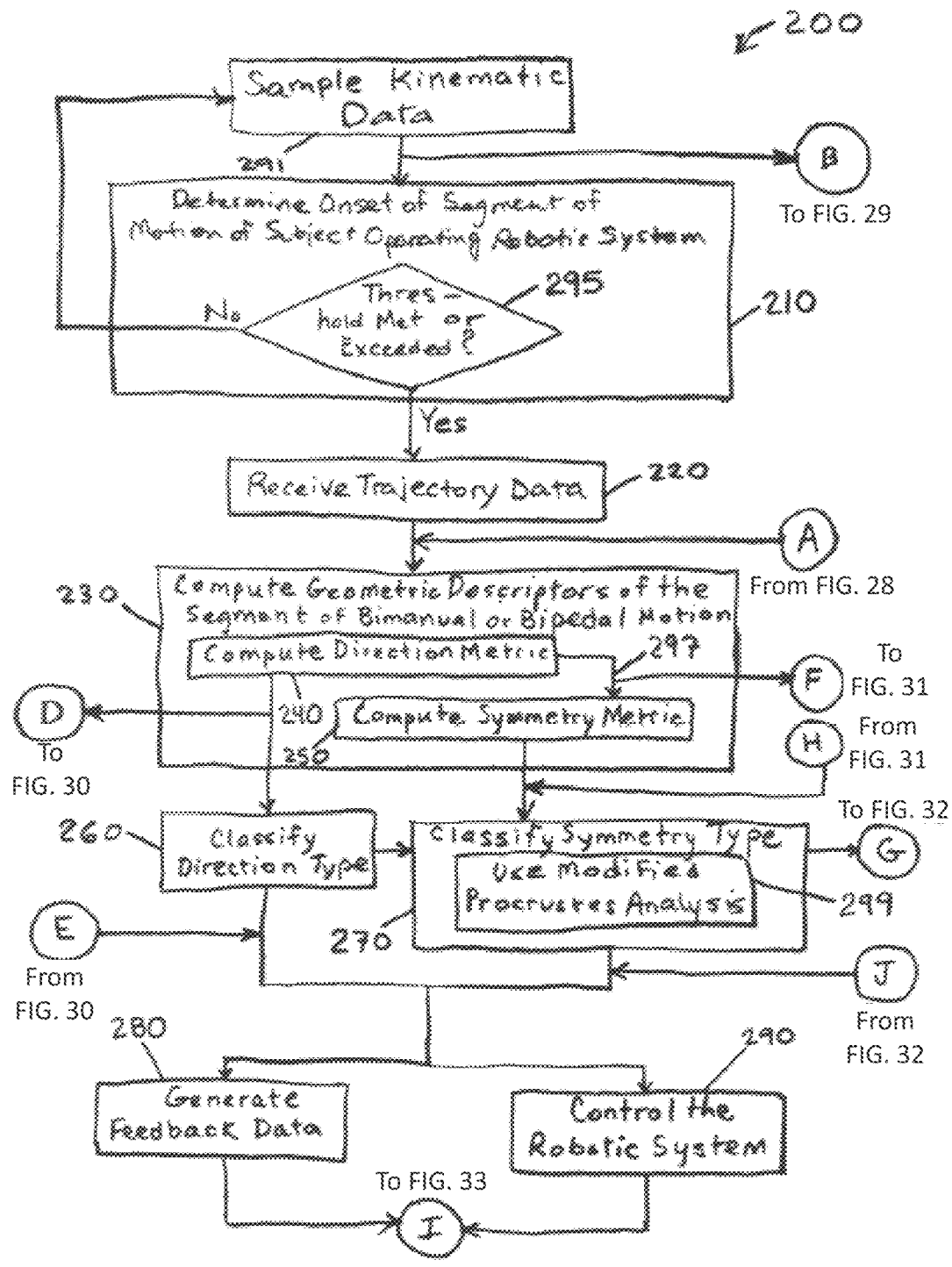
FIGS. 27-33 depict flow charts of a method for online recognition of bimanual or bipedal movement coordination modes directed to completing a bimanual or bipedal motor task using a robotic system and including combinations of direction and symmetry, according to some embodiments of the present technology.

Referring now to FIG. 27, and with further reference to FIG. 26, method (200) may include determining (210) an onset of a segment of bimanual or bipedal motion of a subject (110) operating the robotic system (105) in a workspace (120). Method (300) may include, in response to determining (210) the onset of the segment, receiving (220), from a position sensor (130), data representative of trajectories of: a left hand and a right hand of the subject (110), or a left foot and a right foot of the subject (110). The data representative of trajectories includes: a first set of time ordered points defining a first discrete trajectory of the left hand or the left foot of the subject (110), and a second set of time ordered points defining a second discrete trajectory of the right hand or the right foot of the subject (110).

In one embodiment, the first and the second sets of time ordered points may further define three-dimensional (3D) motion of the left and right hands, or the left and right feet, of the subject (110) in a 3D coordinate system of the workspace. Additionally, or instead, in other embodiments, the first and the second sets of time ordered points may further define two-dimensional (2D) motion of the left and right hands, or the left and right feet, of the subject (110) in a 2D coordinate system of the workspace.

Method (200) may include computing (230), based on the data representative of trajectories, geometric descriptors of the segment. The step of computing (230) geometric descriptors may include: first computing (240) a direction metric that describes a type of direction for the segment, and after the first computing (240), second computing (250) a symmetry metric that describes a type of symmetry for the segment. Method (200) may include classifying (260), based on the direction metric, the type of direction for the segment. Method (200) may include classifying (270), based on the symmetry metric, the type of symmetry for the segment.

Method (200) may include generating (280), based on the type of direction and the type of symmetry, data representative of feedback to the subject (110) or to another user (140) of the robotic system (105) pertaining to performance of the task using the robotic system (105). Additionally, or instead, method may include controlling (290), based on the type of direction and the type of symmetry, the robotic system (105) to facilitate improving performance, or training, of the subject (110) for the task using the robotic system (105).

In some embodiments, method (200) may include sampling (291), by or from the position sensor(s) (e.g., means (130)), kinematic data of: the left and right hands of the subject (110), or the left and right feet of the subject (110). In one embodiment, determining (210) the onset of the segment may include determining (295), based on the kinematic data, that the bimanual or bipedal motion of the subject (110) meets or exceeds a predetermined threshold for at least one of: distance, velocity and time. In some embodiments, the first and the second sets of time ordered points each include at least three points. In one embodiment, method (200) may include determining a number of targets in the workspace for the bimanual or bipedal motion of the subject (110) for completing the task.

Figure 28:
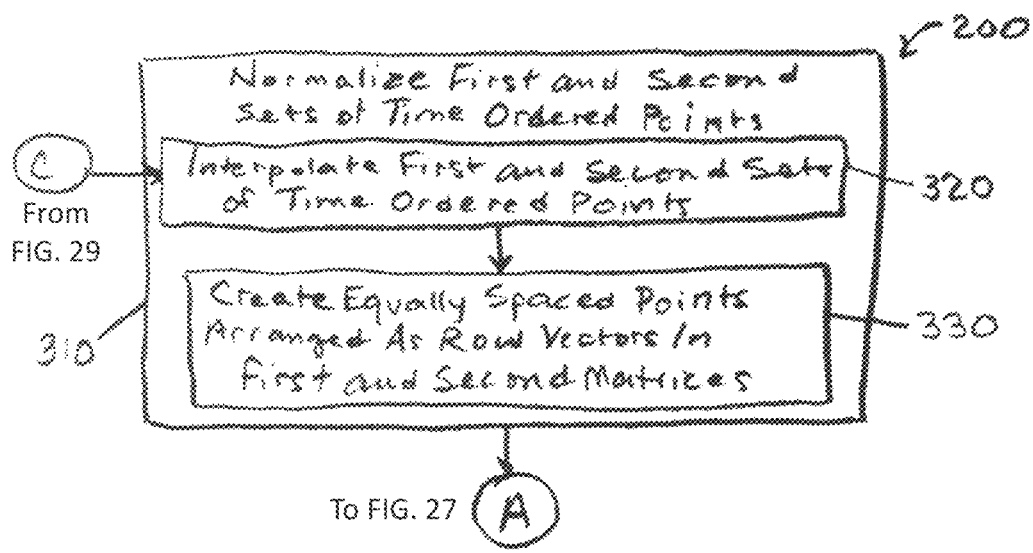

Referring now to FIG. 28, and with further reference to FIGS. 26 and 27, method (200) may include normalizing (310), prior to computing (230) the geometric descriptors, the first and the second sets of time ordered points. In one embodiment, normalizing (310) the first and the second sets of time ordered points may include interpolating (320) the first and the second sets of time ordered points to create (330) equally spaced points ($p_i$) arranged as row vectors in: a first matrix corresponding to the first discrete trajectory, and a second matrix corresponding to the second discrete trajectory. The first and the second matrices may have an equal length (n).

Figure 29:
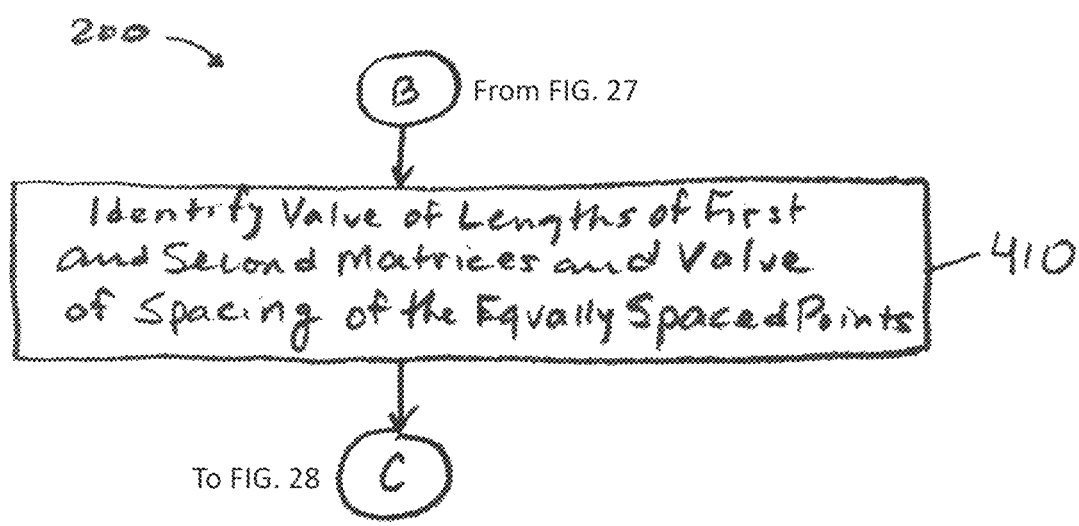

Referring now to FIG. 29, transitioning thereto from and to FIG. 27 via the circled "B" and the circled "C," respectively, method (200) may include identifying (410), prior to determining (210) the onset of bimanual or bipedal motion of the subject (110), a value of n and a value of a spacing of $p_i$ based on at least one of: a size of the workspace (120), a resolution of the position sensor (130), and a number of points of the first and the second sets of time ordered points.

Figure 30:
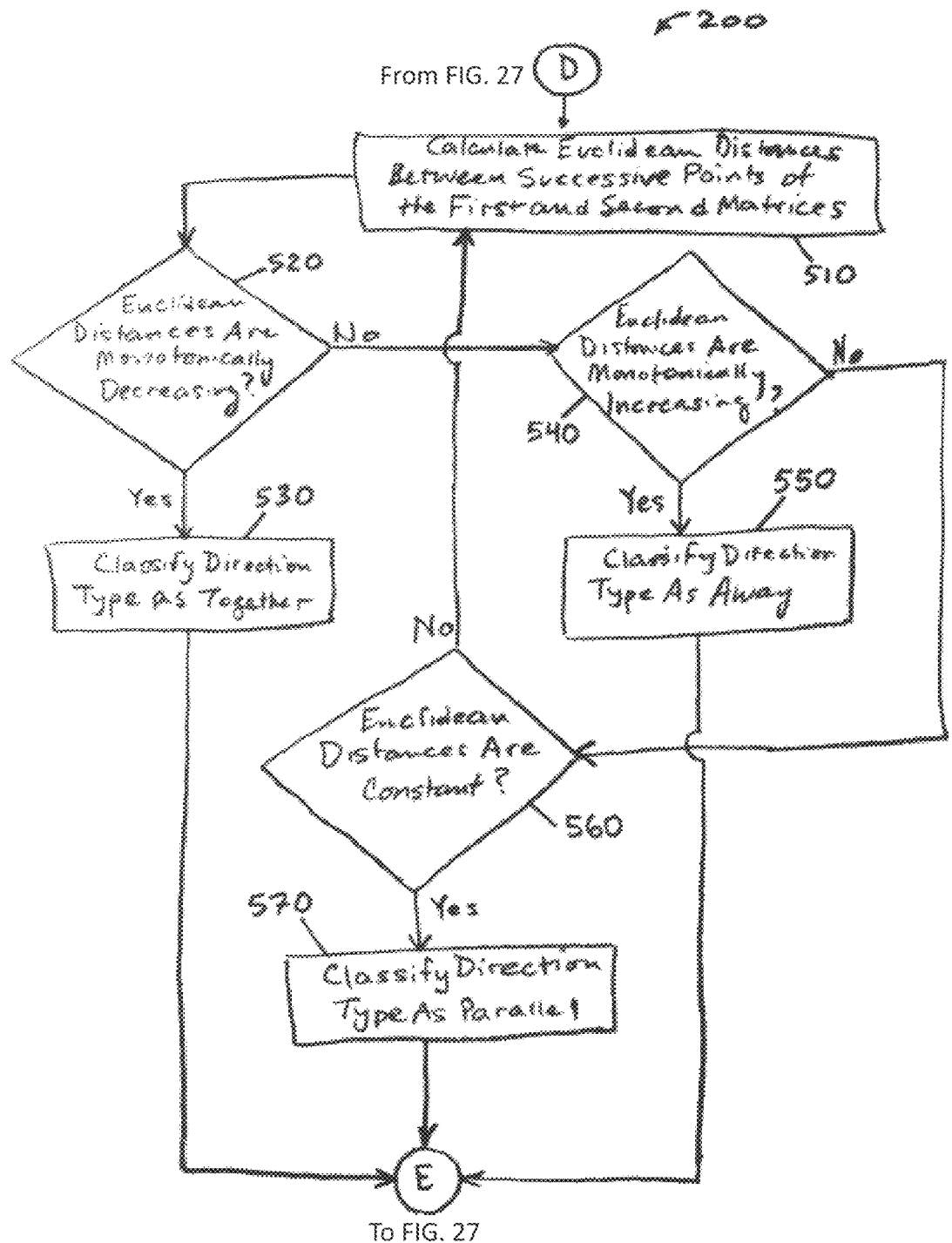

Referring now to FIG. 30, transitioning thereto from and to FIG. 27 via the circled "D" and the circled "E," respectively, the method (200) step of first computing (240) the direction metric may include calculating (510) Euclidean distances between successive points of the first and the second matrices, and classifying (260) the type of direction for the segment may include comprises one of the following steps: (i) determining (520) that the Euclidean distances between the successive points are monotonically decreasing over time, and responsively classifying (530) the type of direction as together; (ii) determining (540) that the Euclidean distances between the successive points are monotonically increasing over time, and responsively classifying (550) the type of direction as away; and (iii) determining (560) that the Euclidean distances between the successive points are constant over time, and responsively classifying (570) the type of direction as parallel.

Figure 32:
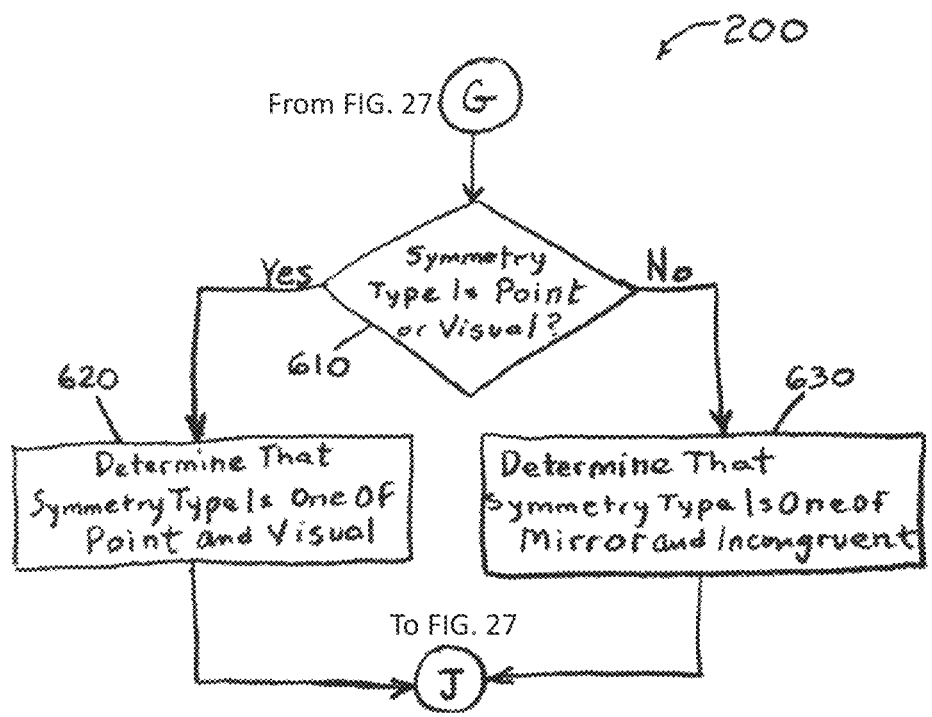

Referring again to FIG. 27, the method (200) step of second computing (250) the symmetry metric may include computing (297) the symmetry metric based on the direction metric. In one embodiment, the method (200) step of classifying (270) the type of symmetry may include classifying (299) the type of symmetry using a modified Procrustes analysis. Classifying (270) the type of symmetry comprises classifying the type of symmetry as one of: mirrored, point, visual, and incongruent. Referring now to FIG. 32, transitioning thereto from and to FIG. 27 via the circled "G" and the circled "J," respectively, in some embodiments, classifying (270) the type of symmetry may include determining (610) if the type of symmetry is point or visual. For determining (610) that the type of symmetry is point or visual, the method (200) may include the step of determining (620) that the type of symmetry is one of: point and visual.

Figure 31:
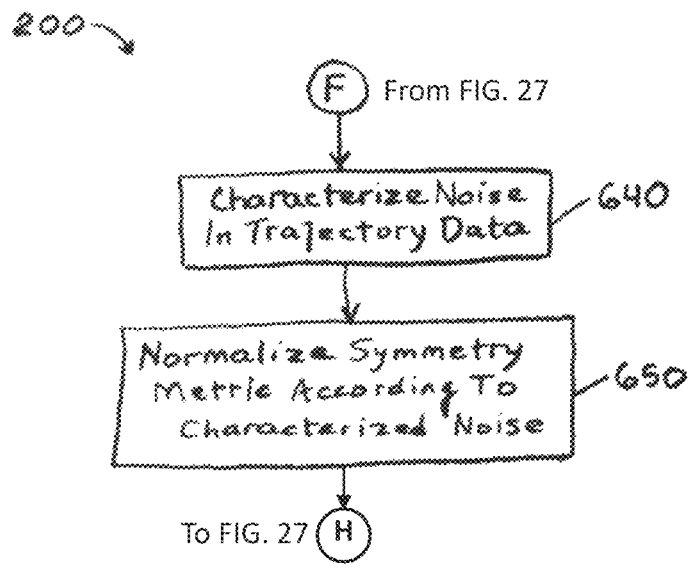

Alternatively, for determining (610) that the type of symmetry is not point or visual, the method (200) may include determining (630) that the type of symmetry is one of: mirror and incongruent. Referring now to FIG. 31, transitioning thereto from and to FIG. 27 via the circled "F" and the circled "H," respectively, in some embodiments, method (200) may include characterizing (640) noise in the data representative of trajectories according to a signal-dependent noise model. In such embodiments, the method (200) step of second computing (250) the symmetry metric may include normalizing (650) the symmetry metric according to the noise.

Bimanual or bipedal motion may commence in a first determined (210) segment, and then later the associated motion may change characteristics and become a different coordinate mode in at least a second segment as compared to the first determined (210) segment. To account for such changes in mode(s), method (200) may further include determining an onset of an at least a second segment of bimanual or bipedal motion of the subject (110) operating the robotic system. To the same or similar ends, method (200) may include the step of, in response to determining the onset of the at least a second segment, iterating, for at least one iteration, through performance of at least the receiving (220), the computing (230), the classifying (260) of the type or direction, the classifying (270) of the type of symmetry, and the at least one of the generating (280) and the controlling (290) steps of the method (200) for the at least a second segment.

Figure 33:
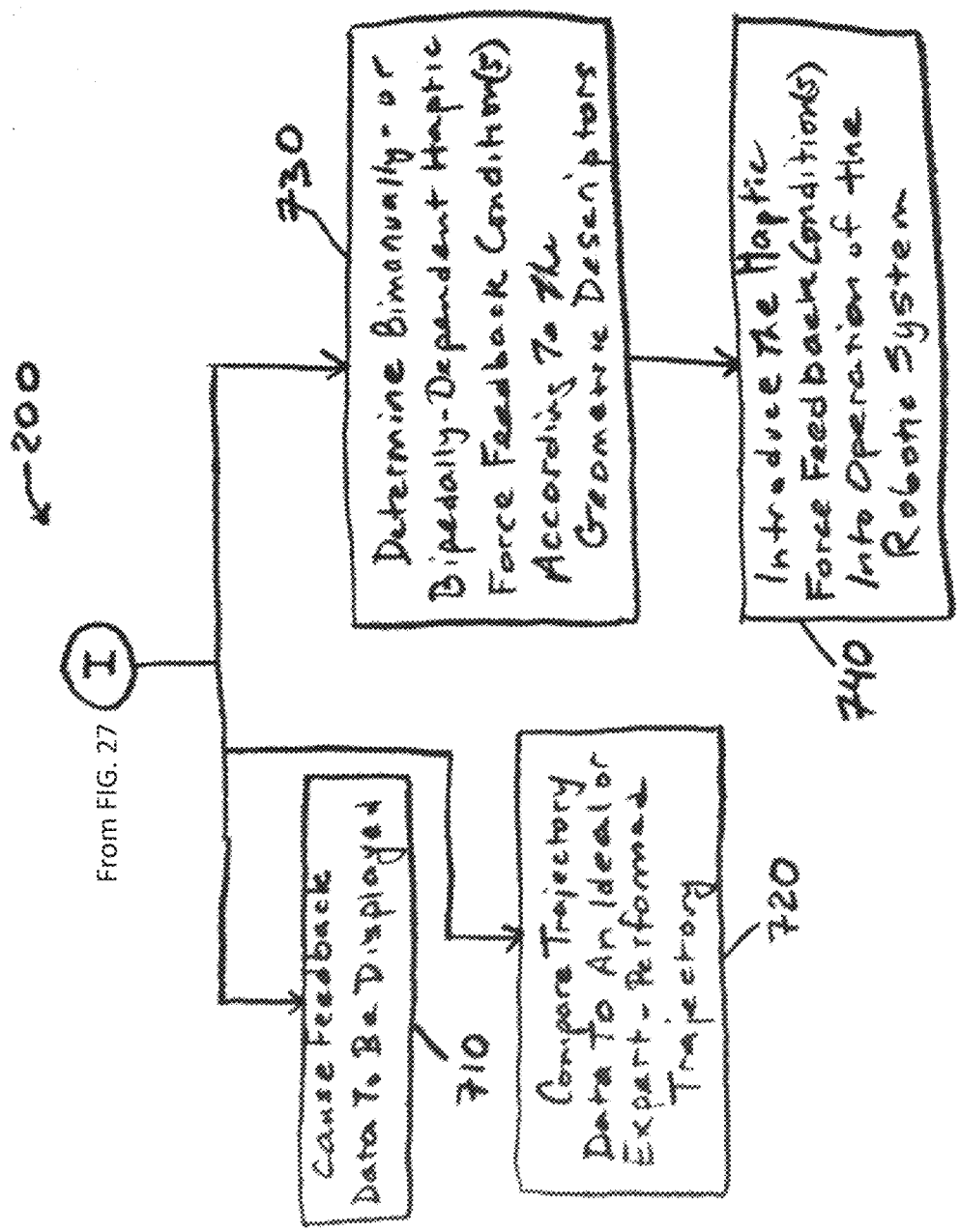

Referring now to FIG. 33, transitioning from FIG. 27 via the circled "I," in one embodiment of method (200) that includes the generating (280) step, method (200) may include causing (710), using an electronic display device (150) of or associated with the robotic system (105), the data representative of the feedback to be displayed to the subject (110) or to the another user (140) in a human-readable format. In some embodiments of method (200) that include the generating (280) step, generating (280) the data representative of the feedback may include comparing (720) (e.g., quantitively and/or qualitatively) the data representative of the trajectories to an ideal or expert-performed trajectory for the task.

Referring back to FIG. 26, the robot (160) may be, or may include, at least one of: a haptic-enabled robot, and a robot controllable by way of means (170) embodied in one or more haptic devices. In such implementations, and in embodiments of method (200) as shown in FIG. 33 that include the controlling (290) step, controlling (290) the robotic system (105) may include, after, or concurrent with, computing (230) the geometric descriptors, determining (730) at least one bimanually- or bipedally-dependent haptic force feedback condition or haptic cue according to the geometric descriptors. In such embodiments, method (200) may include introducing (740) the bimanually- or bipedally-dependent haptic force feedback condition(s) or haptic cue(s) into operation of the robotic system (105) to shape the bimanual or bipedal motion of the subject (110). In one embodiment, introducing (740) the at least one bimanually- or bipedally-dependent force feedback condition may include implementing the at least one force feedback condition as one or more haptic cues. Additionally, or instead, introducing (740) the at least one bimanually- or bipedally-dependent force feedback condition may include implementing the at least one force feedback condition as at least one of: at least one virtual spring, at least one virtual damper, and at least one combination spring-damper, as between the left and the right hands, or the left and right feet, of the subject (110).

Referring now to FIG. 26, determining (730) the aforementioned haptic force feedback condition(s) or haptic cue(s) may be accomplished using processor(s) 190 of computer (180). In some embodiments, processor(s) (190) may implement algorithms (e.g., one or more of those described in detail above with reference to Examples 1-4) that make use of data provided from means (130), means (170), controller (135), the subject (110) or another user (140), and data of a model or framework (e.g., a machine learning model with which processor(s) (190) may communicate), or combinations of those and other useful data. The processor(s) (190) may analyze those data to determine (730) the haptic force feedback condition(s) or haptic cue(s) for introduction (740) into operation of the robotic system (105) to shape the bimanual or bipedal motion of the subject (110). As such, for the introducing (740) step of method (200), processor(s) (190) may, e.g., by way communication interface (155), transmit control signal(s) (125) to robotic system (105). In some embodiments, such control signal(s) 125 may be transmitted to means (170) to thereby introduce (740) the haptic force feedback condition(s) or haptic cue(s) for introduction (740) into operation of the robotic system (105). Additionally, or instead, such control signal(s) 125 may be transmitted to controller (135) to thereby introduce (740) the haptic force feedback condition(s) or haptic cue(s) for introduction (740) into operation of the robotic system (105).

In one embodiment, the aforementioned task may relate to surgical training, and the robotic system (105) and/or the robot (160) may be, or may include, a surgical robot. In such cases, the task may include at least one of: needle transfer, making a C-loop, suture pulling, and peg transfer. In some embodiments, the aforementioned task may relate to functioning or rehabilitation of at least a portion of one or both legs of the subject (110). In this case, the robotic system (105) and/or the robot may be, or may include, a lower-limb exoskeleton, protheses or assistive device. In other embodiments, the aforementioned task may relate to functioning or rehabilitation of at least a portion of one or both arms of the subject (110). In that case, the robotic system (105) and/or the robot (160) may be, or may include, an upper-limb exoskeleton, protheses or assistive device.

Exemplary Computer System Overview

Aspects and implementations of the disclosed devices, systems and methods according to the present technology have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 34:
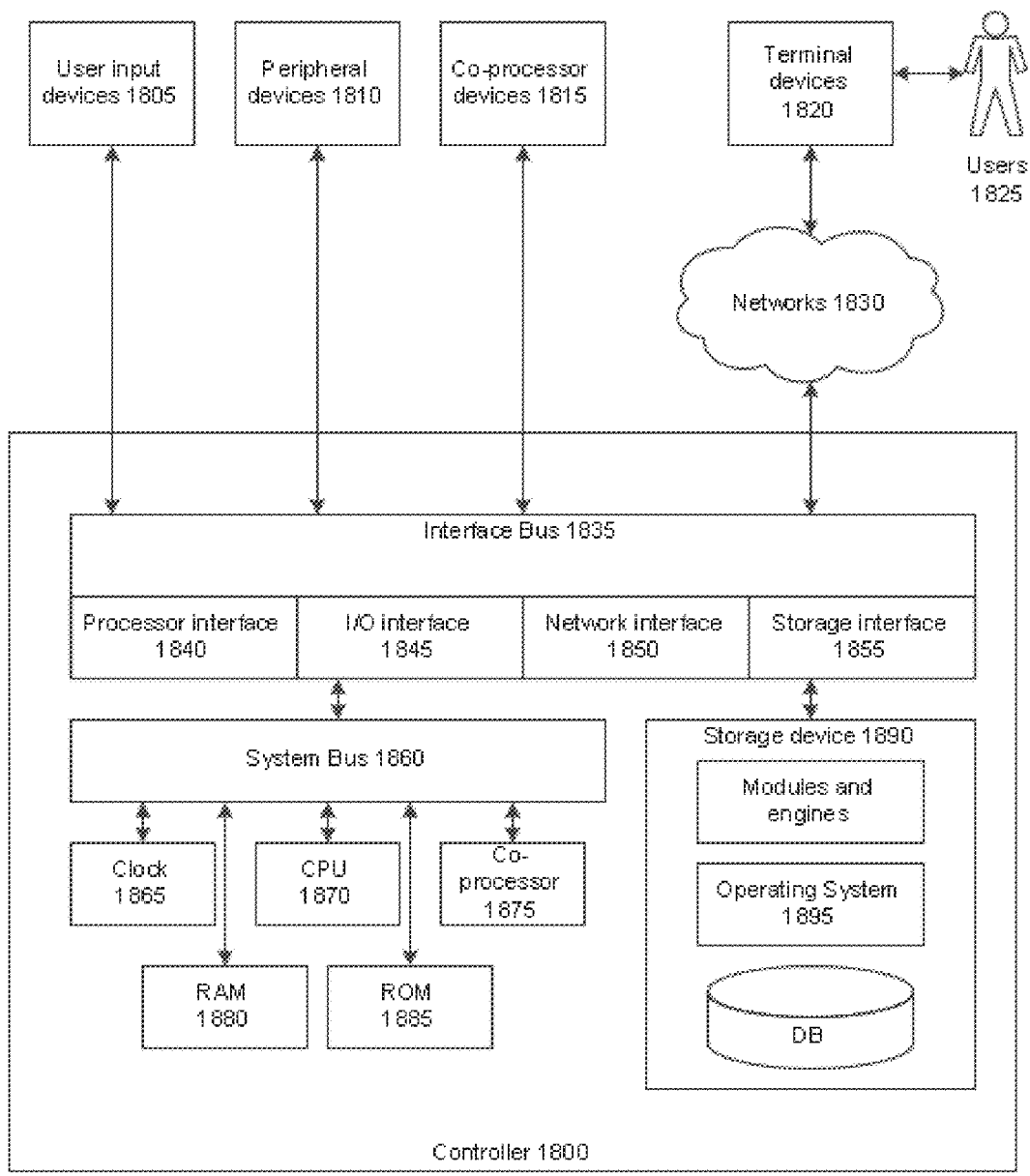
FIG. 34 depicts an example of a computer architecture that may be used in some embodiments of the present technology.

FIG. 34 is a block diagram illustrating an example machine representing the computer systemization of the inspection platform. The controller 1800 may be in communication with entities including one or more users 1825 client/terminal devices 1820, user input devices 1805, peripheral devices 1810, an optional co-processor device(s) (e.g., cryptographic processor devices) 1815, and networks 1830. Users may engage with the controller 1800 via terminal devices 1820 over networks 1830.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 1800 may include clock 1865, CPU 1870, memory such as read only memory (ROM) 1885 and random access memory (RAM) 1880 and co-processor 1875 among others. These controller components may be connected to a system bus 1860, and through the system bus 1860 to an interface bus 1835. Further, user input devices 1805, peripheral devices 1810, co-processor devices 1815, and the like, may be connected through the interface bus 1835 to the system bus 1860. The interface bus 1835 may be connected to a number of interface adapters such as processor interface 1840, input output interfaces (I/O) 1845, network interfaces 1850, storage interfaces 1855, and the like.

Processor interface 1840 may facilitate communication between co-processor devices 1815 and co-processor 1875. In one implementation, processor interface 1840 may expedite encryption and decryption of requests or data. Input output interfaces (I/O) 1845 facilitate communication between user input devices 1805, peripheral devices 1810, co-processor devices 1815, and/or the like and components of the controller 1800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 1850 may be in communication with the network 1830. Through the network 1830, the controller 1800 may be accessible to remote terminal devices 1820. Network interfaces 1850 may use various wired and wireless connection protocols such as, direct connect, Ethernet, wireless connection such as IEEE 802.11a-x, and the like.

Examples of network 1830 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1850 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1855 may be in communication with a number of storage devices such as, storage devices 1890, removable disc devices, and the like. The storage interfaces 1855 may use various connection protocols such as Serial Advanced Technology Attachment (SATA), IEEE 1394, Ethernet, Universal Serial Bus (USB), and the like.

User input devices 1805 and peripheral devices 1810 may be connected to I/O interface 1845 and potentially other interfaces, buses and/or components. User input devices 1805 may include card readers, fingerprint readers, joysticks, keyboards, microphones, mouse, remote controls, retina readers, touch screens, sensors, and/or the like. Peripheral devices 1810 may include antenna, audio devices (e.g., microphone, speakers, etc.), cameras, external processors, communication devices, radio frequency identifiers (RFIDs), scanners, printers, storage devices, transceivers, and/or the like. Co processor devices 1815 may be connected to the controller 1800 through interface bus 1835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1800 may employ various forms of memory including on-chip CPU memory (e.g., registers), RAM 1880, ROM 1885, and storage devices 1890. Storage devices 1890 may employ any number of tangible, non-transitory storage devices or systems such as fixed or removable magnetic disk drive, an optical drive, solid state memory devices and other processor-readable storage media. Computer-executable instructions stored in the memory may include one or more program modules such as routines, programs, objects, components, data structures, and so on that perform particular tasks or implement particular abstract data types. For example, the memory may contain operating system (OS) component 1895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 1800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 1800 may be distributed electronically over the Internet or over other networks (including wireless networks). Those skilled in the relevant art(s) will recognize that portions of the system may reside on a server computer, while corresponding portions reside on a client computer.

Data structures and transmission of data particular to aspects of the controller 1800 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

REFERENCES

[1] M. A. Thornby and D. E. Krebs, "Bimanual skill development in pediatric below-elbow amputation: a multicenter, cross-sectional study," *Archives of Physical Medicine and Rehabilitation*, vol. 73, pp. 697-702, 1992.

[2] G. Lewis and E. Perreault, "An assessment of robot-assisted bimanual movements on upper limb motor coordination following stroke," *IEEE Transactions on Neural Systems and Rehabilitation Engineering*, vol. 17, pp. 595-604, 2009.

[3] G. Herrnstadt, N. Alavi, B. Randhawa, L. A. Boyd, and C. Menon, "Bimanual elbow robotic orthoses: preliminary investigations on an impairment force-feedback rehabilitation method," *Frontiers in Human Neuroscience*, vol. 9, no. 169, 2015.

[4] C. Wu, C. Yang, M. Chen, K. Lin, and L. Wu, "Unilateral versus bilateral robot-assisted rehabilitation on arm-trunk control and functions post stroke: a randomized controlled trial," *Journal of NeuroEngineering and Rehabilitation*, vol. 10, 2013.

[5] O. van der Meijden and M. P. Schijven, "The value of haptic feedback in conventional and robot-assisted minimal invasive surgery and virtual reality training: a current review," *Surgical Endoscopy*, vol. 23, no. 6, pp. 1180-1190, 2009.

[6] H. Abboudi, M. S. Khan, O. Aboumarzouk, K. A. Guru, B. Challacombe, P. Dasgupta, and K. Ahmed, "Current status of validation for robotic surgery simulators-a systematic review," *BJU international*, vol. 111, no. 2, pp. 194-205, 2013.

[7] D. Del Vecchio, R. M. Murray, and P. Perona, "Decomposition of human motion into dynamics-based primitives with application to drawing tasks," *Automatica*, vol. 39, no. 12, pp. 2085-2098, 2003.

[8] C. E. Reiley and G. D. Hager, "Task versus subtask surgical skill evaluation of robotic minimally invasive surgery," in *International conference on medical image computing and computer-assisted intervention*. Springer, 2009, pp. 435-442.

[9] H. C. Lin, Structure in surgical motion. The Johns Hopkins University, 2010.

[10] Y. Gao, S. S. Vedula, C. E. Reiley, N. Ahmidi, B. Varadarajan, H. C. Lin, L. Tao, L. Zappella, B. Be'jar, D. D. Yuh et al., "Jhu-isi gesture and skill assessment working set (jigsaws): A surgical activity dataset for human motion modeling," in *MICCAI Workshop: M2CAI*, vol. 3, 2014, p. 3.

[11] N. Ahmidi, L. Tao, S. Sefati, Y. Gao, C. Lea, B. B. Haro, L. Zappella, S. Khudanpur, R. Vidal, and G. D. Hager, "A dataset and benchmarks for segmentation and recognition of gestures in robotic surgery," *IEEE Transactions on Biomedical Engineering*, vol. 64, no. 9, pp. 2025-2041, 2017.

[12] M. Power, H. Rafii-Tari, C. Bergeles, V. Vitiello, and G.-Z. Yang, "A cooperative control framework for haptic guidance of bimanual surgical tasks based on learning from demonstration," in *2015 IEEE International Conference on Robotics and Automation (ICRA)*. IEEE, 2015, pp. 5330-5337.

[13] C. E. Reiley, E. Plaku, and G. D. Hager, "Motion generation of robotic surgical tasks: Learning from expert demonstrations," in *2010 Annual international conference of the IEEE engineering in medicine and biology*. IEEE, 2010, pp. 967-970.

[14] M. M. Rahman, N. Sanchez-Tamayo, G. Gonzalez, M. Agarwal, V. Aggarwal, R. M. Voyles, Y. Xue, and J. Wachs, "Transferring dexterous surgical skill knowledge between robots for semi-autonomous teleoperation," in *2019 28th IEEE International Conference on Robot and Human Interactive Communication (RO-MAN)*. IEEE, 2019, pp. 1-6.

[15] C. E. Reiley, H. C. Lin, D. D. Yuh, and G. D. Hager, "Review of methods for objective surgical skill evaluation," *Surgical endoscopy*, vol. 25, no. 2, pp. 356-366, 2011.

[16] H. I. Fawaz, G. Forestier, J. Weber, L. Idoumghar, and P.-A. Muller, "Accurate and interpretable evaluation of surgical skills from kinematic data using fully convolutional neural networks," *International journal of computer assisted radiology and surgery*, vol. 14, no. 9, pp. 1611-1617, 2019.

[17] M. Ershad, R. Rege, and A. M. Fey, "Automatic and near real-time stylistic behavior assessment in robotic surgery," *International journal of computer assisted radiology and surgery*, vol. 14, no. 4, pp. 635-643, 2019.

[18] C. M. Hughes, B. Ma¨ueler, H. Tepper, and C. Seegelke, "Interlimb coordination during a cooperative bimanual object manipulation task," *Laterality: Asymmetries of Body, Brain and Cognition*, vol. 18, no. 6, pp. 693-709, 2013.

[19] P. J. Bryden, "The influence of mp bryden's work on lateralization of motor skill: Is the preferred hand selected for and better at tasks requiring a high degree of skill?" *Laterality: Asymmetries of Body, Brain and Cognition*, vol. 21, no. 4-6, pp. 312-328, 2016.

[20] C. Shirota, J. Jansa, J. Diaz, S. Balasubramanian, S. Mazzoleni, N. A. Borghese, and A. Melendez-Calderon, "On the assessment of coordination between upper extremities: towards a common language between rehabilitation engineers, clinicians and neuroscientists," *Journal of neuroengineering and rehabilitation*, vol. 13, no. 1, p. 80, 2016.

[21] A. Utley, *Motor Control, Learning and Development: Instant Notes*. Routledge, 2018.

[22] B. Kim and A. D. Deshpande, "An upper-body rehabilitation exoskeleton harmony with an anatomical shoulder mechanism: Design, modeling, control, and performance evaluation," *The International Journal of Robotics Research*, vol. 36, no. 4, pp. 414-435, 2017.

[23] E. D. Oñ a, J. M. Garcia-Haro, A. Jardo'n, and C. Balaguer, "Robotics in health care: Perspectives of robot-aided interventions in clinical practice for rehabilitation of upper limbs," *Applied sciences*, vol. 9, no. 13, p. 2586, 2019.

[24] J. C. Gower, G. B. Dijksterhuis et al., *Procrustes problems*. Oxford University Press on Demand, 2004, vol. 30.

[25] J. R. Boehm, N. P. Fey, and A. Majewicz-Fey, "Inherent kinematic features of dynamic bimanual path following tasks," *IEEE Transactions of Human Machine Systems*, 2020.

[26] G. H. Staude, "Precise onset detection of human motor responses using a whitening filter and the log-likelihood-

[27] R. Sleimen-Malkoun, J.-J. Temprado, L. Thefenne, and E. Berton, "Bi-manual training in stroke: How do coupling and symmetry-breaking matter?" *BMC neurology*, vol. 11, no. 1, p. 11, 2011. ordination: is interlimb coupling mediated by afferent or efferent processes," *Behavioural Brain Research*, vol. 139, no. 1-2, pp. 177-195, 2003.

[28] S. P. Swinnen, V. Puttemans, S. Vangheluwe, N. Wenderoth, O. Levin, and N. Dounskaia, "Directional interference during bimanual co-ordination: is interlimb coupling mediated by afferent or efferent processes," *Behavioural Brain Research*, vol. 139, no. 1-2, pp. 177-195, 2003.

[29] J. R. Boehm, N. P. Fey, and A. Majewicz-Fey, "Effects of scaling and sequence on performance of dynamic bimanual path following tasks," *Journal of Medical Robotics Research*, 2020.

[30] G. W. Goerres, M. Samuel, I. H. Jenkins, and D. J. Brooks, "Cerebral control of unimanual and bimanual movements: an h215o pet study," *Neuroreport*, vol. 9, no. 16, pp. 3631-3638, 1998.

[31] S. Spada, L. Ghibaudo, S. Gilotta, L. Gastaldi, M. P. Cavatorta, *Procedia Manufacturing* 11, 1255 (2017).

[32] H. Yu, et al., *Control Engineering Practice* 72, 104 (2018).

[33] K. L. Poggensee, S. H. Collins, *Science Robotics* 6, eabf1078 (2021).

[34] R. W. Nuckols, et al., *Science Robotics* 6 (2021).

[35] B. Kim, A. D. Deshpande, *International Journal of Robotics Research* 36, 414 (2017).

[36] G. Herrnstadt, N. Alavi, B. K. Randhawa, L. A. Boyd, C. Menon, *Frontiers in Human Neuroscience* 9 (2015).

[37] C. yi Wu, C. ling Yang, M. de Chen, K. chung Lin, L. ling Wu, *Journal of NeuroEngineering and Rehabilitation* 10, 35 (2013).

[38] H. Kim, et al., *IEEE Transactions on Neural Systems and Rehabilitation Engineering* 21, 153 (2013).

[39] Y. Fang, K. Harshe, J. R. Franz, Z. F. Lerner, *Wearable Technologies* 3 (2022).

[40] M. K. Ishmael, M. Tran, T. Lenzi, 2019 *IEEE 16th International Conference on Rehabilitation Robotics (ICORR)* (IEEE, 2019), vol. 2019-June, pp. 925-930.

[41] P. Garrec, J. P. Friconneau, Y. Me'asson, Y. Perrot, 2008 *IEEE/RSJ International Conference on Intelligent Robots and Systems, IROS* (2008), pp. 1483-1488.

[42] C. H. Kuo, J. S. Dai, P. Dasgupta, *International Journal of Medical Robotics and Computer Assisted Surgery* 8, 127 (2012).

[43] H. Abboudi, et al., *BJU International* 111, 194 (2013).

[44] H. E. Russell, et al., *Science Robotics* 1, eaah5682 (2016).

[45] N. Ahmidi, et al., *IEEE Transactions on Biomedical Engineering* 64, 2025 (2017).

[46] P. O. Kristensson, T. Nicholson, A. Quigley, *Proceedings of the 2012 ACM international conference on Intelligent User Interfaces—IUI '12* (ACM Press, 2012), p. 89.

[47] D. D. Vecchio, R. M. Murray, P. Perona, *Automatica* 39, 2085 (2003).

[48] H. C. Lin, I. Shafran, D. Yuh, G. D. Hager, *Computer Aided Surgery* 11, 220 (2006).

[49] D. Rakita, B. Mutlu, M. Gleicher, L. M. Hiatt, *Science Robotics* 4 (2019).

[50] V. Arapi, C. D. Santina, G. Averta, A. Bicchi, M. Bianchi, *IEEE Robotics and Automation Letters* 6, 6537 (2021).

[51] F. Krebs, T. Asfour, *IEEE Robotics and Automation Letters* 7, 11031 (2022).

[52] K. G. Rabe, et al., *IEEE Transactions on Biomedical Engineering* 68, 1379 (2021).

[53] M. K. Burns, V. Patel, I. Florescu, K. V. Pochiraju, R. Vinjamuri, *Frontiers in bioengineering and biotechnology* 5, 2 (2017).

[54] Vinjamuri, M. Sun, D. Crammond, R. Sclabassi, Z.-H. Mao, *International Conference of the IEEE Engineering in Medicine and Biology Society EMBC* (2008), pp. 5093-5096.

[55] W. Spijkers, H. Heuer, *The Quarterly Journal of Experimental Psychology Section A* 48, 716 (1995).

[56] D. E. Sherwood, *Journal of Motor Behavior* 26, 123 (1994).

[57] J. R. Boehm, N. P. Fey, A. M. Fey, *Journal of Medical Robotics Research* 5, 2042001 (2020).

[58] M. Corballis, *Human laterality* (Elsevier, 2012).

[59] J. R. Boehm, N. P. Fey, A. Majewicz, *IEEE Transactions on Human-Machine Systems* 50, 613 (2020).

[60] G. H. Staude, *IEEE Transactions on Biomedical Engineering* 48, 1292 (2001).

[61] D. Katz, J. Baptista, S. P. Azen, M. C. Pike, *Biometrics* 34, 469 (1978).

[62] E. D'iaz-France's, F. J. Rubio, *Statistical Papers* 54, 309 (2013).

[63] J. C. Gower, G. B. Dijksterhuis, *Procrustes problems*, vol. 30 (OUP Oxford, 2004).

[64] E. Todorov, M. I. Jordan, *Nature Neuroscience* 5, 1226 (2002).

[65] E. Todorov, *Neural Computation* 17, 1084 (2005).

[66] Y. Gao, et al., *Modeling and Monitoring of Computer Assisted Interventions (M2CAI)—MICCAI Workshop* (2014), pp. 1-10.

[67] J. A. S. Kelso, D. L. Southard, D. Goodman, *Science* 203, 1029 (1979).

[68] C. Shirota, et al., *Journal of NeuroEngineering and Rehabilitation* 13, 1 (2016).

[69] Y. Guiard, *Journal of Motor Behavior* 19, 486 (1987).

[70] P. J. Bryden, *Laterality* 21, 312 (2016).

[71] S. Kantak, R. McGrath, N. Zahedi, *Neuroscience Letters* 626, 86 (2016).

[72] N. J. Hodges, I. M. Franks, *Human Movement Science* 21, 231 (2002).

[73] J. Tallet, V. Kostrubiec, P. G. Zanone, *Journal of Motor Behavior* 40, 103 (2008).

[74] R. Sleimen-malkoun, J. jacques Temprado, L. Thefenne, E. Berton, *BMC Neurology* 11, 11 (2011).

[75] B. A. Smith, C. E. Lang, *Archives of Physical Medicine and Rehabilitation* 100, 1176 (2019).

[76] G. W. Goerres, M. Samuel, I. H. Jenkins, D. J. Brooks, *NeuroReport* 9, 3631 (1998).

[77] S. P. Swinnen, N. Wenderoth, *Trends in Cognitive Sciences* 8, 18 (2004).

[78] D. J. Goble, *Disability and Rehabilitation* 28, 1103 (2006).

[79] W. D. Byblow, et al., *PLoS ONE* 7 (2012).

[80] M. Simkins, N. Byl, H. Kim, G. Abrams, J. Rosen, *International Journal of Intelligent Computing and Cybernetics* (2016).

[81] S. Kyeong, Y. Na, J. Kim, *International Journal of Precision Engineering and Manufacturing* 21, 947 (2020).

[82] S. McAmis, K. B. Reed, *IEEE International Conference on Rehabilitation Robotics* (IEEE Computer Society, 2011).

[83] O. A. Van der Meijden and M. P. Schijven, "The value of haptic feedback in conventional and robot-assisted minimal invasive surgery and virtual reality training: a current review," *Surgical endoscopy*, vol. 23, no. 6, pp. 1180-1190, 2009.

[84] Y. A. Oquendo, Z. Chua, M. M. Coad, I. Nisky, A. M. Jarc, S. M. Wren, T. S. Lendvay, and A. M. Okamura, "Robot-assisted surgical training over several days in a virtual surgical environment with divergent and convergent force fields," *arXiv preprint arXiv:*2110.01364, 2021.

[85] J. Klein, S. J. Spencer, and D. J. Reinkensmeyer, "Breaking it down is better: haptic decomposition of complex movements aids in robot-assisted motor learning," *IEEE Transactions on Neural Systems and Rehabilitation Engineering*, vol. 20, no. 3, pp. 268-275, 2012.

[86] J. Pen˜alver, "Is breaking it down better?: Enhancing motor learning via controlled sensory-motor integration," 2018.

[87] P. Kapur, S. Premakumar, S. A. Jax, L. J. Buxbaum, A. M. Dawson, and K. J. Kuchenbecker, "Vibrotactile feedback system for intuitive upper-limb rehabilitation," in *World Haptics 2009—Third Joint EuroHaptics conference and Symposium on Haptic Interfaces for Virtual Environment and Teleoperator Systems*. IEEE, 2009, pp. 621-622.

[88] H. G. Malabet, R. A. Robles, and K. B. Reed, "Symmetric motions for bimanual rehabilitation," *in* 2010 *IEEE/RSJ International Conference on Intelligent Robots and Systems*. IEEE, 2010, pp. 5133-5138.

[89] J. P. Held, B. Klaassen, B.-J. F. Van Beijnum, A. R. Luft, and P. H. Veltink, "Usability evaluation of a vibrotactile feedback system in stroke subjects," *Frontiers in bioengineering and biotechnology*, vol. 4, p. 98, 2017.

[90] E. Battaglia and A. M. Fey, "Cartesian space vibrotactile cues outperform tool space cues when moving from 2d to 3d needle insertion task," in 2022 *9th IEEE RAS/EMBS International Conference for Biomedical Robotics and Biomechatronics (BioRob)*. IEEE, 2022, pp. 1-6.

[91] J. L. Patton and F. C. Huang, "Sensory-motor interactions and error augmentation," in *Neurorehabilitation technology*. Springer, 2016, pp. 79-95.

[92] W. H. Jantscher, S. Pandey, P. Agarwal, S. H. Richardson, B. R. Lin, M. D. Byrne, and M. K. O'Malley, "Toward improved surgical training: Delivering smoothness feedback using haptic cues," *in* 2018 *IEEE haptics symposium (HAPTICS)*. IEEE, 2018, pp. 241-246.

[93] J. Salazar, K. Okabe, and Y. Hirata, "Path-following guidance using phantom sensation based vibrotactile cues around the wrist," *IEEE Robotics and Automation Letters*, vol. 3, no. 3, pp. 2485-2492, 2018.

[94] J. Liu, S. Cramer, and D. Reinkensmeyer, "Learning to perform a new movement with robotic assistance: comparison of haptic guidance and visual demonstration," *Journal of neuroengineering and rehabilitation*, vol. 3, no. 1, pp. 1-10, 2006.

[95] M. Power, H. Rafii-Tari, C. Bergeles, V. Vitiello, and G.-Z. Yang, "A cooperative control framework for haptic guidance of bimanual surgical tasks based on learning from demonstration," in 2015 IEEE *International Conference on Robotics and Automation (ICRA)*. IEEE, 2015, pp. 5330-5337.

[96] G. Caccianiga, A. Mariani, C. G. de Paratesi, A. Menciassi, and E. De Momi, "Multi-sensory guidance and feedback for simulation-based training in robot assisted surgery: a preliminary comparison of visual, haptic, and visuo-haptic," *IEEE Robotics and Automation Letters*, vol. 6, no. 2, pp. 3801-3808, 2021.

[97] D. A. Rosenbaum, A. M. Dawson, and J. H. Challis, "Haptic tracking permits bimanual independence" *Journal of Experimental Psychology: Human Perception and Performance*, vol. 32, no. 5, p. 1266, 2006.

[98] J. L. Patton, M. E. Stoykov, M. Kovic, and F. A. Mussa-Ivaldi, "Evaluation of robotic training forces that either enhance or reduce error in chronic hemiparetic stroke survivors," *Experimental brain research*, vol. 168, no. 3, pp. 368-383, 2006.

[99] J. R. Boehm, N. P. Fey, and A. M. Fey, "Online recognition of bimanual coordination provides important context for movement data in bimanual teleoperated robots," in 2021 *IEEE/RSJ International Conference on Intelligent Robots and Systems (IROS)*. IEEE, 2021, pp. 6248-6255.

[100] C. Shirota, J. Jansa, J. Diaz, S. Balasubramanian, S. Mazzoleni, N. A. Borghese, and A. Melendez-calderon, "On the assessment of coordination between upper extremities: towards a common language between rehabilitation engineers, clinicians and neuroscientists," *Journal of NeuroEngineering and Rehabilitation*, vol. 13, pp. 1-14, 2016.

[101] J. R. Boehm, N. P. Fey, and A. M. Fey, "Effects of scaling and sequence on performance of dynamic bimanual path following tasks," *Journal of Medical Robotics Research*, vol. 5, no. 03n04, p. 2042001, 2020.

[102] J. R. Boehm, N. P. Fey, and A. Majewicz, "Inherent kinematic features of dynamic bimanual path following tasks," *IEEE Transactions on Human-Machine Systems*, vol. 50, no. 6, pp. 613-622, 2020.

[103] G. H. Staude, "Precise onset detection of human motor responses using a whitening filter and the log-likelihood-ratio test," *IEEE Transactions on Biomedical Engineering*, vol. 48, no. 11, pp. 1292-1305, 2001.

[104] R. Shadmehr and F. A. Mussa-Ivaldi, "Adaptive representation of dynamics during learning of a motor task," *Journal of neuroscience*, vol. 14, no. 5, pp. 3208-3224, 1994.

[105] N. Hogan and D. Sternad, "Sensitivity of smoothness measures to movement duration, amplitude, and arrests," *Journal of motor behavior*, vol. 41, no. 6, pp. 529-534, 2009.

[106] S. E. Maxwell, H. D. Delaney, and K. Kelley, *Designing experiments and analyzing data: A model comparison perspective*. Routledge, 2017.

[107] Mathworks®. Documentation for generalized linear mixed-effects models. [Online]. Available: https://www-.mathworks.com/help/stats/generalized-linear-mixed-effects-models.html

[108] S. E. Criscimagna-Hemminger, A. J. Bastian, and R. Shadmehr, "Size of error affects cerebellar contributions to motor learning," *Journal of neurophysiology*, vol. 103, no. 4, pp. 2275-2284, 2010.

[109] K. H. Sheetz, J. Claflin, and J. B. Dimick, "Trends in the adoption of robotic surgery for common surgical procedures," *JAMA network open*, vol. 3, no. 1, pp. e1 918 911-e1 918 911, 2020.

[110] W. B. Bauerle, P. Mody, A. Estep, J. Stoltzfus, and M. El Chaar, "Current trends in the utilization of a robotic approach in the field of bariatric surgery," *Obesity surgery*, vol. 33, no. 2, pp. 482-491, 2023.

[111] H. W. Richards, A. N. Kulaylat, J. N. Cooper, D. J. McLeod, K. A. Diefenbach, and M. P. Michalsky, "Trends in robotic surgery utilization across tertiary children's hospitals in the united states," *Surgical endoscopy*, vol. 35, pp. 6066-6072, 2021.
[112] R. Bogue, "The rise of surgical robots," *Industrial Robot: the inter-national journal of robotics research and application*, vol. 48, no. 3, pp. 335-340, 2021.
[113] I. Markit, "The complexities of physician supply and demand: projections from 2019 to 2034," Washington, DC: *AAMC*, 2021.
[114] R. Chen, P. Rodrigues Armijo, C. Krause, S. R. T. Force, K.-C. Siu, and D. Oleynikov, "A comprehensive review of robotic surgery curriculum and training for residents, fellows, and postgraduate surgical education," *Surgical endoscopy*, vol. 34, pp. 361-367, 2020.
[115] R. S. Wang and S. N. Ambani, "Robotic surgery training," *Urologic Clinics of North America*, vol. 48, pp. 137-146, 2 2021.
[116] A. C. Goh, D. W. Goldfarb, J. C. Sander, B. J. Miles, and B. J. Dunkin, "Global evaluative assessment of robotic skills: Validation of a clinical assessment tool to measure robotic surgical skills," *Journal of Urology*, vol. 187, pp. 247-252, 2012. [Online]. Available: http://dx.doi.org/10.1016/j.juro.2011.09.032
[117] R. Sanchez, O. Rodriguez, J. Rosciano, L. Vegas, V. Bond, A. Rojas, and A. Sanchez-Ismayel, "Robotic surgery training: construct validity of global evaluative assessment of robotic skills (gears)," *Journal of Robotic Surgery*, vol. 10, pp. 227-231, 2016.
[118] M. Power, H. Rafii-Tari, C. Bergeles, V. Vitiello, and G.-Z. Yang, "A cooperative control framework for haptic guidance of bimanual surgical tasks based on learning from demonstration," in 2015 *IEEE International Conference on Robotics and Automation (ICRA)*. IEEE, 2015, pp. 5330-5337.
[119] Y. A. Oquendo, Z. Chua, M. M. Coad, I. Nisky, A. M. Jarc, S. M. Wren, T. S. Lendvay, and A. M. Okamura, "Robot-assisted surgical training over several days in a virtual surgical environment with divergent and convergent force fields," *arXiv preprint arXiv:2110.01364*, 2021.
[120] N. Enayati, A. M. Okamura, A. Mariani, E. Pellegrini, M. M. Coad, G. Ferrigno, and E. De Momi, "Robotic assistance-as-needed for enhanced visuomotor learning in surgical robotics training: An experimental study," in 2018 *IEEE International Conference on Robotics and Automation (ICRA)*. IEEE, 2018, pp. 6631-6636.
[121] J. R. Boehm, N. P. Fey, and A. M. Fey, "Online recognition of bimanual coordination provides important context for movement data in bimanual teleoperated robots," in 2021 *IEEE/RSJ International Conference on Intelligent Robots and Systems (IROS)*. IEEE, 2021, pp. 6248-6255.
[122] J. R. Boehm, N. P. Fey, and A. M. Fey, "Shaping human movement via bimanually-dependent haptic force feedback," in 2023 *IEEE World Haptics Conference (WHC)*. IEEE, 2023.
[123] Y.-H. Su, A. Munawar, A. Deguet, A. Lewis, K. Lindgren, Y. Li, R. H. Taylor, G. S. Fischer, B. Hannaford, and P. Kazanzides, "Collaborative robotics toolkit (crtk): Open software framework for surgical robotics research," in 2020 *Fourth IEEE International Conference on Robotic Computing (IRC)*. IEEE, 2020, pp. 48-55.
[124] G. Dulan, R. V. Rege, D. C. Hogg, K. M. Gilberg-Fisher, N. A. Arain, S. T. Tesfay, and D. J. Scott, "Developing a comprehensive, proficiency-based training program for robotic surgery," *Surgery*, vol. 152, no. 3, pp. 477-488, 2012.
[125] G. Dulan, R. V. Rege, D. C. Hogg, K. M. Gilberg-Fisher, N. A. Arain, S. T. Tesfay, D. J. Scott, "Proficiency-based training for robotic surgery: construct validity, workload, and expert levels for nine inanimate exercises," *Surgical endoscopy*, vol. 26, pp. 1516-1521, 2012.
[126] N. A. Arain, G. Dulan, D. C. Hogg, R. V. Rege, C. E. Powers, S. T. Tesfay, L. S. Hynan, and D. J. Scott, "Comprehensive proficiency-based inanimate training for robotic surgery: reliability, feasibility, and educational benefit," *Surgical endoscopy*, vol. 26, pp. 2740-2745, 2012.
[127] A. Mariani, E. Pellegrini, and E. D. Momi, "Skill-oriented and performance-driven adaptive curricula for training in robot-assisted surgery using simulators: A feasibility study," *IEEE Transactions on Biomedical Engineering*, vol. 68, pp. 685-694, 2021.

What is claimed is:

1. A computer-implemented method for online recognition of bimanual or bipedal movement coordination modes directed to completing a bimanual or bipedal motor task using a robotic system and including combinations of direction and symmetry, the method comprising:
   determining an onset of a segment of bimanual or bipedal motion of a subject operating the robotic system in a workspace;
   in response to determining the onset of the segment, receiving, from a position sensor, data representative of trajectories of: a left hand and a right hand of the subject, or a left foot and a right foot of the subject, wherein the data representative of trajectories includes: a first set of time ordered points defining a first discrete trajectory of the left hand or the left foot of the subject, and a second set of time ordered points defining a second discrete trajectory of the right hand or the right foot of the subject;
   computing, based on the data representative of trajectories, geometric descriptors of the segment, wherein computing geometric descriptors comprises: first computing a direction metric that describes a type of direction for the segment, and after the first computing, second computing a symmetry metric that describes a type of symmetry for the segment;
   classifying, based on the direction metric, the type of direction for the segment;
   classifying, based on the symmetry metric, the type of symmetry for the segment; and
   at least one of:
     generating, based on the type of direction and the type of symmetry, data representative of feedback to the subject or to another user of the robotic system pertaining to performance of the task using the robotic system; and
     controlling, based on the type of direction and the type of symmetry, the robotic system to facilitate improving performance, or training, of the subject for the task using the robotic system.

2. The method of claim 1 further comprising sampling, by or from the position sensor, kinematic data of: the left and right hands of the subject, or the left and right feet of the subject, wherein determining the onset of the segment comprises determining, based on the kinematic data, that the bimanual or bipedal motion of the subject meets or exceeds a predetermined threshold for at least one of: distance, velocity and time.

3. The method of claim 2, wherein the first and the second sets of time ordered points each include at least three points.

4. The method of claim 1, wherein the first and the second sets of time ordered points further define three-dimensional (3D) motion of the left and right hands, or the left and right feet, of the subject in a 3D coordinate system of the workspace.

5. The method of claim 1, wherein the first and the second sets of time ordered points further define two-dimensional (2D) motion of the left and right hands, or the left and right feet, of the subject in a 2D coordinate system of the workspace.

6. The method of claim 1 further comprising normalizing, prior to computing the geometric descriptors, the first and the second sets of time ordered points.

7. The method of claim 6, wherein normalizing the first and the second sets of time ordered points comprises interpolating the first and the second sets of time ordered points to create equally spaced points ($p_i$) arranged as row vectors in: a first matrix corresponding to the first discrete trajectory, and a second matrix corresponding to the second discrete trajectory, wherein the first and the second matrices have an equal length (n).

8. The method of claim 7 further comprising identifying, prior to determining the onset of bimanual or bipedal motion of the subject, a value of matrices length (n) and a value of a spacing of points ($p_i$), based on at least one of: a size of the workspace, a resolution of the position sensor, and a number of points of the first and the second sets of time ordered points.

9. The method of claim 7, wherein first computing the direction metric comprises calculating Euclidean distances between successive points of the first and the second matrices, and wherein classifying the type of direction for the segment comprises one of (i)-(iii):
 (i) determining that the Euclidean distances between the successive points are monotonically decreasing over time, and responsively classifying the type of direction as together;
 (ii) determining that the Euclidean distances between the successive points are monotonically increasing over time, and responsively classifying the type of direction as away; and
 (iii) determining that the Euclidean distances between the successive points are constant over time, and responsively classifying the type of direction as parallel.

10. The method of claim 7, wherein second computing the symmetry metric comprises computing the symmetry metric based on the direction metric.

11. The method of claim 10, wherein classifying the type of symmetry comprises classifying the type of symmetry using a modified Procrustes analysis.

12. The method of claim 10, wherein classifying the type of symmetry comprises classifying the type of symmetry as one of: mirrored, point, visual, and incongruent.

13. The method of claim 12, wherein classifying the type of symmetry further comprises: determining if the type of symmetry is point or visual; and
 one of (a) and (b):
 (a) for determining that the type of symmetry is point or visual, determining that the type of symmetry is one of: point and visual; and
 (b) for determining that the type of symmetry is not point or visual, determining that the type of symmetry is one of: mirror and incongruent.

14. The method of claim 1 further comprising characterizing noise in the data representative of trajectories according to a signal-dependent noise model, wherein second computing the symmetry metric comprises normalizing the symmetry metric according to the noise.

15. The method of claim 1 further comprising determining a number of targets in the workspace for the bimanual or bipedal motion of the subject for completing the task.

16. The method of claim 1 further comprising:
 determining an onset of an at least a second segment of bimanual or bipedal motion of the subject operating the robotic system; and
 in response to determining the onset of the at least a second segment, iterating, for at least one iteration, through performance of at least the receiving, the computing, the classifying of the type or direction, the classifying of the type of symmetry, and the at least one of the generating and the controlling steps of the method for the at least a second segment.

17. The method of claim 1, wherein the method comprises the generating step, the method further comprising causing, using an electronic display device of or associated with the robotic system, the data representative of the feedback to be displayed to the subject or to the another user in a human-readable format.

18. The method of claim 1, wherein the method comprises the generating step, and wherein generating the data representative of the feedback comprises comparing the data representative of the trajectories to an ideal or expert-performed trajectory for the task.

19. The method of claim 1, wherein the method comprises the controlling step, wherein the robotic system is or includes at least one of: a haptic-enabled robot, and a robot controllable by way of one or more haptic devices, and wherein controlling the robotic system comprises:
 after, or concurrent with, computing the geometric descriptors,
 determining at least one bimanually- or bipedally-dependent haptic force feedback condition according to the geometric descriptors; and
 introducing the at least one bimanually- or bipedally-dependent haptic force feedback condition into operation of the robotic system to shape the bimanual or bipedal motion of the subject.

20. The method of claim 19, wherein introducing the at least one bimanually- or bipedally-dependent force feedback condition comprises implementing the at least one force feedback condition as one or more haptic cues.

21. The method of claim 19, wherein introducing the at least one bimanually- or bipedally-dependent force feedback condition comprises implementing the at least one force feedback condition as at least one of: at least one virtual spring, at least one virtual damper, and at least one combination spring-damper, as between the left and the right hands, or the left and right feet, of the subject.

22. The method of claim 1, wherein the task relates to surgical training, and wherein the robotic system is or includes a surgical robot.

23. The method of claim 22, wherein the task includes at least one of: needle transfer, making a C-loop, suture pulling, and peg transfer.

24. The method of claim 1, wherein the task relates to functioning or rehabilitation of at least a portion of one or both legs of the subject, and wherein the robotic system is or includes a lower-limb exoskeleton, protheses or assistive device.

25. The method of claim 1, wherein the task relates to functioning or rehabilitation of at least a portion of one or both arms of the subject, and wherein the robotic system is or includes an upper-limb exoskeleton, protheses or assistive device.

26. A system for online recognition of bimanual or bipedal movement coordination modes directed to completing a bimanual or bipedal motor task using a robotic system and including combinations of direction and symmetry, the system comprising at least one processor operably couplable to the robotic system and to a position sensor, wherein the at least one processor is configured to:
- determine an onset of a segment of bimanual or bipedal motion of a subject operating the robotic system in a workspace;
- in response to the onset of the segment being determined, receive, from the position sensor, data representative of trajectories of: a left hand and a right hand of the subject, or a left foot and a right foot of the subject, wherein the data representative of trajectories includes: a first set of time ordered points defining a first discrete trajectory of the left hand or the left foot of the subject, and a second set of time ordered points defining a second discrete trajectory of the right hand or the right foot of the subject;
- compute, based on the data representative of trajectories, geometric descriptors of the segment, wherein to compute the geometric descriptors, the at least one processor is further configured to: first compute a direction metric that describes a type of direction for the segment, and after the direction metric is first computed, second compute a symmetry metric that describes a type of symmetry for the segment;
- classify, based on the direction metric, the type of direction for the segment;
- classify, based on the symmetry metric, the type of symmetry for the segment; and
- at least one of:
  - generate, based on the type of direction and the type of symmetry, data representative of feedback to the subject or to another user of the robotic system pertaining to performance of the task using the robotic system; and
  - control, based on the type of direction and the type of symmetry, the robotic system to facilitate improving performance, or training, of the subject for the task using the robotic system.

27. The system of claim 26 further comprising at least one of:
- the robotic system operably coupled to the at least one processor; and
- the position sensor operably coupled to the at least one processor.

28. One or more non-transitory computer readable media having stored thereon program instructions which, when executed by at least one processor, cause a machine to:
- determine an onset of a segment of bimanual or bipedal motion of a subject operating a robotic system in a workspace;
- in response to the onset of the segment being determined, receive, from a position sensor, data representative of trajectories of: a left hand and a right hand of the subject, or a left foot and a right foot of the subject, wherein the data representative of trajectories includes: a first set of time ordered points defining a first discrete trajectory of the left hand or the left foot of the subject, and a second set of time ordered points defining a second discrete trajectory of the right hand or the right foot of the subject;
- compute, based on the data representative of trajectories, geometric descriptors of the segment, wherein when executed to compute the geometric descriptors, the program instructions further cause the machine to: first compute a direction metric that describes a type of direction for the segment, and after the direction metric is first computed, second compute a symmetry metric that describes a type of symmetry for the segment;
- classify, based on the direction metric, the type of direction for the segment;
- classify, based on the symmetry metric, the type of symmetry for the segment; and
- at least one of:
  - generate, based on the type of direction and the type of symmetry, data representative of feedback to the subject or to another user of the robotic system pertaining to performance of the task using the robotic system; and
  - control, based on the type of direction and the type of symmetry, the robotic system to facilitate improving performance, or training, of the subject for the task using the robotic system.

* * * * *